United States Patent
Uekusa et al.

(10) Patent No.: US 9,725,540 B2
(45) Date of Patent: Aug. 8, 2017

(54) 4-METHYL-1-PENTENE/α-OLEFIN COPOLYMER, COMPOSITION COMPRISING THE COPOLYMER AND 4-METHYL-1-PENTENE COPOLYMER COMPOSITION

(75) Inventors: Takayuki Uekusa, Ichihara (JP); Masahiko Okamoto, Chiba (JP); Yoshisada Tamo, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 502 days.

(21) Appl. No.: 13/505,706

(22) PCT Filed: Nov. 5, 2010

(86) PCT No.: PCT/JP2010/069753
§ 371 (c)(1),
(2), (4) Date: May 2, 2012

(87) PCT Pub. No.: WO2011/055803
PCT Pub. Date: May 12, 2011

(65) Prior Publication Data
US 2012/0220728 A1      Aug. 30, 2012

(30) Foreign Application Priority Data

Nov. 6, 2009 (JP) .................................. 2009-255071
Jan. 8, 2010 (JP) .................................. 2010-003166

(51) Int. Cl.
| | | |
|---|---|---|
| C08L 23/20 | (2006.01) | |
| C08F 210/14 | (2006.01) | |
| C08F 210/00 | (2006.01) | |
| C08F 210/06 | (2006.01) | |
| C08F 210/08 | (2006.01) | |
| C08F 4/659 | (2006.01) | |

(52) U.S. Cl.
CPC .......... C08F 210/00 (2013.01); C08F 210/14 (2013.01); C08L 23/20 (2013.01); C08F 4/65912 (2013.01); C08F 210/06 (2013.01); C08F 210/08 (2013.01)

(58) Field of Classification Search
CPC .......... C08F 10/02; C08F 10/06; C08F 10/14; C08L 23/18–23/20
See application file for complete search history.

(56) References Cited

U.S. PATENT DOCUMENTS

| | | | |
|---|---|---|---|
| 4,642,269 A * | 2/1987 | Kohyama et al. ............ 428/516 |
| 4,801,672 A * | 1/1989 | Kohyama et al. ......... 526/348.2 |
| 4,892,851 A | 1/1990 | Ewen et al. |
| 4,990,585 A | 2/1991 | Kawata et al. |
| 5,922,812 A | 7/1999 | Kan et al. |
| 6,369,175 B1 | 4/2002 | Ewen |
| 6,939,928 B1 | 9/2005 | Kawai et al. |
| 7,160,949 B2 | 1/2007 | Ota et al. |
| 7,449,533 B2 | 11/2008 | Kawai et al. |
| 7,488,789 B2 | 2/2009 | Ikenaga et al. |
| 7,741,419 B2 | 6/2010 | Tohi et al. |
| 7,803,888 B2 | 9/2010 | Kawahara et al. |
| 7,879,960 B2 | 2/2011 | Funaya et al. |
| 2004/0013878 A1 | 1/2004 | Honma et al. |
| 2006/0135699 A1 * | 6/2006 | Li et al. ........................ 525/240 |
| 2007/0249792 A1 * | 10/2007 | Kawahara et al. ........... 526/126 |
| 2008/0097055 A1 * | 4/2008 | Funaya et al. ............... 526/160 |

FOREIGN PATENT DOCUMENTS

| | | |
|---|---|---|
| JP | S56-76416 A | 6/1981 |
| JP | S63-150307 A | 6/1988 |
| JP | 02-041303 | 2/1990 |
| JP | 03-193796 | 8/1991 |
| JP | 2000226480 A * | 8/2000 |
| JP | 2004-161957 | 6/2004 |
| JP | 2005-314680 A | 11/2005 |
| JP | 2008-144155 | 6/2008 |
| WO | WO-96/28507 | 9/1996 |
| WO | WO-01/27124 A1 | 4/2001 |

(Continued)

OTHER PUBLICATIONS

Chadwick, J. C. Ziegler-Natta Catalysts. Encyclopedia of Polymer Science and Technology. John Wiley & Sons. 2003.*
Machine Translation of JP2000-226480A. Aug. 15, 2000.*
International Search Report in PCT/JP2010/069753 dated Jan. 11, 2011.
Office Action issued in corresponding Japanese patent application No. 2014-252826 dated Sep. 15, 2015.

*Primary Examiner* — Robert C Boyle
*Assistant Examiner* — Stephen Rieth
(74) *Attorney, Agent, or Firm* — Foley & Lardner LLP

(57) ABSTRACT

The present invention provides a 4-methyl-1-pentene/α-olefin copolymer being excellent in lightness, stress absorption, stress relaxation, vibration damping properties, scratch resistance, abrasion resistance, toughness, mechanical properties and flexibility, having no stickiness during molding operation and being excellent in the balance among these properties; a composition comprising the polymer; and uses thereof. The 4-methyl-1-pentene/α-olefin copolymer (A) of the present invention satisfies specific requirements, and comprises 5 to 95 mol % of a structural unit (i) derived from 4-methyl-1-pentene, 5 to 95 mol % of a structural unit (ii) derived from at least one kind of α-olefin selected from α-olefins having 2 to 20 carbon atoms excluding 4-methyl-1-pentene and 0 to 10 mol % of a structural unit (iii) derived from a non-conjugated polyene, provided that the total of the structural units (i), (ii), and (iii) is 100 mol %.

2 Claims, No Drawings

(56) References Cited

FOREIGN PATENT DOCUMENTS

| WO | WO-01/53369 A1 | 7/2001 |
| WO | WO-02/081958 A1 | 10/2002 |
| WO | WO-2004/087775 A1 | 10/2004 |
| WO | WO-2005/121192 A1 | 12/2005 |
| WO | WO-2006/025540 A1 | 3/2006 |

* cited by examiner

4-METHYL-1-PENTENE/α-OLEFIN COPOLYMER, COMPOSITION COMPRISING THE COPOLYMER AND 4-METHYL-1-PENTENE COPOLYMER COMPOSITION

TECHNICAL FIELD

The present invention relates to a 4-methyl-1-pentene/α-olefin copolymer, a composition comprising the copolymer, an article comprising the composition, and uses thereof.

In more detail, the present invention relates to a copolymer of 4-methyl-1-pentene and an α-olefin, the copolymer being excellent in flexibility, lightness, stress absorption, stress relaxation, scratch resistance, abrasion resistance, toughness, and mechanical properties, having no stickiness in molding operation and being excellent in the balance among these properties; and the present invention further relates to a composition comprising the copolymer and uses thereof.

BACKGROUND ART

Olefin polymers, being excellent in processability, chemical resistance, electrical properties, mechanical properties, and the like, are processed to extrusion molded articles, injection molded articles, hollow articles, films, sheets, fibers, and the like, and are used in many applications including daily goods, kitchenware, packaging films, nonwoven fabrics, household electrical appliances, mechanical parts, electrical parts, and automotive parts.

In particular, olefin polymers comprising 4-methyl-1-pentene are used in various fields including food, medical treatment, electronic information, household electrical appliances, experimental equipment and stationery, as a resin being excellent in lightness, transparency, gas permeability, chemical resistance, and furthermore heat resistance.

These olefin polymers are generally produced using a catalyst comprising a transition metal compound and an organoaluminum compound, i.e., so-called Ziegler catalyst.

Patent Document 1 proposes a 4-methyl-1-pentene random copolymer, and a composition containing the copolymer.

However, the copolymer in this document has multiple reaction sites, thus having a drawback of involving the easy generation of a low stereoregularity polymer or a low-molecular weight polymer. These polymers cause an adverse influence as a sticky component during film formation. Further, the copolymer in this document involves the bleeding-out of the low-molecular weight component to the surface, and has decreased mechanical properties such as toughness and strength. The improvement as a product is thus needed.

On the other hand, olefin polymers obtained using an organometallic complex catalyst containing a cyclopentadienyl group are generally characterized by the polymers having a uniform composition in terms of e.g., the molecular weight, but it is pointed out that these polymers are inferior in heat resistance as compared with polymers obtained using conventional Ziegler catalysts. The reason is said to be attributable to the heterogeneous bond of monomer units contained in several percentage in the olefin polymers produced using usual metallocene catalysts, resulting in adverse influence on physical properties.

Patent Document 2 proposes a 4-methyl-1-pentene polymer having excellent heat resistance and a high molecular weight with a narrow molecular weight distribution. However, the polymers obtained therein still need to be improved in terms of heat resistance, toughness, and molding processability.

Poly(4-methyl-1-pentene) is excellent in releasability. Poly(4-methyl-1-pentene), because of its lower surface tension as compared with other resins, exhibits excellent releasability during molding operation, i.e., poor compatibility with other resins. As a result, the use of other resins as a modifier to modify poly(4-methyl-1-pentene) in terms of e.g., toughness, impact properties results in the failure to exhibit these properties. Patent Document 3 and Patent Document 4 deal with this problem by proposing the use of 4-methyl-1-pentene polymer compositions. However, these compositions need to be further improved in terms of toughness, impact resistance, and transparency.

Meanwhile, vibration dampers are widely used to prevent or dampen vibration caused by device components and then reduce the vibration to an appropriate level. The vibration dampers are used also as a material having specific vibration damping properties to provide a high quality sound in a speaker and the like of audio devices.

As a polymer material having vibration damping properties, conventional art provides a material having a large peak value of loss coefficient tan δ, as obtained by measuring a dynamic viscoelasticity thereof, the loss tangent tan δ being an indicator of vibration damping properties of the polymer material. Examples of the material include styrene/isoprene/styrene block copolymer (SIS) and hydrogenated products thereof.

SIS, having a large peak of loss tangent tan δ at around a room temperature, has excellent vibration damping properties at around a room temperature. However, SIS, because of having a sharp peak of tan δ, has inferior vibration damping properties at a temperature that is not around a room temperature. Meanwhile, the hydrogenated SIS, which is produced through a two-stage process of polymerization and hydrogenation, costs high for its production; and thus, an industrial application thereof is limited.

A rubber vibration damper has excellent properties in its performance, but is difficult to form so as to have an arbitrary shape in its practical use. Polypropylene and 4-methyl-1-pentene homopolymer have their tan δ peaks at around a room temperature. The peak values, however, are small, and this leads to a problem such as low size precision during molding operation. A polyvinyl chloride (PVC) vibration damper possibly has an adverse influence on environment by, e.g., emitting harmful gas during burning.

For these reasons, there has been desired a material excellent in lightness, flexibility, stress absorption, stress relaxation, vibration damping properties, toughness, scratch resistance, abrasion resistance, and mechanical properties, having no stickiness during molding operation and being excellent in the balance among these properties.

CITATION LIST

Patent Documents

Patent Document 1: JP-A-2008-144155
Patent Document 2: WO 2005/121192
Patent Document 3: WO 1996/28507
Patent Document 4: WO 2002/081958

SUMMARY OF THE INVENTION

Problems to be Solved by the Invention

The present invention is intended to solve the problems as described above, and it is an object of the invention to provide a 4-methyl-1-pentene/α-olefin copolymer being excellent in lightness, flexibility, stress absorption, stress relaxation, vibration damping properties, scratch resistance, abrasion resistance, toughness, and mechanical properties, having no stickiness during molding operation and being excellent in the balance among these properties. It is another object of the invention to provide a composition comprising the copolymer, and an article comprising the composition.

Means to Solve the Problems

The present inventors earnestly studied and then, completed the present invention.

Namely, a 4-methyl-1-pentene/α-olefin copolymer (A) of the present invention comprises:

5 to 95 mol % of a structural unit (i) derived from 4-methyl-1-pentene, 5 to 95 mol % of a structural unit (ii) derived from at least one kind of α-olefin selected from α-olefins having 2 to 20 carbon atoms excluding 4-methyl-1-pentene, and 0 to 10 mol % of a structural unit (iii) derived from a non-conjugated polyene, provided that the total of the structural units (i), (ii), and (iii) is 100 mol %; and satisfies the following requirements (a) to (d).

(a): the intrinsic viscosity [η], as measured in a decalin at 135° C., is 0.01 to 5.0 dL/g, (b): the ratio (Mw/Mn) of a weight-average molecular weight (Mw) to a number-average molecular weight (Mn), as measured by gel permeation chromatography (GPC), is 1.0 to 3.5, (c): the tensile modulus (YM) is 0.1 to 1000 MPa, and (d): the melting point [Tm], as measured by differential scanning calorimetry (DSC), is lower than 110° C. or not observed.

In terms of flexibility, mechanical properties, toughness, scratch resistance, abrasion resistance, and stress absorption, it is preferable that the copolymer comprises 10 to 90 mol % of the structural unit (i) and 10 to 90 mol % of the structural unit (ii), provided that the total of the structural units (i) and (ii) is 100 mol %, and further satisfies the following requirements (c1) and (e).

(c1): The tensile modulus (YM) is 0.1 to 300 MPa.

(e): The difference ΔHS in Shore A hardness between immediately after the starting of indenter contact and 15 seconds after the starting of indenter contact is 10 to 50 (Shore A harness is measured using a press sheet thereof having a thickness of 3 mm in accordance with JIS K6253). With regard to a method for measuring Shore A hardness, Examples can be referred to (the same is applied hereinafter).

A 4-methyl-1-pentene/α-olefin copolymer (A3) comprises:

5 to 95 mol % of the structural unit (i), 4.9 to 94.9 mol % of the structural unit (ii), and 0.1 to 10 mol % of the structural unit (iii), provided that the total of the structural units (i), (ii), and (iii) is 100 mol %.

The 4-methyl-1-pentene/α-olefin copolymer (A3) is more preferable in terms of mechanical properties, flexibility, and toughness.

A 4-methyl-1-pentene/α-olefin copolymer (A1) comprises:

5 to 50 mol %, preferably 10 to 32 mol % of the structural unit (i), 50 to 95 mol %, preferably 68 to 90 mol % of the structural unit (ii), and 0 to 10 mol % of the structural unit (iii), provided that the total of the structural units (i), (ii), and (iii) is 100 mol %, and satisfies the following requirement (j), in addition to the requirements (a) to (d).

(j): The maximum value of loss tangent tan δ, as obtained by measuring a dynamic viscoelasticity thereof within a temperature range of −70 to 180° C. at a frequency of 10 rad/s, is within a temperature range of 0 to 40° C. and the maximum value of tan δ is 0.5 or more.

In terms of stress absorption, stress relaxation, and flexibility, it is preferable that the copolymer (A1) comprises 10 to 32 mol % of the structural unit (i), 68 to 90 mol % of the structural unit (ii), and 0 to 10 mol % of the structural unit (iii), provided that the total of the structural units (i), (ii), and (iii) is 100 mol %.

A 4-methyl-1-pentene/α-olefin copolymer (A2) comprises:

33 to 80 mol % of the structural unit (i), 67 to 20 mol % of the structural unit (ii), and 0 to 10 mol % of the structural unit (iii), provided that the total of the structural units (i), (ii), and (iii) is 100 mol %, and satisfies the following requirement (e1), in addition to the requirements (a) to (d).

(e1): The difference ΔHS in Shore A hardness between immediately after the starting of indenter contact and 15 seconds after the starting of indenter contact is 15 to 50.

A 4-methyl-1-pentene/α-olefin copolymer composition (X) of the present invention comprises:

5 to 95 parts by weight of the 4-methyl-1-pentene/α-olefin copolymer, and 5 to 95 parts by weight of a thermoplastic resin (B) other than the 4-methyl-1-pentene/α-olefin copolymer, provided that the total of the copolymer and the thermoplastic resin (B) is 100 parts by weight.

In terms of heat resistance, mechanical properties, toughness, and abrasion resistance, it is preferable that the composition (X) comprises 5 to 49 parts by weight of the copolymer and 95 to 51 parts by weight of a crystalline olefin resin (B1) other than the 4-methyl-1-pentene/α-olefin copolymer as the thermoplastic resin (B), provided that the total of the copolymer and (B1) is 100 parts by weight (X12 and X22).

In terms of flexibility, stress absorption, stress relaxation, and mechanical properties, it is preferable that the composition (X) comprises 50 to 95 parts by weight of the copolymer (A) and 5 to 50 parts by weight of the crystalline olefin resin (B1), provided that the total of (A) and (B) is 100 parts by weight (X11 and X21).

The 4-methyl-1-pentene/α-olefin copolymer composition (X11) comprises:

50 to 95 parts by weight of a 4-methyl-1-pentene/α-olefin copolymer comprising 10 to 32 mol % of the structural unit (i), 68 to 90 mol % of the structural unit (ii), and 0 to 10 mol % of the structural unit (iii), provided that the total of the structural units (i), (ii), and (iii) is 100 mol %, and satisfying at least the requirements (a) to (d), and 5 to 50 parts by weight of a thermoplastic resin (B) other than the 4-methyl-1-pentene/α-olefin copolymer, provided that the total of the copolymer (A) and the thermoplastic resin (B) is 100 parts by weight); and satisfies the following requirement (j1).

(j1): The maximum value of loss tangent tan δ, as obtained by measuring a dynamic viscoelasticity thereof within a temperature range of −70 to 180° C. at a frequency of 10 rad/s, is within a temperature range of −50 to 40° C. and the maximum value of tan δ is 0.4 or more.

The 4-methyl-1-pentene/α-olefin copolymer composition (X12) comprises:

5 to 49 parts by weight of a 4-methyl-1-pentene/α-olefin copolymer comprising 10 to 32 mol % of the structural unit (i), 68 to 90 mol % of the structural unit (ii), and 0 to 10 mol % of the structural unit (iii), provided that the total of the structural units (i), (ii), and (iii) is 100 mol %, and satisfying at least the requirements (a) to (d), and 51 to 95 parts by weight of a thermoplastic resin (B) other than the 4-methyl-1-pentene/α-olefin copolymer, provided that the total of the copolymer (A) and the thermoplastic resin (B) is 100 parts by weight.

In terms of providing heat resistance, mechanical properties, and toughness, it is preferable that the copolymer composition (X12) comprises the thermoplastic resin (B) being at least one crystalline olefin resin (B1) selected from polypropylene, poly(4-methyl-1-pentene), polyethylene, and polybutene, and satisfies the following requirements (f) and (g).

(f): The softening temperature is 110 to 250° C.
(g): The tensile modulus (YM) is 300 to 2000 MPa.

The 4-methyl-1-pentene/α-olefin copolymer composition (X21) comprises:

50 to 95 parts by weight of a 4-methyl-1-pentene/α-olefin copolymer comprising 33 to 80 mol % of the structural unit (i), 67 to 20 mol % of the structural unit (ii) and 0 to 10 mol % of the structural unit (iii), provided that the total of the structural units (i), (ii), and (iii) is 100 mol %, and satisfying at least the requirements (a) to (d), and 5 to 50 parts by weight of a thermoplastic resin (B) other than the 4-methyl-1-pentene/α-olefin copolymer, provided that the total of the copolymer (A) and the thermoplastic resin (B) is 100 parts by weight; and satisfies the following requirement (e2).

(e2): The difference ΔHS in Shore A hardness between immediately after the starting of indenter contact and 15 seconds after the starting of indenter contact is 10 to 50, or the difference ΔHS in Shore D hardness between immediately after the starting of indenter contact and 15 seconds after the starting of indenter contact is 5 to 50.

In terms of flexibility, stress relaxation, and mechanical properties, it is preferable that the copolymer composition (X21) comprises 50 to 95 parts by weight of the copolymer and 5 to 50 parts by weight of the crystalline olefin resin (B1), provided that the total of the copolymer and (B1) is 100 parts by weight.

The 4-methyl-1-pentene/α-olefin copolymer composition (X22) comprises:

5 to 49 parts by weight of a 4-methyl-1-pentene/α-olefin copolymer comprising 33 to 80 mol % of the structural unit (i), 67 to 20 mol % of the structural unit (ii) and 0 to 10 mol % of the structural unit (iii), provided that the total of the structural units (i), (ii), and (iii) is 100 mol %, and satisfying at least the requirements (a) to (d), and 51 to 95 parts by weight of a thermoplastic resin (B) other than the 4-methyl-1-pentene/α-olefin copolymer, provided that the total of the copolymer (A) and the thermoplastic resin (B) is 100 parts by weight.

In terms of heat resistance, mechanical properties, abrasion resistance, and toughness, it is preferable that the composition (X22) comprises 5 to 49 parts by weight of the copolymer and 95 to 51 parts by weight of a crystalline olefin resin (B1) other than the 4-methyl-1-pentene/α-olefin copolymer as the thermoplastic resin (B), provided that the total of the copolymer and (B1) is 100 parts by weight.

In terms of heat resistance, mechanical properties, and toughness, it is preferable that the copolymer composition (X22) comprises the thermoplastic resin (B) being at least one crystalline olefin resin (B1) selected from polypropylene, poly(4-methyl-1-pentene), polyethylene, and polybutene, and satisfies the following requirements (f) and (g).

(f): The softening temperature is 110 to 250° C., preferably 120 to 240° C.
(g): The tensile modulus (YM) is 300 to 2000 MPa, preferably 400 to 2000 MPa.

A 4-methyl-1-pentene copolymer composition (Y) of the present invention comprises:

50 to 98 parts by weight of a 4-methyl-1-pentene copolymer (AA), 1 to 49 parts by weight of a crystalline olefin resin (BB) having a melting point of 100° C. or higher other than the 4-methyl-1-pentene copolymer (AA), and 1 to 49 parts by weight of an α-olefin copolymer (CC) having a melting point of lower than 100° C. other than the 4-methyl-1-pentene copolymer (AA), provided that the total of (AA), (BB), and (CC) is 100 parts by weight, wherein the copolymer (AA) satisfies the following requirements (a-1) to (a-3), (b-2) and (b-3), and preferably (b-1).

In terms of improvement in mechanical properties, stress absorption, and vibration damping properties, the copolymer composition (Y) satisfying the requirements (a-1) to (a-3), and (b-2) to (b-3) is preferable.

(a-1): The copolymer (AA) comprises 5 to 95 wt % of a structural unit derived from 4-methyl-1-pentene and 5 to 95 wt % of a structural unit derived from at least one kind of α-olefin selected from α-olefins having 2 to 20 carbon atoms excluding 4-methyl-1-pentene, provided that the total of the structural units in the copolymer (AA) is 100 wt %.

(a-2): The intrinsic viscosity [η], as measured in a decalin at 135° C., is 0.01 to 5.0 dL/g.

(a-3): The ratio (Mw/Mn) of a weight-average molecular weight (Mw) to a number-average molecular weight (Mn), as measured by gel permeation chromatography (GPC), is 1.0 to 3.5.

(b-1): The copolymer (AA) comprises 10 to 90 wt % of a structural unit derived from 4-methyl-1-pentene and 10 to 90 wt % of a structural unit derived from at least one kind of α-olefin selected from α-olefins having 2 to 20 carbon atoms excluding 4-methyl-1-pentene, provided that the total of the structural units in the copolymer (AA) is 100 wt %.

(b-2): The difference ΔHS in Shore A hardness between immediately after the starting of indenter contact and 15 seconds after the starting of indenter contact is 10 to 50.

(b-3): The melting point [Tm], as measured by differential scanning calorimetry (DSC), is lower than 110° C. or not observed.

In terms of improvement in mechanical properties, stress absorption, and vibration damping properties, it is preferable that the composition (Y) comprises:

50 to 96 parts by weight, preferably 50 to 90 parts by weight of the copolymer (AA), 2 to 45 parts by weight, preferably 5 to 45 parts by weight of the resin (BB), and 2 to 45 parts by weight, preferably 5 to 45 parts by weight of the α-olefin copolymer (CC), and that the copolymer (AA) satisfies the following requirement (c-1).

(c-1): The copolymer (AA) comprises:

18 to 90 wt %, preferably 25 to 85 wt % of a structural unit derived from 4-methyl-1-pentene, and 10 to 82 wt %, preferably 15 to 75 wt % of a structural unit derived from at least one kind of α-olefin selected from α-olefins having 2 to 20 carbon atoms excluding 4-methyl- 1-pentene, provided that the total of the structural units in the copolymer (AA) is 100 wt %.

It is preferable that the copolymer composition (Y) has a difference ΔHS in Shore A hardness between immediately after the starting of indenter contact and 15 seconds after the starting of indenter contact being 10 to 50; or has a difference ΔHS in Shore D hardness between immediately after the starting of indenter contact and 15 seconds after the starting of indenter contact being 5 to 50.

In terms of mechanical properties, it is preferable that the copolymer composition (Y) comprises the crystalline olefin resin (BB) being at least one kind selected from polypropylene, poly(4-methyl-1-pentene), polyethylene, and polybutene. It is more preferable that the crystalline olefin resin (B) is polypropylene in terms of mechanical properties.

In terms of mechanical properties, it is preferable that the copolymer composition (Y) comprises the α-olefin copolymer (CC) satisfying the following requirements (d-1) and (d-2).

(d-1): The α-olefin copolymer (CC) comprises 50 to 99 wt % of a structural unit derived from ethylene, propylene or butene-1 and 1 to 50 wt % of a structural unit derived from an α-olefin having 2 to 20 carbon atoms other than the above-mentioned structural unit, provided that the total of the structural units in the copolymer (CC) is 100 wt %.

(d-2): MFR, as measured at 190° C. or 230° C. under a load of 2.16 kg in accordance with JIS K-6721, is in the range of 0.01 to 100 g/10 minutes, and the density is in the range of 0.910 to 0.850 g/cm$^3$.

An article of the present invention comprises any one or more of the 4-methyl-1-pentene/α-olefin copolymer, the 4-methyl-1-pentene/α-olefin copolymer composition, and the 4-methyl-1-pentene copolymer composition.

Effect of the Invention

The 4-methyl-1-pentene/α-olefin copolymer and the composition comprising the copolymer according to the present invention, and the article of the present invention are excellent in lightness, flexibility, stress absorption, stress relaxation, vibration damping properties, scratch resistance, abrasion resistance, toughness, transparency, mechanical properties, moldability, and releasability, and have no stickiness during molding operation and are excellent in the balance among these properties.

EMBODIMENTS FOR CARRYING OUT THE INVENTION

The present invention is described specifically hereinafter.
<4-Methyl-1-pentene/α-olefin copolymers (A), and (A1) to (A3)>

The 4-methyl-1-pentene/α-olefin copolymer (A) according to the present invention comprises:
to 95 mol % of a structural unit (i) derived from 4-methyl-1-pentene,
95 to 5 mol % of a structural unit (ii) derived from at least one kind of α-olefin selected from α-olefins having 2 to 20 carbon atoms excluding 4-methyl-1-pentene, and
0 to 10 mol % of a structural unit (iii) derived from a non-conjugated polyene, provided that the total of the structural units (i), (ii), and (iii) is 100 mol %.

This copolymer comprises the structural unit (i) preferably in an amount of 10 to 90 mol %, more preferably 15 to 85 mol %, still more preferably 15 to 80 mol %, most preferably 15 to 75 mol %; and the structural unit (ii) preferably in an amount of 90 to 10 mol %, more preferably 85 to 15 mol %, still more preferably 85 to 20 mol %, most preferably 85 to 25 mol %, provided that the total of the structural units (i) and (ii) is 100 mol %. In the present invention, "an α-olefin having 2 to 20 carbon atoms" does not include 4-methyl-1-pentene, unless otherwise noted.

Meanwhile, any other copolymerization component may be contained therein, to the degree not adversely affecting the object of the present invention; and the embodiments thereof are within a scope of the present invention.

In addition, the copolymer (A) satisfies at least the following requirements (a) to (d).

(a): The copolymer (A) has an intrinsic viscosity [η] in decalin at 135° C. in the range of 0.01 to 5.0 (dL/g), preferably 0.05 to 4.0 (dL/g), more preferably 0.1 to 3.0 (dL/g), still more preferably 0.5 to 2.5 (dL/g). The use of a catalyst described later can provide the polymer without impairing the molecular weight distribution. The combined use of hydrogen during polymerization, as described later, can control a molecular weight of the polymer and provide polymers having molecular weights ranging from low to high without limitation.

(b): The copolymer (A) has a ratio (Mw/Mn) of a weight-average molecular weight (Mw) to a number-average molecular weight (Mn), as measured by gel permeation chromatography (GPC), in the range of 1.0 to 3.5, preferably 1.5 to 3.0, more preferably 1.5 to 2.5. A large Mw/Mn, raising a concern in terms of the influence of a composition distribution and a low-molecular weight polymer, may prevent the polymer from exhibiting mechanical properties, moldability, and abrasion resistance, and cause the polymer to have stickiness during molding operation. The Mw/Mn in the range from 1.0 to 3.5 is advantageous in exhibiting the foregoing characteristics and thus is of a high industrial value. The use of a catalyst described later can provide the polymer having a Mw/Mn within the above range without impairing the molecular weight. If an application requires the 4-methyl-1-pentene/α-olefin copolymer to have a wide molecular weight distribution, this need can be satisfied by blending polymers differing in molecular weight, or by employing a multistep polymerization method, or the like.

With regard to the copolymer (A), the extracted amount thereof under methyl acetate is 0 to 1.5 wt %, preferably 0 to 1.0 wt %, more preferably 0 to 0.8 wt %, most preferably 0 to 0.6 wt %. The extracted amount under methyl acetate is an indicator of stickiness during molding operation. If this value is large, the resultant polymer has a large composition distribution thereby containing a low-molecular weight polymer, which causes the problem during molding operation. The extracted amount under methyl acetate being within the above range causes no problem due to stickiness during molding operation.

The copolymer (A) has a weight-average molecular weight (Mw) in terms of polystyrene, as measured by gel permeation chromatography (GPO), preferably in the range of 500 to 10,000,000, more preferably 1,000 to 5,000,000, still more preferably 1,000 to 2,500,000.

The copolymer (A) has a parameter B value, as measured by $^{13}$C-NMR, which shows randomness of a chain distribution of the copolymerized monomers, preferably in a range of 0.9 to 1.5, more preferably 0.9 to 1.3, still more preferably 0.9 to 1.2. When the parameter B value is within the above range, the polymer has good randomness of chain distribution of monomers, has no composition distribution, and is excellent in e.g., transparency, flexibility, stress absorption and stress relaxation.

(c): The copolymer (A) has a tensile modulus (YM) of 0.1 to 1000 MPa, preferably 0.1 to 500 MPa, more preferably 0.1 to 300 MPa, still more preferably 0.1 to 200 MPa. When the tensile modulus is within the above range, for example, mechanical properties, toughness, flexibility, and stress absorption are excellent.

(d): The copolymer (A) has a melting point (Tm), as measured by DSC, of preferably lower than 110° C. or not observed, more preferably lower than 100° C. or not observed, still more preferably lower than 85° C. or not observed. The melting point of the copolymer (A) can be varied arbitrarily by types and compositions of the comonomers. When the melting point is within the above range, flexibility and toughness are excellent.

The copolymer (A) has a density, as measured in accordance with ASTM D 1505 (water replacement method), preferably in the range of 0.810 to 0.850 g/cm$^3$, more preferably 0.820 to 0.850 g/cm$^3$, more preferably 0.830 to 0.850 g/cm$^3$.

It is preferable that the copolymer (A) satisfies the following requirements (c1) and (e).

(c1): The tensile modulus (YM) is 0.1 to 300 MPa, preferably 0.1 to 250 MPa, more preferably 0.3 to 200 MPa. When the tensile modulus is within the above range, mechanical properties, toughness, flexibility, and stress absorption are excellent.

(e): The change ΔHS in Shore A hardness between immediately after the measurement and 15 seconds after the measurement is 10 to 50, preferably 15 to 50, more preferably 20 to 50. The change in Shore A hardness is obtained as follows in accordance with JIS K 6253.

ΔHS=(Shore $A$ hardness 15 seconds after the measurement−Shore $A$ hardness immediately after the measurement)

The ΔHS value can be varied arbitrarily by types and compositions of comonomers. When ΔHS is within the above range, stress absorption and stress relaxation are excellent.

A 4-methyl-1-pentene/α-olefin copolymer (A1) comprises:

5 to 50 mol %, preferably 10 to 32 mol % of a structural unit (i) derived from 4-methyl-1-pentene, 50 to 95 mol %, preferably 68 to 90 mol % of a structural unit (ii) derived from at least one kind of α-olefin selected from α-olefins having 2 to 20 carbon atoms excluding 4-methyl-1-pentene, and 0 to 10 mol %, preferably 0 to 5 mol % of a structural unit (iii) derived from a non-conjugated polyene, provided that the total of the structural units (i), (ii), and (iii) is 100 mol %, and satisfies the following requirement (j), in addition to at least the requirements (a) to (d).

The 4-methyl-1-pentene/α-olefin copolymer (A1) is preferable because of having excellent stress absorption and flexibility.

(j): The maximum value of loss tangent tan δ, as obtained by measuring a dynamic viscoelasticity thereof within a temperature range of −70 to 180° C. at a frequency of 10 rad/s, is within a temperature range of 0 to 40° C., and the maximum value of tan δ is 0.5 or more, preferably 0.7 or more, more preferably 1.0 or more, most preferably 1.5 or more. The above ranges are preferable because the copolymer has excellent stress absorption.

In terms of providing excellent stress absorption and flexibility, it is preferable that the copolymer (A1) comprises:

5 to 50 mol %, preferably 5 to 48 mol % of the structural unit (i)

49.9 to 94.9 mol %, preferably 47.9 to 94.9 mol % of the structural unit (ii), and 0.1 to 10 mol %, preferably 0.1 to 5 mol %, more preferably 0.1 to 4.1 mol % of the structural unit (iii), provided that the total of the structural units (i), (ii), and (iii) is 100 mol %, and satisfies the following requirement (jj), in addition to at least the requirements (a) to (d).

(jj): The maximum value of loss tangent tan δ, as obtained by measuring a dynamic viscoelasticity thereof within a temperature range of −70 to 180° C. at a frequency of 10 rad/s, is within a temperature range of −50 to 40° C., and the maximum value of tan δ is 0.5 or more, preferably 1.0 or more, more preferably 1.5 or more, most preferably 2.0 or more. The above ranges are preferable because the copolymer has excellent stress absorption.

The copolymer (A1) has a ball drop resilience ratio, as obtained by dropping a rigid ball of 16.310 g from a height of 460 mm under a room temperature of 25° C. in accordance with JIS K6400, of 0 to 25%, preferably 0 to 20%, more preferably 0 to 15%. The above ranges are further preferable in terms of stress absorption.

The copolymer (A1) comprises, in terms of wt % instead of mol %, 10 to 67 wt %, preferably 18 to 49 wt % of a structural unit (i) derived from 4-methyl-1-pentene, 33 to 90 wt %, preferably 51 to 82 wt % of a structural unit (ii) derived from at least one kind of α-olefin selected from α-olefins having 2 to 20 carbon atoms excluding 4-methyl-1-pentene, and 0 to 23 wt % of a structural unit (iii) derived from a non-conjugated polyene, provided that the total of the structural units (i), (ii), and (iii) is 100 wt %.

A 4-methyl-1-pentene/α-olefin copolymer (A2) comprises:

33 to 80 mol %, preferably 50 to 75 mol % of the structural unit (i), 67 to 20 mol %, preferably 50 to 25 mol % of the structural unit (ii), and 0 to 10 mol %, preferably 0 to 5 mol % of the structural unit (iii), provided that the total of the structural units (i), (ii), and (iii) is 100 mol %; and satisfies any one or more of Shore A hardness and Shore D hardness in the following requirement (e1), in addition to at least the requirements (a) to (d).

The 4-methyl-1-pentene/α-olefin copolymer (A2) is preferable because of having excellent stress relaxation.

(e1): The difference ΔHS in Shore A hardness between immediately after the starting of indenter contact and 15 seconds after the starting of indenter contact is 15 to 50, preferably 20 to 50, more preferably 23 to 50; or the difference ΔHS in Shore D hardness between immediately after the starting of indenter contact and 15 seconds after the starting of indenter contact is 5 to 50, preferably 8 to 50, more preferably 10 to 50.

Further, in terms of stress relaxation and abrasion resistance, it is preferable that the copolymer (A2) has a percentage of change in gloss, as measured by abrasion using Gakushin-type rubbing tester, of 0 to 13, preferably 0 to 10.

A 4-methyl-1-pentene/α-olefin copolymer (A3) of the present invention satisfies at least the requirements (a) to (d) and comprises 5 to 95 mol % of the structural unit (i), 94.9 to 4.9 mol % of the structural unit (ii), and 0.1 to 10 mol % of the structural unit (iii), provided that the total of the structural units (i), (ii), and (iii) is 100 mol %.

The 4-methyl-1-pentene/α-olefin copolymer (A3) comprises:

the structural unit (i) preferably in an amount of 10 to 90 mol %, more preferably 15 to 85 mol %, still more preferably 15 to 70 mol %, the structural unit (ii) preferably in an amount of 89.9 to 2 mol %, more preferably 84.7 to 8 mol %, still more preferably 84.5 to 25 mol %, and the structural unit derived from a non-conjugated polyene (iii) preferably in an amount of 0.1 to 8 mol %, more preferably 0.3 to 7 mol %, still more preferably 0.5 to 5 mol %, provided that the total of the structural units (i), (ii), and (iii) is 100 mol %.

The melting point (d) of the 4-methyl-1-pentene/α-olefin copolymer (A3) can be varied arbitrarily by types and compositions of the comonomers. When the melting point is within the above range, flexibility and toughness are excellent.

In the present invention, examples of the α-olefin having 2 to 20 carbon atoms used in the 4-methyl-1-pentene/α-olefin copolymer include linear or branched α-olefins, cyclic olefins, aromatic vinyl compounds, conjugated dienes, and functionalized vinyl compounds, excluding 4-methyl-1-pentene. The α-olefin in the 4-methyl-1-pentene/α-olefin copolymer of the present invention does not include a non-conjugated polyene.

The linear α-olefins are those having 2 to 20 carbon atoms, preferably 2 to 15 carbon atoms, more preferably 2 to 10 carbon atoms, with examples thereof including ethylene, propylene, 1-butene, 1-pentene, 1-hexene, 1-octene, 1-decene, 1-undecene, 1-dodecene, 1-tetradecene, 1-hexadecene, 1-octadecene, and 1-eicosene; and ethylene, propylene, 1-butene, 1-pentene, 1-hexene, and 1-octene are preferable.

The branched α-olefins are those preferably having 5 to 20 carbon atoms, more preferably 5 to 15 carbon atoms, with examples thereof including 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

The cyclic olefins are those preferably having 3 to 20 carbon atoms, more preferably 5 to 15 carbon atoms, with examples thereof including cyclopentene, cyclohexene, cycloheptene, norbornene, 5-methyl-2-norbornene, tetracyclododecene, and vinyl cyclohexane.

Examples of the aromatic vinyl compound include styrene, and a mono- or a poly-alkyl styrene such as α-methyl styrene, o-methyl styrene, m-methyl styrene, p-methyl styrene, o,p-dimethyl styrene, o-ethyl styrene, m-ethyl styrene, and p-ethyl styrene.

The conjugated dienes are those having 4 to 20 carbon atoms, preferably 4 to 10 carbon atoms, with examples thereof including 1,3-butadiene, isoprene, chloroprene, 1,3-pentadiene, 2,3-dimethyl butadiene, 4-methyl-1,3-pentadiene, 1,3-hexadiene, and 1,3-octadiene.

Example of the functionalized vinyl compounds include hydroxyl group-containing olefins; halogenated olefins; unsaturated carboxylic acids such as (meth) acrylic acid, propionic acid, 3-butenoic acid, 4-pentenoic acid, 5-hexenoic acid, 6-heptenoic acid, 7-octenoic acid, 8-nonenoic acid, 9-decenoic acid, and 10-undecenoic acid; unsaturated amines such as allylamine, 5-hexeneamine, and 6-hepteneamine; (2,7-octadienyl) succinic anhydride, pentapropenyl succinic anhydride, unsaturated carboxylic acid anhydrides such as those obtained from the afore-mentioned unsaturated carboxylic acids; unsaturated carboxylic halides such as halogenated compounds obtained from the afore-mentioned unsaturated carboxylic acids; unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, and 11-epoxy-1-undecene; and ethylenic unsaturated silane compounds such as vinyl triethoxy silane, vinyl trimethoxy silane, 3-acryloxypropyl trimethoxy silane, γ-glycidoxypropyltripyl trimethoxy silane, γ-aminopropyl triethoxy silane, and γ-methacryloxypropyl trimethoxy silane.

The hydroxyl group-containing olefins are not particularly limited, as long as being hydroxyl group-containing olefin compounds, with examples thereof including hydroxyl group-terminated olefin compounds. Examples of the hydroxyl group-terminated olefin compounds include:

linear hydroxylated α-olefins having 2 to 20, preferably 2 to 15 carbon atoms, such as vinyl alcohols, allyl alcohols, hydroxylated 1-butene, hydroxylated 1-pentene, hydroxylated 1-hexene, hydroxylated 1-octene, hydroxylated 1-decene, hydroxylated 1-undecene, hydroxylated 1-dodecene, hydroxylated 1-tetradecene, hydroxylated 1-hexadecene, hydroxylated 1-octadecene, and hydroxylated 1-eicosene; and branched hydroxylated α-olefins having 5 to 20 carbon atoms, preferably 5 to 15 carbon atoms, such as hydroxylated 3-methyl-1-butene, hydroxylated 3-methyl-1-pentene, hydroxylated-4-methyl-1-pentene, hydroxylated 3-ethyl-1-pentene, hydroxylated 4,4-dimethyl-1-pentene, hydroxylated 4-methyl-1-hexene, hydroxylated 4,4-dimethyl-1-hexene, hydroxylated 4-ethyl-1-hexene, and hydroxylated 3-ethyl-1-hexene.

The halogenated olefins are halogenated α-olefins having an atom belonging to Group 17 of the periodic table, such as chlorine, bromine, and iodine, with examples thereof including:

linear halogenated α-olefins having 2 to 20 carbon atoms, preferably 2 to 15 carbon atoms, such as a halogenated vinyl, a halogenated 1-butene, a halogenated 1-pentene, a halogenated 1-hexene, a halogenated 1-octene, a halogenated 1-decene, a halogenated 1-dodecene, a halogenated 1-undecene, a halogenated 1-tetradecene, a halogenated 1-hexadecene, a halogenated 1-octadecene, and a halogenated 1-eicosene; and branched halogenated α-olefins having 5 to 20 carbon atoms, preferably 5 to 15 carbon atoms, such as a halogenated 3-methyl-1-butene, a halogenated 4-methyl-1-pentene, a halogenated 3-methyl-1-pentene, a halogenated 3-ethyl-1-pentene, a halogenated 4,4-dimethyl-1-pentene, a halogenated 4-methyl-1-hexene, a halogenated 4,4-dimethyl-1-hexene, a halogenated 4-ethyl-1-hexene, and a halogenated 3-ethyl-1-hexene.

The above α-olefins may be used in a single kind, or may be combined in two or more kinds.

In the present invention, particularly preferred are ethylene, propylene, 1-butene, 1-pentene, 1-hexene, 3-methyl-1-butene, 3-methyl-1-pentene, 1-octene, 1-decene, 1-undecene, 1-dodecene, 1-tetradecene, 1-hexadecene, 1-octadecene, 1-eicosene, norbornene, 5-methyl-2-norbornene, tetracyclododecene, and hydroxylated-1-undecene.

In the present invention, a non-conjugated polyene may be combined as needed.

The non-conjugated polyene has 5 to 20 carbon atoms, preferably 5 to 10 carbon atoms; and examples thereof include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene, dicyclopentadiene, cyclohexadiene, dicyclooctadiene, methylene norbornene, 5-vinyl norbornene, 5-ethylidene-2-norbornene, 5-methylene-2-norbornene, 5-vinylidene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norobornene, and 2-propenyl-2,2-norbornadiene.

As the non-conjugated polyenes, preferred are 5-vinylidene-2-norbornene and 5-ethylidene-2-norbornene.

Other copolymerization components may be contained therein to the degree not adversely affecting the object of the present invention; and the embodiments thereof are within a scope of the present invention.

In the present invention, in terms of flexibility, stress absorption, stress relaxation and the like, the linear α-olefins having 2 to 10 carbon atoms are preferable; and ethylene, propylene, 1-butene, 1-pentene, 1-hexene, and 1-octene are more preferable. In terms of providing high stress absorption and polyolefin modification property, ethylene and propylene are still more preferable; and propylene is particularly preferable.

<4-Methyl-1-pentene copolymer (AA)>

(a-1): A 4-methyl-1-pentene copolymer (AA) according to the present invention comprises:

5 to 95 wt % of a structural unit (i) derived from 4-methyl-1-pentene, and 5 to 95 wt % of a structural unit (ii) derived from at least one kind of α-olefin selected from α-olefins having 2 to 20 carbon atoms excluding 4-methyl-1-pentene, provided that the total of the structural units (i) and (ii) is 100 wt %.

(b-1) and (c-1): The copolymer (AA) comprises:

the structural unit (i) preferably in an amount of 10 to 90 wt %, more preferably 18 to 90 wt %, still more preferably 25 to 90 wt %, most preferably 30 to 85 wt %, particularly preferably 40 to 85 wt %, and the structural unit (ii) preferably in an amount of 10 to 90 wt %, more preferably 10 to 82 wt %, still more preferably 10 to 75 wt %, most preferably 15 to 70 wt %, particularly preferably 15 to 60 wt %, provided that the total of the structural units (i) and (ii) is 100 wt %.

The copolymer (AA) may comprise other copolymerization components to the degree not adversely affecting the object of the present invention; and the embodiments thereof are within a scope of the present invention.

(a-2): The copolymer (AA) has an intrinsic viscosity [η], as measured in 135° C. decalin, of 0.01 to 5.0 (dL/g), preferably 0.05 to 4.0 (dL/g), more preferably 0.1 to 3.0 (dL/g), still more preferably 0.5 to 2.5 (dL/g). The use of a catalyst described later can provide the polymer without impairing the molecular weight distribution. The combined use of hydrogen during polymerization, as described later, can control a molecular weight of the polymer and provide polymers having molecular weights ranging from low to high without limitation.

(a-3): The copolymer (AA) has a ratio (Mw/Mn) of a weight-average molecular weight (Mw) to a number-average molecular weight (Mn), as measured by gel permeation chromatography (GPC), in the range of 1.0 to 3.5, preferably 1.5 to 3.0, more preferably 1.5 to 2.5. A large Mw/Mn, raising a concern in terms of the influence of a composition distribution and a low-molecular weight polymer, may allow the polymer to exhibit mechanical properties, moldability, and abrasion resistance, and cause the polymer to have stickiness during molding operation. The Mw/Mn in the range of 1.5 to 2.5 is advantageous in exhibiting the above characteristics and thus is of a high industrial value. The use of a catalyst described later can provide the polymer having a Mw/Mn within the above range without impairing the molecular weight. If an application requires the 4-methyl-1-pentene copolymer (AA) to have a wide molecular weight distribution, this need can be satisfied by blending polymers differing in molecular weight, or by employing a multistep polymerization method, or the like.

The copolymer (AA) has a weight-average molecular weight (Mw) in terms of polystyrene, as measured by gel permeation chromatography (GPC), preferably in the range of 500 to 10,000,000, more preferably 1,000 to 5,000,000, still more preferably 1,000 to 2,500,000.

(b-2): The copolymer (AA) has a difference (change) ΔHS in Shore A hardness between immediately after the measurement and 15 seconds after the measurement being the range of 10 to 50, preferably 15 to 50, more preferably 20 to 50, Shore A hardness being measured using a press sheet thereof having a thickness of 3 mm in accordance with JIS K6253. These ranges are preferable in terms of stress absorption and stress relaxation.

(b-3): The copolymer (AA) preferably has a melting point (Tm), as measured by DSC, of lower than 110° C. or not observed, more preferably lower than 100° C. or not observed, still more preferably lower than 85° C. or not observed. The melting point can be varied arbitrarily by types and compositions of the comonomers. When the melting point is within the above range, flexibility and toughness are excellent.

The copolymer (AA) has a maximum value of loss tangent tan δ, as obtained by measuring a dynamic viscoelasticity thereof within a temperature range of −70 and 180° C. at a frequency of 10 rad/s, being within a temperature range of 0 to 40° C., the maximum value of tan δ being 0.5 or more, preferably 1.0 or more, more preferably 1.5 or more. The copolymer having the above ranges is preferable because of having excellent stress absorption.

Examples of the α-olefin having 2 to 20 carbon atoms used in the copolymer (AA), which examples exclude 4-methyl-1-pentene, include linear or branched α-olefins, cyclic olefins, aromatic vinyl compounds, conjugated dienes, non-conjugated polyenes, and functionalized vinyl compounds.

The linear α-olefins are those having 2 to 20 carbon atoms, preferably 2 to 15 carbon atoms, more preferably 2 to 10 carbon atoms, with examples thereof including ethylene, propylene, 1-butene, 1-pentene, 1-hexene, 1-octene, 1-decene, 1-undecene, 1-dodecene, 1-tetradecene, 1-hexadecene, 1-octadecene and 1-eicosene; and ethylene, propylene, 1-butene, 1-pentene, 1-hexene, and 1-octene are more preferable.

The branched α-olefins are those having 5 to 20 carbon atoms, preferably 5 to 15 carbon atoms, with examples thereof including 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

The cyclic olefins are those having 3 to 20 carbon atoms, preferably 5 to 15 carbon atoms, with examples thereof including cyclopentene, cyclohexene, cycloheptene, norbornene, 5-methyl-2-norbornene, tetracyclododecene, and vinylcyclohexane. With regard to the aromatic vinyl compounds, the conjugated dienes, the non-conjugated polyenes, the functionalized vinyl compounds and the like, the foregoing descriptions can be referred to.

The above α-olefins may be used in a single kind, or may be combined in two or more kinds.

In the present invention, particularly preferred are ethylene, propylene, 1-butene, 1-hexene, 3-methyl-1-butene, 3-methyl-1-pentene, 1-octene, 1-decene, 1-undecene, 1-dodecene, 1-tetradecene, 1-hexadecene, 1-octadecene, 1-eicosene, norbornene, 5-methyl-2-norbornene, tetracyclododecene, 5-vinylidene-2-norbornene, and 5-ethylidene-2-norbornene.

Other copolymerization components may be contained therein to the degree not adversely affecting the object of the present invention; and the embodiments thereof are within a scope of the present invention.

<Production Method>

Next, production methods of the 4-methyl-1-pentene/α-olefin copolymer and the 4-methyl-1-pentene copolymer, according to the present invention, are described.

To produce the copolymer according to the present invention, hitherto known catalysts are favorably used, such as magnesium-supported titanium catalysts, and metallocene catalysts as described in WO-A-01/53369, WO-A-01/027124, JP-A-3-193796, and JP-A-02-41303. More preferably, an olefin polymerization catalyst containing a metallocene catalyst represented by the following general formula (1) or (2) is favorably used.

[Formula 1]

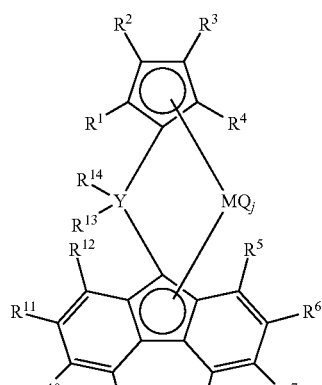

(1)

[Formula 2]

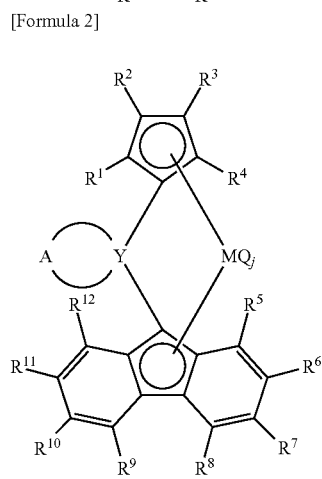

(2)

(In the formulae, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are selected from hydrogen, hydrocarbon groups, and hydrocarbon groups containing silicon, and may be the same as or different from each other; In $R^1$ to $R^4$, adjacent substituents may be bonded to each other to form a ring; In $R^5$ to $R^{12}$, adjacent substituents may be bonded to each other to form a ring;

A denotes a bivalent hydrocarbon group having 2 to 20 carbon atoms that may partially contain an unsaturated bond and/or an aromatic ring. A may contain two or more ring structures which include a ring formed by A and Y;

M denotes a metal selected from the Group 4 of the periodic table;

Y denotes carbon or silicon;

Q denotes a halogen, a hydrocarbon group, an anion ligand, or a neutral ligand to which lone-pair electrons can coordinate; and Qs may be the same as or different from each other; and j denotes an integer of from 1 to 4.)

$R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ in the general formula (1) or (2) are selected from hydrogen, hydrocarbon groups, and hydrocarbon groups containing silicon, and may be the same as or different from each other.

The hydrocarbon groups are preferably alkyl groups having 1 to 20 carbon atoms, arylalkyl groups having 7 to 20 carbon atoms, aryl groups having 6 to 20 carbon atoms, or alkylaryl groups having 7 to 20 carbon atoms. The hydrocarbon group may have one or more ring structures. A part of or an entirety of the hydrocarbon group may be substituted with a functional group such as a hydroxyl group, an amino group, a halogen group and a fluorine-containing hydrocarbon group. Specific examples include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydronaphthyl, phenyl, biphenyl, naphthyl, tolyl, chlorophenyl, chlorobiphenyl, and chloronaphthyl.

The hydrocarbon groups containing silicon are preferably alkylsilyl or arylsilyl groups each having 1 to 4 silicon atoms and 3 to 20 carbon atoms and specifically include trimethylsilyl, tert-butyldimethylsilyl, and triphenylsilyl.

The adjacent substituents in $R^5$ to $R^{12}$ on the fluorene ring may be bonded to each other to form a ring. Examples of such a substituted fluorenyl group include benzofluorenyl, dibenzofluorenyl, octahydrodibenzofluorenyl, and octamethyloctahydrodibenzofluorenyl.

The substituents in $R^5$ to $R^{12}$ on the fluorene ring preferably display bilateral symmetry, that is, $R^5=R^{12}$, $R^6=R^{11}$, $R^7=R^{10}$, and $R^8=R^9$ in terms of the easiness of synthesis. The fluorene ring is more preferably unsubstituted fluorene, 3,6-disubstituted fluorene, 2,7-disubstituted fluorene, or 2,3,6,7-tetrasubstituted fluorene. The positions 3, 6, 2, and 7 on the fluorene ring correspond to $R^7$, $R^{10}$, $R^6$, and $R^{11}$, respectively.

$R^{13}$ and $R^{14}$ in the general formula (1) are selected from hydrogen and hydrocarbon groups and may be the same as or different from each other. As preferred specific examples of the hydrocarbon groups, those described above can be mentioned.

Y denotes carbon or silicon. In the general formula (1), $R^{13}$ and $R^{14}$ are bonded to Y to form a substituted methylene group or a substituted silylene group as a crosslinking portion. Preferred specific examples include methylene, dimethyl methylene, diisopropyl methylene, methyl-tert-butyl methylene, dicyclohexyl methylene, methylcyclohexyl methylene, methylphenyl methylene, fluoromethylphenyl methylene, chloromethylphenyl methylene, diphenyl methylene, dichlorophenyl methylene, difluorophenyl methylene, methylnaphthyl methylene, dibiphenyl methylene, di-p-methylphenyl methylene, methyl-p-methylphenyl methylene, ethyl-p-methylphenyl methylene, dinaphthyl methylene or dimethyl silylene, diisopropyl silylene, methyl-tert-butyl silylene, dicyclohexyl silylene, methylcyclohexyl silylene, methylphenyl silylene, fluoromethylphenyl silylene, chloromethylphenyl silylene, diphenyl silylene, di-p-methylphenyl silylene, methyl-p-methylphenyl silylene, ethyl-p-methylphenyl silylene, methylnaphthyl silylene, and dinaphthyl silylene.

In the general formula (2), Y is bonded to A to form a cycloalkylidene group or a cyclomethylenesilylene group. A is a bivalent hydrocarbon group having 2 to 20 carbon atoms that may partially contain an unsaturated bond and/or an aromatic ring. Preferred specific examples include cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene, and cycloheptamethylenesilylene.

M in the general formulae (1) and (2) denotes a metal selected from the Group 4 of the periodic table. Examples of M include titanium, zirconium, and hafnium.

Q denotes a halogen, a hydrocarbon group having 1 to 20 carbon atoms, an anion ligand, or a neutral ligand to which lone-pair electrons can coordinate. Qs may be the same as or different from each other. Specific examples of the halogen include fluorine, chlorine, bromine, and iodine. Specific examples of the hydrocarbon group include those described above. Specific examples of the anion ligand include alkoxy groups, such as methoxy, tert-butoxy, and phenoxy, carboxylate groups, such as acetates and benzoates, and sulfonate groups, such as mesylates and tosylates. Specific examples of the neutral ligand to which lone-pair electrons can coordinate include organophosphorus compounds, such as trimethylphosphine, triethylphosphine, triphenylphosphine, and diphenylmethylphosphine, and ethers, such as tetrahydrofuran, diethyl ether, dioxane, and 1,2-dimethoxyethane. Qs may be the same as or different from each other. Preferably, at least one of Qs is a halogen or an alkyl group.

As specific examples of the metallocene compound in the present invention, preferred examples include compounds exemplified in WO-A-01/027124, WO-A-2006/025540, or WO-A-2007/308607. However, these compounds do not limit the scope of the present invention.

When using the metallocene catalyst for the production of the copolymer according to the present invention, the catalyst component comprises:

a metallocene compound (A) (for example, the metallocene compound represented by the general formula (1) or (2));
at least one compound (B) selected from:
an organoaluminum compound (B-1),
an organoaluminum oxy-compound (B-2), and
a compound (B-3) that reacts with the metallocene compound (A) to form an ion pair;
and, if necessary,
a fine particulate carrier (C).

As a production method, for example, a method described in WO-A-01/027124 is adoptable.

As specific examples of at least one compound (B) selected from the organoaluminum compound (B-1), the organoaluminum oxy-compound (B-2) and the compound (B-3) that reacts with the metallocene compound (A) to form an ion pair, and the fine particulate carrier (C), there can be mentioned compounds and carriers hitherto known as these components in the field of olefin polymerization, such as specific examples described in WO-A-01/027124.

In the present invention, polymerization can be performed by liquid-phase polymerization method, such as solution polymerization and suspension polymerization, or by gas-phase polymerization method.

In the liquid-phase polymerization method, an inert hydrocarbon solvent may be used, with specific examples including aliphatic hydrocarbons, such as propane, butane, pentane, hexane, heptane, octane, decane, dodecane, and kerosene; alicyclic hydrocarbons, such as cyclopentane, cyclohexane, and methylcyclopentane; aromatic hydrocarbons, such as benzene, toluene, and xylene; halogenated hydrocarbons, such as ethylene chloride, chlorobenzene, dichloromethane, trichloromethane and tetrachloromethane; and mixtures thereof.

Furthermore, bulk polymerization using 4-methyl-1-pentene and an α-olefin as a solvent can be performed.

Moreover, in the present invention, multistep polymerization in which polymerization conditions are varied between steps to obtain a copolymer with controlled composition distribution can be performed.

In polymerization, the amount of the component (A) usually ranges from $10^{-8}$ to $10^{-2}$ mol, preferably $10^{-7}$ to $10^{-3}$ mol, in terms of a metal atom of the Group 4 of the periodic table, per 1 L of reaction volume. The amount of the component (B-1) is such that the molar ratio [(B-1)/M] of the component (B-1) to a transition metal atom (M) in the component (A) usually ranges from 0.01 to 5000, preferably 0.05 to 2000. The amount of the component (B-2) is such that the molar ratio [(B-2)/M] of the component (B-2) to a transition metal atom (M) in the component (A) usually ranges from 10 to 5000, preferably 20 to 2000. The amount of the component (B-3) is such that the molar ratio [(B-3)/M] of the component (B-3) to a transition metal atom (M) in the component (A) usually ranges from 1 to 10, preferably 1 to 5.

The polymerization temperature usually ranges from −50 to 200° C., preferably 0 to 150° C., more preferably 20 to 100° C.

The polymerization pressure usually ranges from ordinary pressure to a gauge pressure of 10 MPa, preferably from ordinary pressure to a gauge pressure of 5 MPa. The polymerization reaction can be performed by any process of batch, semicontinuous and continuous processes. The polymerization can be performed also in two or more steps differing in reaction conditions.

In polymerization, hydrogen may be added to control the molecular weight of a polymer to be generated, or polymerization activity. The amount of hydrogen ranges from about 0.001 to 100 NL per 1 kg of the copolymer.

In the copolymer according to the present invention, part of the copolymer may be graft modified with a polar monomer. Examples of the polar monomer include ethylenic unsaturated compounds containing a hydroxyl group, ethylenic unsaturated compounds containing an amino group, ethylenic unsaturated compounds containing an epoxy group, aromatic vinyl compounds, unsaturated carboxylic acids or derivatives thereof, vinyl ester compounds, vinyl chloride, organosilicon compounds containing a vinyl group, and carbodiimide compounds.

As the polar monomer, particularly preferred are unsaturated carboxylic acids or derivatives thereof, and organosilicon compounds containing a vinyl group.

Examples of the unsaturated carboxylic acids or derivatives thereof include unsaturated compounds having at least one carboxylic acid group, esters of the compounds having a carboxylic acid group and alkyl alcohols, and unsaturated compounds having at least one carboxylic acid anhydride group. Examples of the unsaturated group include a vinyl group, a vinylene group, and an unsaturated cyclic hydrocarbon group. As these compounds, those hitherto known can be used without particular limitation. Specific examples thereof include unsaturated carboxylic acids such as (meth) acrylic acid, maleic acid, fumaric acid, tetrahydrophthalic acid, itaconic acid, citraconic acid, crotonic acid, isocrotonic acid, and nadic acid [trademark] (endocis-bicyclo[2.2.1] hepto-5-en-2,3-dicarboxylic acid); or derivatives thereof such as acid halides, amides, imides, anhydrides and esters. Specific examples of the derivatives include methyl acrylate, methyl methacrylate, dimethyl maleate, monomethyl maleate, dimethyl fumarate, dimethyl itaconate, diethyl citraconate, dimethyl tetrahydrophthalate, dimethyl nadicate (dimethyl endocis-bicyclo[2,2,1]hepto-5-en-2,3-dicarboxylate), malenyl chloride, maleimide, maleic anhydride, citraconic anhydride, monomethyl maleate, dimethyl maleate, and glycidyl maleate. These unsaturated carboxylic acids and derivatives thereof may be used in a single kind, or may be combined in two or more kinds. Of these, unsaturated dicarboxylic acids or acid anhydrides thereof are preferred. In particular, maleic acid, nadic acid [trademark], or acid anhydrides thereof are preferably used.

As the organosilicon compounds containing a vinyl group, hitherto known compounds are employable without particular limitation. Specific employable examples include vinyltriethoxysilane, vinyltrimethoxysilane; vinyltris(β-methoxy-ethoxysilane), γ-glycidoxypropyl-tripyltrimethoxysilane, γ-aminopropyltriethoxysilane, γ-methacryloxypropyltrimethoxysilane, 2-(3,4-epoxycyclohexyl) ethyltrimethoxysilane, 3-glycidoxypropyltrimethoxysilane, 3-glycidoxypropylmethylethoxysilane, p-styryltrimethoxysilane, 3-methacryloxypropylmethyldimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-triethoxysilyl-N-(1,3-dimethylbutylidene)propylamine, N-phenyl-3-aminopropyltrimethoxysilane, 3-ureidopropyltriethoxysilane, and 3-isocyanatepropyltriethoxysilane. Preferred examples include γ-glycidoxypropyltripyltrimethoxysilane, γ-aminopropyltriethoxysilane, γ-methacryloxypropyltrimethoxysilane, vinyltriethoxysilane, vinyltrimethoxysilane, and 3-acryloxypropyltrimethoxysilane. More preferred examples include vinyltriethoxysilane, vinyltrimethoxysilane, and 3-acryloxypropyltrimethoxysilane, which have small steric hindrance and high graft modification efficiency.

The polar monomer is used usually in an amount of 1 to 100 parts by weight, preferably 5 to 80 parts by weight based on 100 parts by weight of the copolymer according to the present invention.

The polar monomer may be used in a single kind, or may be combined in two or more kinds.

This graft polymerization is carried out usually in the presence of a radical initiator.

As the radical initiator, organic peroxides, azo compounds, or the like are employable.

Specific examples thereof include:
dialkyl peroxides such as dicumyl peroxide, di-t-butyl peroxide, di-t-butylperoxy-3,3,5-trimethylcyclohexane, t-butylcumylperoxide, di-t-amylperoxide, t-butylhydroperoxide, 2,5-dimethyl-2,5-di(t-butylperoxy)hexyne-3,2,5-dimethyl-2,5-di(benzoylperoxy)hexane, 2,5-dimethyl-2,5-di(t-butylperoxy)hexane, and α,α'-bis(t-butylperoxy-m-isopropyl)benzene;

peroxyesters such as t-butylperoxyacetate, t-butylperoxyisobutylate, t-butylperoxypivalate, t-butylperoxymaleic acid, t-butylperoxyneodecanoate, t-butylperoxybenzoate, and di-t-butylperoxyphthalate;

ketone peroxides such as dicyclohexanone peroxide; and mixtures thereof.

The radical initiator may be directly mixed with the copolymer and the polar monomer and then used, but may be dissolved in a slight amount of an organic solvent and then used. This organic solvent is not particularly limited as long as being an organic solvent capable of dissolving the radical initiator.

In the graft polymerization with the polar monomer, a reductive substance may be used. The use of the reductive substance can improve the graft amount of the polar monomer.

The graft polymerization can be performed by hitherto known methods, for example in such a manner that the copolymer is dissolved in an organic solvent, and into the solution, the polar monomer, the radical initiator and the like are added; and then the resultant solution is reacted at a temperature of 60 to 200° C., preferably 80 to 260° C., for 0.5 to 15 hours, preferably 1 to 10 hours.

Alternatively, the copolymer can be reacted with the polar monomer with no solvent using an extruder or the like. This reaction is desirably performed usually for 0.5 to 10 minutes, usually at a temperature which is a melting point or higher of the ethylene polymer, specifically at a temperature of 120 to 250° C.

The modification amount of the copolymer thus obtained (the graft amount of the polar monomer) is usually 0.1 to 50 wt %, preferably 0.2 to 30 wt %, more preferably 0.2 to 10 wt %.

In the present invention, when the copolymer comprises the graft modified copolymer, the copolymer has excellent adhesion and compatibility with other resins, and can provide surfaces of articles with improved wetting property.

The graft modified copolymer, through being crosslinked, can be used favorably for crosslinked wires and crosslinked pipes.

In crosslinking at least a part of or an entirety of the copolymer using a crosslinking agent, the crosslinking agent is not particularly limited, and examples thereof include sulfur, organic peroxides, and SiH group-containing compounds.

Examples of the crosslinking agent include organic peroxides such as dicumyl peroxide, 2,5-dimethyl-2,5-tert-butylperoxyhexyne, sulfur, and morpholine disulfide. These may be used together with crosslinking assistants such as stearic acid and zinc oxide.

If sulfur is used, sulfur is used preferably in an amount of 0.1 to 10 parts by weight based on 100 parts by weight of the copolymer. If the organic peroxide is used, the organic peroxide is used preferably in an amount of 0.05 to 15 parts by weight based on 100 parts by weight of the copolymer. If the SiH group-containing compound is used, the SiH group-containing compound is used in an amount of 0.2 to 20 parts by weight, preferably in an amount of 0.5 to 10 parts by weight, most preferably in an amount of 0.5 to 5 parts by weight based on 100 parts by weight of the copolymer. The use of the SiH group-containing compound may be the addition of a catalyst, and as an optional component, a silane coupling agent and/or a reaction inhibitor.

In the present invention, the copolymer may have a nucleating agent blended therein, in order to further improve its moldability, i.e., in order to raise the crystallization temperature and increase the crystallization rate. Examples of the nucleating agent include dibenzylidene sorbitol-based nucleating agents, phosphate-based nucleating agents, rosin-based nucleating agents, benzoic acid metal salt-based nucleating agents, fluorinated polyethylene, 2,2-methylenebis(4,6-di-t-butylphenyl)sodium phosphate, pimelic acid and a salt thereof, and 2,6-naphthalene acid dicarboxylic acid dicyclohexyl amide. The blending amount is not particularly limited, but is preferably 0.1 to 1 part by weight based on 100 parts by weight of the copolymer. The nucleating agent can be arbitrarily added during polymerization, after polymerization, or in mold processing.

The copolymer according to the present invention may have additives blended therein, such as weathering stabilizers, heat stabilizers, anti-static agents, anti-slip agents, anti-blocking agents, blowing agents, crystallization assistants, anti-fogging agents, (transparent) nucleating agents, lubricants, pigments, dyes, plasticizers, anti-aging agents, hydrochloric acid absorbents, antioxidants, releasing agents, impact modifiers, anti-UV agents (ultraviolet absorbents), fillers, crosslinking agents, co-crosslinking agents, crosslinking assistants, adhesives, softeners, flame retardants, and processing assistants, according to necessity, to the degree not adversely affecting the properties of the modified product.

Specific examples of the additives include 2,6-di-t-butyl-p-cresol, tetrakis[methylene-3-(3,5-di-t-butyl-4-hydroxyphenyl)propionate]methane, 4,4'-butylidenebis(6-t-butyl-m-cresol), tocophenols, ascorbic acid, dilaurylthiodipropionate, phosphoric acid based stabilizers, fatty acid monoglyceride, N,N-[bis-2-hydroxyethyl]alkylamines, 2-(2'-hydroxy-3',5'-di-t-butylphenyl)-5-chlorobenzotriazole, calcium stearate, magnesium oxide, magnesium hydroxide, alumina, aluminum hydroxide, silica, clay, gypsum, glass fibers, titania, calcium carbonate, and carbon black.

As the softeners, softeners hitherto known are employable, with examples including:

Petroleum-based substances, such as process oil, lubricating oil, paraffins, liquid paraffin, polyethylene wax, polypropylene wax, petroleum asphalt and vaseline;

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids, such as ricinolic acid, palmitic acid, stearic acid, 12-stearate hydroxide, montanic acid, oleic acid, and erucic acid, or metal salts thereof;

synthetic polymer materials, such as petroleum resins, coumarone-indene resins and atactic polypropylene;

ester-based plasticizers, such as dioctyl phthalate, dioctyladipate and dioctylsebacate;

others, such as microcrystalline wax, liquid polybutadiene, modified products or hydrogenated products thereof; and liquid thiokol.

<4-Methyl-1-pentene/α-olefin copolymer compositions (X), (X11), (X12), (X21), and (X22)>

A 4-methyl-1-pentene/α-olefin copolymer composition (X) according to the present invention comprises:

5 to 95 parts by weight, preferably 10 to 90 parts by weight, more preferably 20 to 80 parts by weight of the 4-methyl-1-pentene/α-olefin copolymer (A), and 95 to 5 parts by weight, preferably 90 to 10 parts by weight, more preferably 80 to 20 parts by weight of a thermoplastic resin (B) described later, provided that the total of (A) and (B) is 100 parts by weight.

The composition comprising the copolymer and the resin within the above ranges is excellent in moldability, flexibility, vibration damping properties, stress absorption, scratch resistance, abrasion resistance, mechanical properties, and toughness.

A 4-methyl-1-pentene/α-olefin copolymer composition (X11) or (X12) comprises:

a 4-methyl-1-pentene/α-olefin copolymer satisfying at least the requirements (a) to (d) and comprising 10 to 32 mol %, preferably 15 to 32 mol % of the structural unit (i), 68 to 90 mol %, preferably 68 to 85 mol % of the structural unit (ii), and 0 to 10 mol % of the structural unit (iii), provided that the total of the structural units (i), (ii), and (iii) is 100 mol %, and a thermoplastic resin (B), in the above-described ranges.

In terms of flexibility and mechanical properties, it is preferable that the copolymer composition (X11) comprises:

50 to 95 parts by weight, preferably 55 to 90 parts by weight, more preferably 60 to 80 parts by weight of the copolymer (A), and 5 to 50 parts by weight, preferably 10 to 45 parts by weight, more preferably 20 to 40 parts by weight of the thermoplastic resin (B) described later, provided that the total of (A) and (B) is 100 parts by weight.

In terms of providing excellent stress absorption, it is preferable that the copolymer composition (X11) satisfies the following requirement (j1).

(j1): The maximum value of loss tangent tan δ, as obtained by measuring a dynamic viscoelasticity thereof within a temperature range of −70 to 180° C. at a frequency of 10 rad/s, is within a temperature range of −70 to 180° C., preferably −50 to 40° C., more preferably −20 to 40° C., and the maximum value of tan δ is 0.4 or more, preferably 0.4 to 5.0, more preferably 0.5 to 5.0, still more preferably 0.7 to 5.0.

In terms of providing flexibility and mechanical properties, it is preferable that the copolymer composition (X11) satisfies the following requirement (e1).

(e1): The change ΔHS in Shore A hardness between immediately after the measurement and 15 seconds after the measurement is 5 to 50, preferably 8 to 50.

In terms of heat resistance and mechanical properties, it is preferable that the copolymer composition (X12) comprises:

5 parts by weight to less than 49 parts by weight, preferably 5 parts by weight to less than 40 parts by weight, more preferably 10 parts by weight to less than 30 parts by weight of the copolymer, and 51 to 95 parts by weight, preferably 60 to 95 parts by weight, more preferably 70 to 90 parts by weight of the thermoplastic resin (B) described later, provided that the total of the copolymer and the thermoplastic resin (B) is 100 parts by weight.

In addition, it is preferable that the composition (X12) satisfies the following requirements.

(f): The softening temperature is in the range of 100 to 250° C., preferably 105 to 250° C.

(g): The tensile modulus (YM) is 300 to 2000 MPa, preferably 400 to 2000 MPa, more preferably 500 to 1800 MPa.

The composition having a softening temperature and a tensile modulus being within the above ranges is excellent in e.g., heat resistance, toughness and surface tension. The softening temperature can be controlled by e.g., compositional ratio in each composition. The composition having a softening temperature within the above range is excellent in e.g., heat resistance, toughness and mechanical properties.

In terms of providing flexibility and mechanical properties, it is more preferable that the copolymer composition (X11 or X12) further satisfies the following requirement (h1).

(h1): The melting point [Tm], as measured by differential scanning calorimetry (DSC), is observed within a temperature range of 50 to 250° C., more preferably in the range of 70 to 250° C.

A 4-methyl-1-pentene/α-olefin copolymer composition (X21) or (X22) comprises:

a 4-methyl-1-pentene/α-olefin copolymer satisfying at least the requirements (a) to (d) and comprising 33 to 80 mol %, preferably 50 to 75 mol % of the structural unit (i), 67 to 20 mol %, preferably 50 to 25 mol % of the structural unit (ii), and 0 to 10 mol %, preferably 0 to 5 mol % of the structural unit (iii), provided that the total of the structural units (i), (ii), and (iii) is 100 mol %, and a thermoplastic resin (B), in the above-described ranges.

In terms of heat resistance, stress relaxation, stress absorption, and mechanical properties, it is preferable that the copolymer composition (X21) comprises:

50 parts by weight to less than 95 parts by weight, preferably 55 to 90 parts by weight, more preferably 60 to 80 parts by weight of the copolymer, and 5 to 50 parts by weight, preferably 10 to 45 parts by weight, more preferably 20 to 40 parts by weight of the thermoplastic resin (B) described later, provided that the total of the copolymer and the thermoplastic resin (B) is 100 parts by weight.

In terms of providing excellent stress relaxation, the copolymer composition (X21) satisfies any one or more of Shore A hardness and Shore D hardness in the flowing requirement (e2).

(e2): The difference ΔHS in Shore A hardness defined by the following equation (measured using a press sheet thereof having a thickness of 3 mm in accordance with JIS $K_{6253}$) is 10 to 50, preferably 15 to 50, more preferably 20 to 50; or the difference ΔHS in Shore D hardness between immediately after the starting of indenter contact and 15 seconds after the starting of indenter contact is 5 to 50, preferably 8 to 50, more preferably 10 to 50.

ΔHS=(Shore $A$ or $D$ hardness immediately after the starting of indenter contact−Shore $A$ or $D$ hardness 15 seconds after the starting of indenter contact).

In terms of flexibility and mechanical properties, it is preferable that the copolymer composition (X22) comprises:

5 to 49 parts by weight, preferably 5 to less than 40 parts by weight, more preferably 10 to less than 30 parts by weight of the copolymer (A), and 50 to 95 parts by weight, preferably 60 to 95 parts by weight, more preferably 70 to 90 parts by weight of the thermoplastic resin (B) described later, provided that the total of (A) and (B) is 100 parts by weight.

<Thermoplastic Resin (B)>

The thermoplastic resin (B) used in the present invention is not particularly limited as long as being different from the 4-methyl-1-pentene/α-olefin copolymer according to the present invention and the 4-methyl-1-pentene copolymer according to the present invention. Examples thereof include resins described below. In the present invention, the examples of the thermoplastic resin (B) include elastomers and copolymer rubbers.

Thermoplastic polyolefin resins (excluding the polymers according to the present invention; and the same is applied hereinafter), such as low-density polyethylene, medium-density polyethylene, high-density polyethylene, low-density polyethylene by high pressure process, isotactic polypropylene, syndiotactic polypropylene, poly(1-butene), poly (4-methyl-1-pentene), poly(3-methyl-1-butene), ethylene/α-olefin copolymers, propylene/α-olefin copolymers, 1-butene/α-olefin copolymers, cyclic olefin copolymers, and chlorinated polyolefins;

thermoplastic polyamide resins, such as aliphatic polyamides (nylon 6, nylon 11, nylon 12, nylon 66, nylon 610, and nylon 612);

thermoplastic polyester resins, such as polyethylene terephthalate, polybutylene terephthalate, and polyester elastomers;

thermoplastic vinyl aromatic resins, such as polystyrene, AHS resin, AS resin, styrene-based elastomers (styrene/butadiene/styrene block polymer, styrene/isoprene/styrene block polymer, styrene/isobutylene/styrene block polymer, and hydrogenated products of the above polymers);

thermoplastic polyurethanes; vinyl chloride resin; vinylidene chloride resin; acryl resin; ethylene/vinyl acetate copolymer; ethylene/methacrylate (acrylate)copolymer; ionomers; ethylene/vinyl alcohol copolymers; polyvinyl alcohols; fluorine-based resin polycarbonates; polyacetals; polyphenylene oxide; polyphenylene sulfide polyimides; polyarylates; polysulfones; polyether sulfones; rosin-based resins; terpene-based resins; and petroleum resins, and copolymer rubbers, such as ethylene/α-olefin/diene copolymers, propylene/α-olefin/diene copolymers, 1-butene/α-olefin/diene copolymers, polybutadiene rubber, polyisoprene rubber, neoprene rubber, nitrile rubber, butyl rubber, polyisobutylene rubber, natural rubbers, and silicone rubber.

Examples of the polypropylene include an isotactic polypropylene and a syndiotactic polypropylene. The isotactic polypropylene may be a homopolypropylene, a random copolymer of propylene with an α-olefin having 2 to 20 carbon atoms (excluding propylene), or a propylene block copolymer.

The poly(4-methyl-1-pentene) herein is different from the above-described copolymer, and examples thereof include a 4-methyl-1-pentene homopolymer, and a 4-methyl-1-pentene/α-olefin random copolymer containing 4-methyl-1-pentene in an amount of 80 to 99.9 wt %, preferably 90 to 99.9 wt % and an α-olefin having 2 to 20, preferably 6 to 20 carbon atoms, in an amount of 0.1 to 20 wt %, preferably 0.1 to 10 wt %. In the case of the 4-methyl-1-pentene/α-olefin random copolymer, examples of the α-olefin to be copolymerized with 4-methyl-1-pentene include an α-olefin having 2 to 20, preferably 6 to 20 carbon atoms, such as ethylene, propylene, 1-butene, 1-hexene, 1-octene, 1-decene, 1-dodecene, 1-tetradecene, 1-hexadecene, 1-octadecene, and 1-eicosene. These may be used in a single kind or in a combination of two or more kinds. The poly(4-methyl-1-pentene) desirably has amelt flow rate (MFR; ASTM D1238, 260° C., 5.0 kg load) of 0.1 to 200 g/10 minutes, preferably 1 to 150 g/10 minutes. The poly(4-methyl-1-pentene) may be a commercially available product, with examples thereof including TPX (trade name, manufactured by Mitsui Chemicals, Inc.) Products of poly(4-methyl-1-pentene) available from other manufacturers can be suitably used as long as satisfying the above requirement.

Examples of the polyethylene employable include those produced by a hitherto known technique, such as low-density polyethylene, medium-density polyethylene, high-density polyethylene, and low-density polyethylene by high pressure process.

The polybutene is a 1-butene homopolymer, or a copolymer of 1-butene and an olefin excluding 1-butene. Examples of the olefin are those described above, and these olefins are used in a single kind, or are combined in two or more kinds. Examples of the copolymer include 1-butene/ethylene random copolymer, 1-butene/propylene random copolymer, 1-butene/methylpentene copolymer, 1-butene/methylbutene copolymer, and 1-butene/propylene/ethylene copolymer. In these copolymers, in terms of heat resistance, the content of 1-butene is preferably 50 mol % or more, more preferably 70 mol % or more, most preferably 85 mol % or more.

Examples of the rosin-based resin include natural rosins, polymerized rosins, rosins modified with maleic acid, fumaric acid, (meth)acrylic acid or the like, and rosin derivatives. Examples of the rosin derivatives include esterified compounds of the natural rosins, the polymerized rosins or the modified rosins; phenol-modified compounds of these rosins; esterified compounds thereof; and hydrogenated products of these rosins.

Examples of the terpene-based resins include resins composed of, e.g., α-pinene, β-pinene, limonene, dipentene, terpene phenol, terpene alcohols and terpene aldehyde; aromatic-modified terpene-based resins obtained by polymerizing α-pinene, β-pinene, limonene, dipentene or the like, with an aromatic monomer such as styrene; and hydrogenated products of these resins.

Examples of the petroleum resins include aliphatic petroleum resins obtained using a C5 fraction of a tar naphtha as a main raw material, aromatic petroleum resins obtained using a C9 fraction of a tar naphtha as a main raw material, and copolymerized petroleum resins thereof: i.e., C5 petroleum resins (resins obtained by polymerizing the C5 fraction of a naphtha crack oil), C9 petroleum resins (resins obtained by polymerizing the C9 fraction of a naphtha crack oil), and C5-C9 copolymerized petroleum resins (resins obtained by copolymerizing the C5 fraction and the C9 fraction of a naphtha crack oil). Further examples include coumarone/indene resins containing e.g., styrenes, indenes, coumarone, and dicyclopentadiene, as a tar naphtha fraction; alkyl phenol resins represented by a condensation product between p-tert-butyl phenol and acetylene; and xylene resins obtained by reacting o-xylene, p-xylene, or m-xylene with formalin.

It is preferable that one or more kinds of resins selected from the group consisting of the rosin-based resin, the terpene-based resin and the petroleum resin are hydrogenated derivatives thereof, which have excellent weather resistance and discoloration resistance. The-above described resin has a softening temperature, as measured by a ring-and-ball method, preferably in the range of 40 to 180° C. The-above described resin has a number-average molecular weight (Mn), as measured by GPC, preferably in the range of about 100 to 10,000. One or more kinds of resins selected from the group consisting of the rosin-based resin, the terpene-based resin, and the petroleum resin may be commercially available products.

Further, these resins may be commercially available products.

Among these thermoplastic resins (B), preferable resins are low-density polyethylene, medium-density polyethylene, high-density polyethylene, low-density polyethylene by high pressure process, isotactic polypropylene, syndiotactic polypropylene, poly(1-butene), poly(4-methyl-1-pentene), poly(3-methyl-1-pentene), ethylene/α-olefin copolymers, propylene/α-olefin copolymers, 1-butene/α-olefin copolymers, styrene-based elastomers, vinyl acetate copolymer, ethylene/methacrylate (acrylate) copolymer, ionomers, fluorine-based resins, rosin-based resins, terpene-based resins, and petroleum resins. In terms of improvement of heat resistance and low-temperature resistance, and flexibility, more preferred are polyethylene, isotactic polypropylene, syndiotactic polypropylene, poly(1-butene), poly(4-methyl-1-pentene), ethylene/α-olefin copolymers, propylene/α-olefin copolymers, 1-butene/α-olefin copolymers, vinyl acetate copolymer, styrene-based elastomers, rosin-based resins, terpene-based resins, and petroleum resins.

In the copolymer composition of the present invention, these thermoplastic resins can be used in a single kind, or may be combined in two or more kinds.

In the present invention, as the thermoplastic resin (B), it is preferable to use a crystalline olefin resin (B1) in terms of heat resistance and moldability. In the present invention, "a crystalline olefin resin" means a resin having a melting point as measured by DSC of 70° C. or higher.

The density of the resin (B1), although not particularly limited, is preferably 0.850 g/cm$^3$ or higher, more preferably 0.855 g/cm$^3$ or higher, still more preferably 0.870 to 0.980 g/cm$^3$ (ASTM D1505).

The crystalline olefin resins (B1) are, among the above-described thermoplastic resins (B), particularly those having a crystallinity; and examples thereof include low-density polyethylene, medium-density polyethylene, high-density polyethylene, low-density polyethylene by high pressure process, isotactic polypropylene, syndiotactic polypropylene, poly(1-butene), poly(4-methyl-1-pentene), poly(3-methyl-1-pentene), ethylene/α-olefin copolymers, propylene/α-olefin copolymers, 1-butene/α-olefin copolymers, and styrene-based elastomers; and preferable examples include polypropylene, poly(4-methyl-1-pentene), polyethylene, and polybutene.

<Graft Modification>

With regard to the 4-methyl-1-pentene/α-olefin copolymer compositions (X) to (X22) of the present invention, at least a part or an entirety thereof may be graft-modified with a polar monomer.

For example, a part or an entirety of the copolymer according to the present invention may be graft modified, a part or an entirety of the resin (B) according to the present invention may be graft modified, or a part or an entirety of each of the copolymer and the resin (B) according to the present invention may be graft modified.

With regard to the polar monomer to be used, the foregoing descriptions can be referred to.

With regard to the polar monomer, an unsaturated carboxylic acid or a derivative thereof is preferable. With regard to the unsaturated carboxylic acid or the derivative thereof, the foregoing descriptions can be referred to.

The polar monomer is used usually in an amount of 1 to 100 parts by weight, preferably 5 to 80 parts by weight, based on 100 parts by weight of a product to be modified. This graft polymerization is carried out usually in the presence of a radical initiator. With regard to the radical initiator, the foregoing descriptions can be referred to.

When the product to be modified is graft-polymerized with the polar monomer, a reductive substance may be used. The use of the reductive substance can improve the graft amount of the polar monomer.

The graft polymerization can be performed by hitherto known methods, for example in such a manner that the product to be modified is dissolved in an organic solvent, and into the solution, the polar monomer, the radical initiator and the like are added; and then the resultant solution is reacted at a temperature of 40 to 250° C., preferably 60 to 200° C., for 0.5 to 20 hours, preferably 1 to 15 hours.

The graft amount of the modified product thus obtained is usually 0.1 to 50 wt %, preferably 0.2 to 30 wt %, more preferably 0.2 to 20 wt %, based on 100 wt % of the modified product.

The graft-modified copolymer composition may have polymers other than the 4-methyl-1-pentene/α-olefin copolymer, the 4-methyl-1-pentene copolymer, and the thermoplastic resin (B) of the present invention, blended therein, such as thermoplastic resins and elastomers, to the degree not adversely affecting the properties of the modified product. They may be blended in a graft modification step or be mixed after the modification.

<Crosslinking>

At least a part or an entirety of the copolymer compositions (X) to (X22) of the present invention may be crosslinked with a crosslinking agent. The crosslinking agent is not particularly limited, with examples thereof including sulfur, organic peroxides, and SiH-containing compounds. With regard to the crosslinking method and the crosslinking agent, the foregoing descriptions can be referred to.

<Additives>

The copolymer composition according to the present invention may have various additives blended therein in molding operation, to the degree not adversely affecting the object of the present invention. With regard to the additives, the foregoing descriptions can be referred to.

The copolymer composition according to the present invention may further comprise thermoplastic resins other than the 4-methyl-1-pentene/α-olefin copolymer, the 4-methyl-1-pentene copolymer and the thermoplastic resin (B) of the present invention, to the degree not adversely affecting the object of present invention. With regard to the other thermoplastic resins, the same resin as the resin (B) can be used.

<4-Methyl-1-pentene copolymer composition (Y)>

A 4-methyl-1-pentene copolymer composition (Y) according to the present invention comprises:

50 to 98 parts by weight, preferably 50 to 96 parts by weight, more preferably 50 to 90 parts by weight of the 4-methyl-1-pentene copolymer (AA), 1 to 49 parts by weight, preferably 2 to 48 parts by weight, more preferably 5 to 45 parts by weight of a crystalline olefin resin (BB) (melting point of 100° C. or higher) other than the 4-methyl-1-pentene copolymer (AA), and 1 to 49 parts by weight, preferably 2 to 48 parts by weight, more preferably 5 to 45 parts by weight of an α-olefin copolymer (CC) (melting point of lower than 100° C.) other than the 4-methyl-1-pentene copolymer (AA), provided that the total of (AA), (BB), and (CC) is 100 parts by weight.

The copolymer composition with the components contained within the above ranges is preferable, particularly because of having excellent moldability, and further because of having excellent flexibility, vibration damping properties, stress absorption, scratch resistance, abrasion resistance, mechanical properties, and toughness.

In terms of flexibility and stress relaxation, it is preferable that the copolymer composition (Y) has:

a difference ΔHS in Shore A hardness between immediately after the starting of indenter contact and 15 seconds after the starting of indenter contact being 10 to 50, more preferably 15 to 50, still more preferably 20 to 50 (Shore A hardness is measured using a press sheet thereof having a thickness of 3 mm in accordance with JIS K6253); or a difference ΔHS in Shore D hardness between immediately after the starting of indenter contact and 15 seconds after the starting of indenter contact being 5 to 50, more preferably 8 to 50, still more preferably 10 to 50 (Shore D hardness is measured using a press sheet thereof having a thickness of 3 mm in accordance with JIS K6253).

It is preferable that the composition (Y) satisfies anyone or more of ΔHS in Shore A hardness and ΔHS in Shore D hardness.

The copolymer composition (Y) preferably has a ball drop resilience ratio, as obtained by dropping a rigid ball of 16.310 g from a height of 460 mm under a room temperature of 25° C. in accordance with JIS K6400, of 30% or less, more preferably 28% or less, still more preferably 25% or less.

The ball drop resilience ratio can be controlled by comonomer compositional ratio in the copolymer (AA), mixing ratio in the copolymer composition (Y), and the like. For example, when the content of 4-methyl-1-pentene in the copolymer (AA) is 85 wt % or less, vibration damping properties and stress relaxation are excellent.

The copolymer composition (Y) has a peak value of loss tangent (tan δ) due to a glass transition temperature, as obtained by measuring temperature dependency of a dynamic viscoelasticity thereof (frequency: 10 rad/s, −70 to 180° C.), preferably being 0.5 or more, more preferably 0.8 or more, still more preferably 1.0 or more. The temperature giving the maximum value of tan δ is −10 to 40° C., preferably 0 to 40° C.

The copolymer composition having a maximum value of tan δ being within this range can exhibit excellent stress absorption and vibration damping properties. The maximum value of tan δ can be controlled by comonomer compositional ratio in the copolymer (AA), mixing ratio in the copolymer composition (Y), and the like. For example, controlling the content of 4-methyl-1-pentene so as to be within 10 to 80 wt % can make the maximum value of tan δ be within the above range.

The copolymer composition (Y) according to the present invention may have various additives blended therein as needed, to the degree not adversely affecting the object of the present invention. With regard to the additives, the foregoing descriptions can be referred to.

The copolymer composition (Y) according to the present invention may contain rosin-based resins, terpene-based resins, petroleum resins and the like, to the degree not adversely affecting the object of the present invention. With regard to these resins, the foregoing descriptions can be referred to.

<Crystalline Olefin Resin (BB)>

The crystalline olefin resin (BB) used in the present invention is employed without particular limitation as long as being an olefin resin having crystallinity and excluding the 4-methyl-1-pentene/α-olefin copolymers (A) to (A3) and the 4-methyl-1-pentene copolymer (AA) according to the present invention. The crystalline olefin as used herein means a crystalline olefin having a melting point of 100° C. or higher, preferably 110° C. or higher, and is distinguished from an α-olefin polymer (CC), described later, in terms of a melting point.

The crystalline olefin resin (BB) is particularly a resin having crystallinity among the thermoplastic resin (B) as described above. Examples thereof include low-density polyethylene, medium-density polyethylene, high-density polyethylene, low-density polyethylene by high pressure process, isotactic polypropylene, syndiotactic polypropylene, poly-1-butene, poly(4-methyl-1-pentene), poly-3- methyl-1-butene, ethylene/α-olefin copolymers, propylene/α-olefin copolymers, and 1-butene/α-olefin copolymers. Preferred examples are polypropylene, poly(4-methyl-1-pentene), polyethylene and polybutene.

Examples of the polypropylene include an isotactic polypropylene and a syndiotactic polypropylene. The isotactic polypropylene may be a homopolypropylene, a random copolymer of propylene and an α-olefin having 2 to 20 carbon atoms (except for propylene), or a propylene block copolymer.

The poly(4-methyl-1-pentene) herein is different from the above-described copolymer, and examples thereof include a 4-methyl-1-pentene homopolymer, a 4-methyl-1-pentene/α-olefin random copolymer containing 4-methyl-1-pentene in an amount of 80 to 99.9 wt %, preferably 90 to 99.9 wt % and an α-olefin having 2 to 20 carbon atoms, preferably 6 to 20 carbon atoms, in an amount of 0.1 to 20 wt %, preferably 0.1 to 10 wt %. In the case of the 4-methyl-1-pentene/α-olefin random copolymer, examples of the α-olefin to be copolymerized with 4-methyl-1-pentene are those having 2 to 20 carbon atoms, preferably 6 to 20 carbon atoms, such as ethylene, propylene, 1-butene, 1-hexene, 1-octene, 1-decene, 1-dodecene, 1-tetradecene, 1-hexadecene, 1-octadecene and 1-eicosene. These can be used in a single kind, or can be combined in two or more kinds. The poly(4-methyl-1-pentene) desirably has a melt flow rate (MFR; ASTM1238, 260° C., 5.0 kg load) of 0.1 to 200 g/10 minutes, preferably 1 to 150 g/10 minutes. The poly(4-methyl-1-pentene) may be a commercially-available product, with examples thereof including TPX (trademark) manufactured by Mitsui Chemicals, Inc. Products of poly(4-methyl-1-pentene) available from other manufacturers can be suitably used as long as satisfying the above requirement.

Examples of the polyethylene employable include those produced by a hitherto known technique, such as low-density polyethylene, medium-density polyethylene, high-density polyethylene, and low-density polyethylene by high pressure process.

The polybutene is a 1-butene homopolymer, or a copolymer of 1-butene and an olefin excluding 1-butene. Examples of the olefin are those described above, and these olefins are used in a single kind, or are combined in two or more kinds. Examples of the copolymer include 1-butene/ethylene random copolymer, 1-butene/propylene random copolymer, 1-butene/methylpentene copolymer, 1-butene/methylbutene copolymer, and 1-butene/propylene/ethylene copolymer. In these copolymers, in terms of heat resistance, the content of 1-butene is preferably 50 mol % or more, more preferably 70 mol % or more, still more preferably 85 mol % or more.

The crystalline olefin resin (3B) is not particularly limited, but preferably has a MFR, as measured in accordance with JIS K-6721, at 190° C. and 230° C., under a load of 2.16 kg, of 0.01 to 150 g/10 minutes, more preferably 0.05 to 100 g/10 minutes, still more preferably 0.1 to 100 g/10 minutes, and preferably has a density of 0.990 to 0.800 g/cm$^3$, more preferably 0.980 to 0.810 g/cm$^3$, still more preferably 0.970 to 0.830 g/cm$^3$. These ranges are preferred in terms of crystallinity.

Other examples include cyclic olefin copolymers, chlorinated polyolefins, vinyl acetate copolymer, ethylene/methacrylate (acrylate) copolymer, ionomers, and ethylene/vinyl alcohol copolymers.

In the present invention, among these resins (BB), a single kind thereof can be used, or two or more kinds thereof can be combined and used.

Preferred examples of the crystalline olefin resin (BB) according to the present invention include polyethylene, polypropylene, poly-1-butene, and poly(4-methyl-1-pentene). More preferred is polypropylene.

<α-Olefin Copolymer (CC)>

The α-olefin copolymer (CC) according to the present invention is not particularly limited as long as being a copolymer selected, from α-olefins having 2 to 20 carbon atoms and having a melting point of lower than 100° C., provided that the α-olefin copolymer (CC) excludes the 4-methyl-1-pentene/α-olefin copolymers (A) to (A3) and the 4-methyl-1-pentene copolymer (AA) according to the present invention. The melting point is preferably 95° C. or lower, more preferably 90° C. or lower, particularly preferably 85° C. or lower.

Examples of the α-olefin copolymer (CC) include linear α-olefins having 2 to 20 carbon atoms, preferably 2 to 15 carbon atoms, more preferably 2 to 10 carbon atoms, such as ethylene, propylene, 1-butene, 1-pentene, 1-hexene, 1-octene, 1-decene, 1-undecene, 1-dodecene, 1-tetradecene, 1-hexadecene, 1-octadecene and 1-eicosene; and more preferred examples include ethylene, propylene, 1-butene, 1-pentene, 1-hexene and 1-octene. Other examples are branched α-olefins preferably having 5 to 20 carbon atoms, more preferably 5 to 15 carbon atoms, such as 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, and 3-ethyl-1-hexene.

These α-olefins can be used in a single kind, or can be combined in two or more kinds.

(d-1): The α-olefin copolymer (CC) comprises, as α-olefins:

a structural unit derived from ethylene, propylene or butene-1 in an amount of 50 to 99 wt %, preferably 50 to 98 wt %, more preferably 5.0 to 95 wt %, and a structural unit derived from an α-olefin having 2 to 20 carbon atoms other than the above structural unit in an amount of 1 to 50 wt %, preferably 2 to 50 wt %, more preferably 5 to 50 wt %, provided that the total amount of the structural units in the copolymer (CC) is 100 wt %.

The inclusion of the α-olefins as described above is preferred in terms of flexibility.

(d-3): The α-olefin copolymer (CC) comprises α-olefins composed of two or more of ethylene, propylene and butene-1, a structural unit derived from a main component among these three kinds being contained in an amount of 50 to 98 wt %, preferably 50 to 96 wt %, more preferably 50 to 95 wt %, provided that the total amount of the structural units in the copolymer (CC) is 100 wt %.

The inclusion of the α-olefins as described above is preferred in terms of flexibility.

(d-2): The α-olefin copolymer (CC) has a MFR, as measured in accordance with JIS K-6721, at 190° C. and 230° C., under a load of 2.16 kg, of 0.01 to 100 g/10 minutes, more preferably 0.05 to 100 g/10 minutes, and has a density of 0.910 to 0.850 g/cm$^3$, more preferably 0.900 to 0.860 g/cm$^3$. These ranges are preferred in terms of flexibility and mechanical properties.

The α-olefin copolymer (CC) usually has an intrinsic viscosity [η], as measured in 135° C. decalin, of 0.1 to 10 dL/g, more preferably 0.5 to 5 dL/g.

The α-olefin copolymer (CC) may contain, in addition to these units, units derived from other polymerizable monomers, to the degree not adversely affecting the object of the present invention.

Examples of these other polymerizable monomers include:

vinyl compounds such as styrene, vinylcyclopentene, vinylcyclohexane, and vinylnorbornane;

vinyl esters such as vinyl acetate;

unsaturated organic acids such as maleic anhydride, or derivatives thereof;

conjugated dienes such as butadiene, isoprene, pentadiene, and 2,3-dimethylbutadiene;

non-conjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylene norbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

The α-olefin copolymer (CC) may contain units derived from these other polymerizable monomers in an amount of not more than 10 mol %, preferably not more than 5 mol %, more preferably not more than 3 mol %.

The α-olefin copolymer (CC) is preferably an olefin random copolymer (CC1). Examples of the olefin random copolymer (CC1) include ethylene/propylene random copolymer, ethylene/1-butene random copolymer, ethylene/propylene/1-butene random copolymer, ethylene/4-methyl-1-pentene random copolymer, ethylene/1-hexene random copolymer, ethylene/1-octene random copolymer, ethylene/propylene/ethylidenenorbornene random copolymer, ethylene/propylene/vinylidenenorbornene random copolymer, ethylene/1-butene/ethylidenenorbornene random copolymer, ethylene/1-butene/1-octene random copolymer, propylene/1-butene random copolymer, butene/4-methyl-1-pentene random copolymer, propylene/1-hexene random copolymer, propylene/1-octene random copolymer, butene/1-hexene random copolymer, and butene/1-octene random copolymer.

Of these, particularly preferred are ethylene/propylene random copolymer, ethylene/1-butene random copolymer, ethylene/propylene/1-butene random copolymer, ethylene/1-butene/1-octene random copolymer, ethylene/1-hexene random copolymer, ethylene/1-octene random copolymer, propylene/1-butene random copolymer, propylene/1-hexene random copolymer, and propylene/1-octene random copolymer.

These copolymers may be used in a single kind, or may be combined in two or more kinds.

In the present invention, the use of the α-olefin copolymer (CC) improves, in particular, the balance between impact resistance and stress absorption.

The olefin copolymer (CC) can be produced by hitherto known methods, using e.g., a vanadium catalyst, a titanium catalyst or a metallocene catalyst. The olefin copolymer (CC) may be a commercially-available product, with examples including a product named "TAFMER™" manufactured by Mitsui Chemicals, Inc.

<Production Method of Copolymer Composition>

Methods for producing the 4-methyl-1-pentene/α-olefin copolymer compositions (X) to (X22) and the 4-methyl-1-pentene/α-olefin copolymer composition (Y) of the present invention are described.

The copolymer composition can be produced using the individual components in the above ranges, by various known processes using, for example, multistep polymerization method, a mixing method using a Plastomill, a Henschel mixer, a V-blender, a ribbon blender, a tumbler blender, a kneader ruder or the like, or a method comprising mixing, melt-kneading using a single-screw extruder, a twin-screw extruder, a kneader, a Banbury mixer or the like, and granulation or pulverization.

<Articles>

Articles comprising the 4-methyl-1-pentene/α-olefin copolymer according to the present invention, articles comprising the 4-methyl-1-pentene/α-olefin copolymer composition according to the present invention, and articles comprising the 4-methyl-1-pentene copolymer composition, or articles comprising modified products obtainable using any of these, are obtainable by known heat molding methods such as extrusion molding, injection molding, inflation molding, blow molding, extrusion blow molding, injection blow molding, press molding, stamping molding, vacuum molding, calendar molding, filament molding, foam molding, and powder slush molding. The articles of the present invention can be produced also from an arbitral combination of the copolymer, the copolymer composition, according to the present invention and modified products thereof.

Hereinafter, the articles are specifically described.

It is also preferable for the articles to be those which are obtained by primary molding, such as extrusion molding, injection molding and solution casting, and processed by a method such as blow molding and stretching. For example, it is also preferable for the articles in the form of films or sheets to be those obtained by subjecting articles in the form of sheets obtained by T-die extrusion molding or the like to monoaxial stretching or biaxial stretching. Among the above uses, uses as films, in which the high melting point property can be taken advantage of, are preferred.

When performing extrusion molding, hitherto known extrusion apparatuses and molding conditions are adoptable. For example, using a single-screw extruder, a kneading extruder, a ram extruder or a gear extruder, a molten copolymer or composition is extruded from a specific die, whereby the copolymer or composition can be molded to have a desired form.

Stretched films are obtainable by stretching such extruded sheets or extruded films (unstretched) as mentioned above by a known stretching method, such as tentering (lengthwise-crosswise stretching, crosswise-lengthwise stretching), simultaneous biaxial stretching and monoaxial stretching.

In stretching sheets or unstretched films, the stretching ratio is usually about 20 to 70 times for biaxial stretching, and is usually about 2 to 10 times for monoaxial stretching. It is desirable that stretching provides a stretched film having a thickness of about 5 to 200 μm.

Furthermore, as articles in the form of films, inflation films can be produced. Inflation molding is unlikely to cause drawdown.

Blow molded articles can be produced using hitherto known blow molding apparatus under known conditions. In this case, the resultant blow molded article may be a multilayer article, which has at least one layer composed of the copolymer or copolymer composition according to the present invention or a modified product thereof.

In extrusion blow molding, for example, a resin at a molten state is extruded from a die at a resin temperature of 100° C. to 300° C. to form a tubular parison, and the parison is held in a mold with a desired shape, to which air is blown, and the parison is fitted to the mold at a resin temperature of 130° C. to 300° C., whereby a hollow article can be produced. The stretching (blowing) ratio is desirably about 1.5 to 5 times in crosswise direction.

In injection blow molding, a resin is injected into a parison mold at a resin temperature of 100° C. to 300° C. to form a parison, and the parison is held in a mold with a desired shape, to which air is blown, and the parison is fitted to the mold at a resin temperature of 120° C. to 300° C., whereby a hollow article can be produced. The stretching (blowing) ratio is desirably 1.1 to 1.8 in lengthwise direction and 1.3 to 2.5 times in crosswise direction.

The resultant blow molded articles are excellent in transparency, rigidity or flexibility, heat resistance, and impact resistance, and further in moisture resistance.

As pressed articles, mold stamping articles can be mentioned. The mold stamping articles are obtainable, for example, by a method in which a substrate and a skin material are simultaneously subjected to press molding thereby subjecting the two to composite integral molding (mold stamping molding). The substrate can be formed from the copolymer or copolymer composition according to the present invention or modified products thereof. The pressed articles are hardly electrostatically charged and are excellent in rigidity or flexibility, heat resistance, transparency, impact resistance, aging resistance, surface gloss, chemical resistance, abrasion resistance, etc.

Foamed articles comprising the copolymer or copolymer composition according to the present invention or modified products thereof are obtainable at a high foaming ratio, and have good injection moldability, and high rigidity and material strength.

Filament articles can be produced by, for example, extruding a molten copolymer or copolymer composition, or modified products thereof through a spinneret. Specifically, spunbond method or meltblown method is preferably employed. The filament thus obtained may be further stretched. The stretching is sufficient as long as being performed to such an extent that in at least monoaxial direction of the filament, molecules become oriented. The desirable stretching ratio is usually about 5 to 10 times. The filament articles according to the present invention are hardly electrostatically charged and are excellent in transparency, flexibility, heat resistance, impact resistance and stretchability.

From the articles of the present invention, it is possible to produce powder slush articles such as automotive parts, household electrical appliance parts, toys, and sundries. Such articles are hardly electrostatically charged and are excellent in flexibility, heat resistance, aging resistance, surface gloss, chemical resistance, abrasion resistance, etc.

A further example of the articles of the present invention is a laminate having at least one layer composed of the copolymer or copolymer composition according to the present invention or modified products thereof. Such a laminate is excellent in vibration damping properties, e.g., impact reduction and shock relaxation, and impact absorption.

In the case of uses as additive materials, the materials are obtained by a method in which during molding the thermoplastic resins ((B), (BB) and (CC)) according to the present invention, the copolymer according to the present invention is added (for example, the thermoplastic resins are molded in a molding machine (extruder), and in the middle of the molding (extrusion), the copolymer is fed). The thermoplastic resins are molded in a molten state by a method that involves at least one of shear flow, monoaxial flow, biaxial flow and planar elongational flow; as such a method, a known method is adoptable without particular limitation. The molding methods involving shear flow are, for example, extrusion molding, injection molding and melt blow molding. The molding methods involving monoaxial flow, biaxial flow or planar elongational flow are, for example, known methods such as T-die (film) molding, blow molding and stretching. The molten state as used herein refers to a range that is from not lower than a melting point of the copolymer or copolymer composition of the present invention or modified products thereof to less than 350° C., preferably from 170° C. to 350° C.

The 4-methyl-1-pentene/α-olefin copolymers ((A) to (A3)) according to the present invention are thermodynamically incompatible with thermoplastic resins. It is thus considered that the 4-methyl-1-pentene/α-olefin copolymers are localized on surfaces of the articles thus obtained.

<Uses>

Uses of the 4-methyl-1-pentene/α-olefin copolymers (A to A3), the 4-methyl-1-pentene/α-olefin copolymer compositions (X to X22), and the 4-methyl-1-pentene copolymer composition (Y) according to the present invention, or graft modified products and crosslinked products thereof are described.

(1) The 4-methyl-1-pentene/α-olefin copolymer (A) is excellent in transparency, impact resistance, heat resistance, lightness, flexibility or rigidity, stress absorption, stress relaxation, scratch resistance, abrasion resistance, mechanical properties, toughness, soundproof property, vibration damping properties, cutting property, high breakdown voltage, gas permeability, shrinkability, rubber elasticity, kink resistance, stretchability, creep characteristics, adhesion, surface tension, flexibility modification property, transparency modification property, no stickiness in molding operation, etc., and therefore can be used favorably for the following uses.

As articles comprising the copolymer composition according to the present invention, examples are sheets, films, pipes, tubes, bottles, fibers, tapes, hollow articles, laminates and foamed products.

As a resin excellent in transparency, gas permeability, chemical resistance and peeling property, and in releasability and heat resistance, the copolymer according to the present invention are used in various fields including medical equipment, heat resistant wires, heat resistant eating utensils and peeling materials.

The articles as sheets and films are hardly electrostatically charged and are excellent in mechanical properties, heat resistance, stretchability, impact resistance, aging resistance, transparency, see-through property, gloss, rigidity, moisture resistance, and gas barrier property, and can be used as soundproof sheets, vibration-damping sheets, heat-shielding sheets, heat-shielding films, packaging films, food packaging films (outer layers, inner layers, sealants and single layers), stretchable films, plastic wraps, stretched films, air-breathable films, shrink films, etc.

The injection molded articles are hardly electrostatically charged and are excellent in transparency, rigidity, heat resistance, impact resistance, surface gloss, chemical resistance, abrasion resistance, etc., and can be widely used as automotive interior trims, automotive exterior trims, housings for household electrical appliances, containers, etc.

The mold stamping articles can be used as automotive interior trims, such as door trims, rear package trims, seat back garnishes and instrument panels.

The vacuum articles can be used as interior skin materials, such as instrument panels and door trims. Such molded products are hardly electrostatically charged and are excellent in flexibility, heat resistance, impact resistance, aging resistance, surface gloss, chemical resistance, abrasion resistance, etc.

Exemplary uses of the articles comprising the copolymer according to the present invention are described hereinafter, without particularly limiting thereto.

As containers, examples include food containers, retort containers and bottles, e.g., eating utensils, retort containers, freeze preservation containers, retort pouches, microwave oven heat-resistant containers, frozen food containers, chilled sweet cups, cups and beverage bottles; blood transfusion sets, medical bottles, medical containers, medical hollow bottles, medical bags, transfusion bags, blood preservation bags, transfusion bottle chemicals containers, detergent containers, cosmetics containers, perfume containers, and toner containers.

As modifiers, examples include resin modifiers, compatibilizers (graft modification) and easy-peeling properties modifiers, e.g., polypropylene modifiers, poly(4-methyl-1-pentene) modifiers, polybutene modifiers, polyethylene modifiers, styrene elastomer modifiers, butyl rubber modifiers, propylene elastomer modifiers, ethylene elastomer modifiers, modifiers for acrylic adhesives, hot melt adhesive modifiers, flow mark modifiers, weld modifiers, surface modifiers and gas barrier modifiers.

As packaging materials, examples include food packaging materials, meat packaging materials, processed fish packaging materials, vegetable packaging materials, fruit packaging materials, fermented food packaging materials, sweets packaging materials, oxygen-absorbent packaging materials, packaging materials for retort food, freshness preservation films, drug packaging materials, cell culture bags, cell inspection films, bulb packaging materials, seed packaging materials, films for vegetables/fungus cultivation, heat-resistant vacuum molded containers, prepared food containers, lids for prepared food, industrial plastic wraps, household plastic wraps, and baking cartons.

As films, sheets and tapes, examples include:

releasing films for flexible print substrates, releasing films for rigid substrates, releasing films for rigid flexible substrates, releasing films for advanced composite materials, releasing films for the curing of carbon fiber composite materials, releasing films for the curing of glass fiber composite materials, releasing films for the curing of aramid fiber composite materials, releasing films for the curing of nano composite materials, releasing films for the curing of fillers, releasing films for sealing semiconductors, releasing films for polarizing plates, releasing films for diffusion sheets, releasing films for prism sheets, releasing films for reflection sheets, cushion films for releasing films, releasing films for fuel batteries, releasing films for various rubber sheets, releasing films for the curing of urethane, and releasing films for the curing of epoxy;

solar battery cell sealing sheets, solar battery cell back sheets, plastic films for solar batteries, battery separators, separators for lithium ion batteries, electrolyte membranes for fuel batteries, and adhesive/pressure-sensitive adhesive separators;

substrates, adhesives and separators for semiconductor process films such as dicing tapes, back grind tapes, die bonding films, two-layer FCCL and films for film capacitors; adhesive films, films for pellicles; films for polarizing plates; protecting films such as polarizing plate protecting films, liquid crystal panel protecting films, optical component protecting films, lens protecting films, electric component/electric appliance protecting films, mobile phone protecting films, personal computer protecting films, masking films, films for capacitors, reflection films, laminates (including glass), radiation resistant films, γ-ray resistant films, and porous films;

heat dissipation films/sheets, flasks for the production of electronic component sealants, LED molds, laminate plates for high-frequency circuits, high-frequency cable coating materials, optical waveguide substrates;

glass interlayers, films for safety glass, bulletproof materials, films for bulletproof glass;

releasing paper such as releasing paper for synthetic leather, releasing paper for advanced composite materials, releasing paper for the curing of carbon fiber composite materials, releasing paper for the curing of glass fiber composite materials, releasing paper for the curing of aramid fiber composite materials, releasing paper for the curing of nano composite materials, and releasing paper for the curing of fillers; and heat-resistant water resistant printing paper.

As other uses, examples include mandrels for the production of rubber hoses, sheaths, sheaths for the production of rubber hoses, hoses, tubes, wire coating materials, insulators for high-voltage wires, wiring ducts, tubes for cosmetics and perfume sprays, medical tubes, transfusion tubes, pipes and wire harness;

interior trims of automobiles, motorcycles, railroad vehicles, air planes, ships, etc.; abrasion-resistant automotive interior and exterior trims; automotive interior and exterior trims such as instrument panel skins, door trim skins, rear package trim skins, ceiling skins, rear pillar skins, seat back garnishes, console boxes, arm rests, air back case lids, shift knobs, assist grips, side step mats, reclining covers, sheets in trunks, seat belt buckles, moldings such as inner/outer moldings, roof moldings, and belt moldings, automotive seal materials such as door seals and body seals, glass run channels, mudguards, kicking plates, step mats, number plate housings, automotive hose components, air duct hoses, air duct covers, air intake pipes, air dam skirts, timing belt cover seals, hood cushions, and door cushions; special tires such as vibration damping tires, silent tires, car race tires, and radio control tires; packings, automotive dust covers, lamp seals, automotive boots, rack and pinion boots, timing belts, wire harness, grommets, emblems, air filter packings;

skin materials of e.g., furniture, shoes, cloths, bags and building materials, seal materials for architecture, waterproof sheets, building material sheets, building material gaskets, window frames for building materials, iron-core protecting components, gaskets, doors, door frames, window frames, cornices, baseboards, opening frames, floor materials, ceiling materials, wall paper;

health appliances (e.g., nonslip mats/sheets and tip-resistant films/mats/sheets), health appliance components, impact absorbing pads, protectors/protecting components (e.g., helmets and guards), sport gears (e.g., sport grips and protectors), sport protecting equipment, rackets, mouth guards, balls, golf balls; carrying implements (e.g., impact absorbing grips for carrying and impact absorbing sheets); impact absorbers such as vibration damping pallets, impact absorbing dampers, insulators, impact absorbers for shoes, impact absorbing foamed products, and impact absorbing films;

grips, sundries, toys, treads, shoe soles, shoe midsoles/inner soles, soles, sandals, suckers, tooth blushes, floor materials, gymnastic mats, electrical tool components, agricultural equipment components, heat dissipation materials, transparent substrates, soundproof materials, cushion materials, wire cables, shape memory materials;

medical gaskets, medical caps, drug caps, gaskets; packing materials used in high-temperature treatments such as boiling treatment and high-pressure steam sterilization carried out after filling bottles with baby food, dairy products, drugs, sterilized water and the like; industrial seal materials, industrial sewing machine tables, number plate housings, cap liners such as PET bottle cap liners;

adhesives such as protecting film adhesive layers and hot melt adhesives;

stationery, office supplies; supports of precision devices and office automation devices such as office automation printer legs, facsimile legs, sewing machine legs, motor supporting mats and audio vibration-proof materials; heat-resistant packings for office automation, animal cages, physical and chemical science experimental equipment such as beakers and measuring cylinders, cells for optical measurement, cloth cases, clear cases, clear files, clear sheets, desk mats;

uses as fibers such as nonwoven fabrics, stretchable nonwoven fabrics, fibers, waterproof fabrics, air-breathable woven fabrics and fabrics, disposable diapers, sanitary products, hygiene products, filters, bug filters, dust-collecting filters, air cleaners, hollow fiber filters, water-purifying filters, filter fabrics, filter paper, and gas separation membranes.

Further preferred uses include coating materials, films and sheets obtained by coating, water repellants, insulating films, pressure sensitive adhesives, adhesives, coated paper, transparent sealants, sealants, hot melt type adhesives/pressure sensitive adhesives, solvent type adhesives/pressure sensitive adhesives, film-like adhesives/pressure sensitive adhesives, fabric tapes, craft tapes, and elastomeric pressure-sensitive adhesives.

The copolymer and the composition are favorably used particularly in the fields (1) to (3) as described below, which take advantage of the characteristics of the present invention.

[(1) Films]

Uses to take advantage of the releasability of films and sheets are preferred. A specific example is an adhesive film in which a known adhesive layer is formed on a film. Examples of the adhesive layer include acrylic adhesive layers, ester adhesive layers, olefin adhesive layers, and urethane adhesive layers. As these adhesive layers, materials having adhesive power appropriate for corresponding substrates are employable.

In addition to these, further examples are polarizing plate protecting films or FPD (flat panel display) protecting films with a multilayer film structure comprising a film for protecting a polarizing plate, FPD or the like, an adhesive layer and the 4-methyl-1-pentene/α-olefin copolymer film. Specific examples are those described as the protecting films. Still further examples include easy-peeling properties modifiers, releasing materials, and uses in packaging materials to take advantage of the heat resistance and mechanical properties etc., which uses include packaging films and sheets, films (outer layers, inner layers, sealants, single layers) for food packaging, stretchable films, plastic wraps, stretched films, air-breathable films, shrink films, microwave oven heat resistant containers, frozen food containers, meat packaging materials, processed fish packaging materials, vegetable packaging materials, fruit packaging materials, fermented food packaging materials, sweets packaging materials, oxygen-absorbent packaging materials, packaging materials for retort food, freshness preservation films, drug packaging materials, cell culture bags, cell inspection films, bulb packaging materials, seed packaging materials, films for vegetables/fungus cultivation, heat-resistant vacuum molded containers, prepared food containers, lids for prepared food, industrial plastic wraps, and household plastic wraps.

As specific examples, the above-mentioned releasing films can be mentioned.

In the case of the packaging films, the articles obtained as films and sheets may be multilayer articles. Examples of the multilayer articles include the above substrates, adhesives and separators for semiconductor process films, adhesive films, films for pellicles, films for polarizing plates, the above protecting films, and heat dissipation films/sheets.

[(2) Vibration Damper]

The copolymer and copolymer composition according to the present invention are suited for stress absorbers/vibration dampers excellent in stress absorption and vibration damping properties, and articles thereof, and in detail, suited for stress absorbers/vibration dampers for non-vinyl-chloride polymer materials having good mechanical properties (breaking strength and tensile modulus). Specific examples include office automation devices, household electrical appliances such as washing machines, automobiles, machine tools, industrial machines, floor materials, vibration damping panels and vibration damping articles.

The copolymer and copolymer composition according to the present invention and modified products thereof, having a high peak value of tan δ, are suited as stress absorbers/vibration dampers. In particular, the 4-methyl-1-pentene/α-olefin copolymer is preferably a copolymer of 4-methyl-1-pentene and an α-olefin having 2 to 4 carbon atoms. The copolymer of 4-methyl-1-pentene and an α-olefin having 2 to 4 carbon atoms may contain a non-conjugated polyene.

The copolymer according to the present invention or modified products thereof may have thermoplastic resins added thereto, as needed. The thermoplastic resin herein is, for example, the above-described thermoplastic resin (B). Preferred examples include:

olefin polymers such as polyethylene, polypropylene, and copolymers of ethylene and/or propylene and an α-olefin, excluding the copolymer according to the present invention; and styrene polymers such as polystyrene, high-impact polystyrene, styrene/methacrylic acid ester copolymers (MS), acrylonitrile/styrene copolymer (AS), acrylonitrile/butadiene/styrene copolymer (ΔHS), styrene/isoprene/styrene copolymer (SIS) and hydrogenated products thereof, styrene/butadiene/styrene copolymer (SBB) and hydrogenated products thereof, and styrene/isobutylene/styrene copolymer (SIBS) and hydrogenated products thereof. These resins are preferred in terms of compatibility, moldability and the like.

These thermoplastic resins can be used in a single kind, or can be combined in two or more kinds.

A molecular weight of the thermoplastic resin is not particularly limited, but a weight-average molecular weight in terms of polystyrene is preferably 5,000 to 1,000,000, more preferably 50,000 to 500,000. This range achieves the characteristics of the present invention, moldability, and the like with good balance.

The thermoplastic resin is added usually in an amount of 0 to 99 wt %, more preferably 0 to 95 wt %, still more preferably 0 to 90 wt %, based on 100 wt % of the total of the copolymer and the thermoplastic resin. If the addition amount is more than 99 wt %, the effects of the copolymer (A), for example, properties such as stress absorption/vibration damping properties, mechanical properties, heat resistance, and chemical resistance, cannot be exhibited. The copolymer, in order to exhibit its vibration damping properties and the like, is used preferably in an amount of 5 to 100 wt %, more preferably 10 to 100 wt %, based on 100 wt % of the total of the copolymer and the thermoplastic resin.

The stress absorber/vibration damper can have inorganic fillers added thereto, as needed. Examples of the inorganic fillers include mica (scale-form, i.e., flaky mica or the like), talc, clay, calcium carbonate, aluminum hydroxide, hydrotalcite, glass fibers, glass bead, glass balloon, glass flake, silica, carbon black, graphite, titanium oxide, magnesium hydroxide, potassium titanate whisker, and carbon fibers, with forms thereof being not particularly limited and including scale form, spherical form, granular form, powder form and amorphous form. The addition of the inorganic fillers can improve mechanical properties such as vibration damping properties and modulus of elasticity, dimensional stability, and chemical resistance; however, the fluidity may be lowered. These inorganic fillers are added in an amount of 0 to 100 parts by weight, preferably 0 to 70 parts by weight, more preferably 0 to 40 parts by weight, based on 100 parts by weight of the total of the polymer according to the present invention and the thermoplastic resin (B).

The stress absorber/vibration damper of the present invention can have various additives added thereto, as needed. With regard to the additives, the foregoing descriptions can be referred to.

The stress absorber/vibration damper of the present invention has a maximum value of loss tangent tan δ of kinematic viscoelasticity, as measured within a temperature range of −70 to 180° C. at a frequency of 10 rad/s, of 0.1 to 10. Preferably, the temperature giving the peak value ranges from −50 to 100° C., more preferably from −40 to 50° C., still more preferably from −30 to 50° C., most preferably from −10 to 40° C. The maximum value of the tan δ is preferably 0.4 to 8, particularly preferably 0.6 to 6, more preferably 0.7 to 5. The maximum value of tan δ within these ranges can give excellent stress absorption and vibration damping properties. The maximum value as used herein is determined based on sufficiently averaged data in terms of dispersion and the like of the measurement.

The stress absorber/vibration damper of the present invention has an extremely high peak value of loss coefficient tan δ of kinematic viscoelasticity, at around room temperature, and furthermore has good mechanical properties (breaking strength and tensile modulus), chemical resistance and stress absorption. The stress absorber/vibration damper of the present invention is suited as vibration dampers, soundproof materials or sound insulators in e.g., office automation devices, industrial machines, automobiles, railroads, bridges, ships, building materials, interior materials, audio devices and household electrical appliances such as air conditioners and washing machines.

[(3) Additive Material]

The copolymer or copolymer composition of the present invention, because of having excellent anti-blocking effect and releasability, is suited as an additive material.

After the copolymer or copolymer composition according to the present invention or a modified product thereof is blended with a thermoplastic resin or a thermosetting resin to form a thermoplastic resin composition or a thermosetting resin composition, the composition is used in articles such as films, bottles and cases, and can give excellent releasability and water repellency to such articles. Moreover, the composition can give excellent releasability from molds in injection molding. The copolymer, the copolymer composition or a modified product thereof hardly bleed-outs with the passage of time, and moreover does not cause odor or smoke. Furthermore, the 4-methyl-1-pentene/α-olefin copolymer, because of having a transparent skeleton, is considered to hardly deteriorate the transparency of articles.

If propylene resins are blended with the additive materials, the resultant articles are provided with excellent transparency, scratch resistance, whitening resistance and heat resistance attributable to the propylene resins, and do not have stickiness even when used at high temperature, and therefore such articles are employable under conditions with a wide temperature range.

In uses of the present invention as the additive materials, in particular, the copolymer, the copolymer composition and modified products thereof preferably have a small molecular weight, a narrow molecular weight distribution, and less content in low-molecular region of the molecular weight distribution. The 4-methyl-1-pentene/α-olefin copolymer is preferably a copolymer of 4-methyl-1-pentene and an α-olefin having 2 to 3 carbon atoms. The copolymer of 4-methyl-1-pentene and an α-olefin having 2 to 3 carbon atoms may contain a non-conjugated polyene. In uses as additive material, the copolymer, the copolymer composition, or a modified product thereof is used in an amount of 0.01 to 10 parts by weight, preferably 0.1 to 7 parts by weight, more preferably 0.2 to 5 parts by weight, based on 100 parts by weight of thermoplastic resins. The thermoplastic resins herein are not particularly limited, but the above-described thermoplastic resin (B) can be mentioned as an example. The thermoplastic resins can be used in a single kind, or can be combined in two or more kinds.

(2) The 4-methyl-1-pentene/α-olefin copolymer (A1) according to the present invention is excellent in transparency, stress absorption, impact resistance, lightness, flexibility, stress relaxation, soundproof property, vibration damping properties, cutting property, high breakdown voltage, gas permeability, shrinkability, rubber elasticity, kink resistance, adhesion, flexibility modification property, and transparency modification property, and therefore can be used favorably for the above-described uses. The copolymer (A1) according to the present invention can be favorably used particularly for vibration dampers, vibration-proof materials, soundproof materials or sound insulators in e.g., office automation devices, industrial machines, automobiles, railroads, bridges, ships, building materials such as vibration damping mats and vibration dampers, interior materials, audio devices and household electrical appliances such as air conditioners and washing machines; impact absorbers such as mouth guards, sport protectors, protectors for nursing care and impact absorbing mats; adhesives such as adhesive films and protecting film adhesive layers; protecting films; and modifiers such as polyolefin modifiers, elastomer modifiers, hot melt adhesive modifiers, and easy-peeling properties modifiers.

(3) The 4-methyl-1-pentene/α-olefin copolymer (A2) according to the present invention is suited, among the above-described uses, for vibration dampers, vibration-proof materials, soundproof materials or sound insulators in e.g., office automation devices, industrial machines, automobiles, railroads, bridges, ships, building materials such as vibration damping mats and vibration dampers, interior materials, audio devices and household electrical appliances such as air conditioners and washing machines; impact absorbers such as mouth guards, sport protectors, protectors for nursing care, impact absorbing mats and shoe inner soles; adhesives such as adhesive films and protecting film adhesive layers; protecting films for semiconductor process; grips of e.g., spots gears, stationery and health goods; and modifiers such as polyolefin modifiers, elastomer modifiers, hot melt adhesive modifiers, and easy-peeling properties modifiers.

(4) The 4-methyl-1-pentene/α-olefin copolymer (A3) according to the present invention and crosslinked products thereof are, as a resin excellent in rubber elasticity, compression stress relaxation, heat resistance, foaming property and foaming property modification property, suited particularly for vibration dampers, vibration-proof materials, soundproof materials or sound insulators in e.g., office automation devices, industrial machines, automobiles, railroads, bridges, ships, building materials such as vibration damping mats and vibration dampers, interior materials, audio devices, and household electrical appliances such as air conditioners and washing machines, impact absorbers, grips, vibration damping rubbers, polyolefin modifiers, elastomer modifiers and foaming modifiers.

(5) The 4-methyl-1-pentene/α-olefin copolymer composition (X) according to the present invention is excellent in transparency, stress absorption, impact resistance, heat resistance, lightness, flexibility, stress relaxation, scratch resistance, abrasion resistance, soundproof property, vibration damping properties, cutting property, high breakdown voltage, gas permeability, shrinkability, rubber elasticity, kink resistance, adhesion, surface tension, flexibility modification property, and transparency modification property, and therefore can be used favorably for the above-described uses.

(6) The 4-methyl-1-pentene/α-olefin copolymer compositions (X11, X12) according to the present invention can be favorably used for vibration dampers, vibration-proof materials, soundproof materials or sound insulators in e.g., office automation devices, industrial machines, automobiles, railroads, ships, building materials such as vibration damping mats and vibration dampers, interior materials, audio devices and household electrical appliances such as air conditioners and washing machines; violation damping steel plate; impact absorbers such as mouth guards, sport protectors, protectors for nursing care, and impact absorbing mats; adhesives such as adhesive films and protecting film adhesive layers; films and sheets such as vibration damping sheets, surface protecting films and protecting films for semiconductor process; and modifiers such as polyolefin modifiers, elastomer modifiers, hot melt adhesive modifiers, easy-peeling properties modifiers and foaming modifiers.

(7) The 4-methyl-1-pentene/α-olefin copolymer compositions (X12, X22) according to the present invention can be favorably used for polypropylene modifiers, poly(4-methyl-1-pentene) modifiers, flexibility modifiers, transparency modifiers, grips, packaging films, air-breathable films, medical tubes, industrial tubes, food containers, heat resistant containers, medical containers, animal cages, physical and chemical science experimental equipment, nonwoven fabrics, and releasing films.

(8) Uses of the 4-methyl-1-pentene copolymer composition (Y) of the present invention are described. The 4-methyl-1-pentene copolymer composition (Y) is excellent in lightness, flexibility or rigidity, vibration damping properties, stress absorption, stress relaxation, impact resistance, mechanical properties, toughness, soundproof property, cutting property, high breakdown voltage, gas permeability, kink resistance, cold resistance, stretchability, creep characteristics, adhesion, flexibility modification property, and has no stickiness in molding operation, etc., and therefore can be used favorably for the above-described uses.

EXAMPLES

The present invention is described with reference to Examples, but the present invention is in no way limited by these Examples. In the present invention, individual properties were measured by the methods as described below.

[Intrinsic Viscosity [η]]

An intrinsic viscosity was measured using a decalin solvent at 135° C.

[Composition and B Value]

$^{13}$C-NMR was employed to measure a content of 4-methyl-1-pentene and a content of an α-olefin, and an amount of a non-conjugated polyene in a polymer.

The measurement was carried out using ECP 500 nuclear magnetic resonance apparatus manufactured by JEOL Ltd. As a solvent, a mixed solvent of orthodichlorobenzene/deuterated benzene (80/20 volume %) was used. The specimen concentration was 55 mg/0.6 mL, and the measurement temperature was 120° C. The observation nucleus was $^{13}$C (125 MHz). The sequence was single pulse proton decoupling. The pulse width was 4.7 μsec (45° pulse). The repeating time was 5.5 sec. The number of integration was not lower than 10000. The standard value of chemical shift was defined as 27.50 ppm.

Based on $^{13}$C-NMR spectrum, a B value was calculated from the following formula using a peak intensity of propylene main chain αα methine $I_p$ (2.87 ppm), a peak intensity of 4-methyl-1-pentene main chain αα methine $I_{PM}$ (31.8 ppm) and a peak intensity of main chain αα methylene $I_M$ (44.5 ppm).

$$(B \text{ value}) = \{I_{PM}/(2 \times I_P \times I_M)\}$$

[Melting Point (Tm)]

A melting point (Tm) of a polymer was measured by Differential Scanning calorimetry (DSC) using DSC 220C apparatus manufactured by Seiko Instruments Inc. A specimen obtained by polymerization, weighting 7 to 12 mg, was sealed in an aluminum pan, and the specimen was heated at a rate of 10° C./min from room temperature to 200° C. For complete melting, the specimen was held at 200° C. for 5 minutes, and then cooled to −50° C. at a rate of 10° C./min. The specimen was allowed to stand at −50° C. for 5 minutes, and then heated for the second time at a rate of 10° C./min to 200° C. A peak temperature in this second heating test was defined as a melting point (Tm).

[Molecular Weight (Mw, Mn), Molecular Weight Distribution (Mw/Mn)]

A molecular weight of a polymer was measured using a liquid chromatograph (ALC/GPC 150-C plus, manufactured, by Waters, differential refractive index meter and detector integrated type) As a column, two pieces of GMH6-HT and two pieces of GMH6-HTL, manufactured by Tosoh Corporation, were connected in series. As a mobile phase-medium, o-dichlorobenzene was used. The measurement was carried out at a flow rate of 1.0 mL/min at 140° C. A chromatogram obtained was analyzed by known method, using a calibration that employed a standard polystyrene sample. Thereby, Mw, Mn and Mw/Mn were calculated.

[Extracted Amount Under Methyl Acetate]

A polymer was collected in a Soxhlet extractor, and was heat refluxed under methyl acetate. An amount of the polymer was weighed before and after refluxing and thereby an extracted amount (wt %) was calculated.

[Preparation of Press Sheet for Various Measurements]

Using a hydraulic heat pressing machine manufactured by Shindo Kinzoku Co., Ltd., which was set at 200° C., at a pressure of 10 MPa, a sheet was formed. In the case of a sheet with a thickness of 0.5 to 3 mm (four spacers were provided on a plate of 240×240×2 mm in thickness; each spacer had a size of 80×80×0.5 to 3 mm in thickness), preheating was carried out for about 5 to 7 minutes, and then pressurization was carried out at 10 MPa for 1 to 2 minutes. Then, using another hydraulic heat pressing machine manufactured by Shindo Kinzoku Co., Ltd., which was set at 20° C., compression was carried out at 10 MPa, which was followed by cooling for about 5 minutes. Thereby, a specimen for measurement was prepared. As a heating plate, a brass plate with a thickness of 5 mm was used. The sample obtained was used for the evaluation of various properties.
[Shore Hardness Measurement]

In accordance with JIS K6253, using a press sheet with a thickness of 3 mm, measurement was carried out with a shore hardness meter. As a shore hardness meter, an A hardness meter or a D hardness meter was used. Furthermore, a change ΔHS between a value obtained immediately after the measurement and a value obtained 15 seconds after the measurement was calculated in the following manner.

ΔHS=(Shore A hardness value measured immediately after the starting of indenter contact–
Shore A hardness value measured 15 seconds after the starting of indenter contact)

ΔHS=(Shore D hardness value measured immediately after the starting of indenter contact–
Shore D hardness value measured 15 seconds after the starting of indenter contact)

[Kinematic Viscoelasticity]

A press sheet with a thickness of 3 mm was prepared, from which a strip having a size of 45 mm×10 mm×3 mm was cut out for kinematic viscoelasticity measurement. The temperature dependency of the kinematic viscoelasticity from −70 to 180° C. at a frequency of 10 rad/s was measured, using MCR301 manufactured by ANTONPaar, and then a peak temperature giving a peak value of a loss tangent (tan δ) attributed to a glass transition temperature, and the peak value were measured.
[Abrasion Resistance Evaluation]

An abrasion resistance was evaluated based on a percentage of change in gloss (%) obtained by abrasion using Gakushin-type rubbing tester.

Using a Gakushin-type rubbing tester (manufactured by Toyo Seiki Seisaku-Sho, Ltd.), a press sheet with a thickness of 2 mm was abraded with a 45R abrasion indenter of 1000 g made of SUS, the tip of which had been covered with a cotton canvas of #10, at 23° C., at a reciprocation frequency of 100 times, at a reciprocation rate of 33 times/min, at a stroke of 100 mm. A percentage of change in gloss between before the abrasion and after the abrasion was calculated in the following manner.

ΔG={(gloss before abrasion−gloss after abrasion)/ gloss before abrasion}×100

[Tensile Modulus (YM), Tensile Elongation at Break (EL), Tensile Stress at Yield (YS), Tensile Stress at Break (TS)]

As tensile properties, a tensile modulus (YM), a tensile elongation at break (EL), a tensile stress at yield (YS), a tensile stress at break (TS) were evaluated using half of a No. 2 specimen defined in JIS K7113 that was stamped from a press sheet with a thickness of 1 mm obtained by the above method, at a tensile rate of 30 mm/min under an atmosphere of 23° C.
[Tensile Permanent Set (PS)]

A tensile permanent set (PS) was evaluated in the following manner. Half of a No. 2 specimen defined in JIS K7113 that was stamped from a press sheet with a thickness of 1 mm obtained by the above method was used as a specimen for evaluation. When the specimen had an elongation rate of 100% at a tensile rate of 30 mm/min, a distance between chucks at this time was measured. The specimen was held under an atmosphere of 23° C. for 10 minutes and then released. At 10 minutes past the release, a distance between chucks was measured. A difference between the distances was calculated.
[Softening Temperature Based on TMA Measurement]

In accordance with JIS K7196, using a specimen with a thickness of 1 mm, measurement was carried out by applying a pressure of 2 Kgf/cm$^2$ onto a planar indenter with a diameter of 1.8 mm at a heating rate of 5° C./min to prepare a TMA curve, from which a softening temperature (° C.) was determined.
[Internal Haze (%)]

Using a press sheet with a thickness of 1 mm as a specimen, measurement was carried out with a digital haze meter "NDH-20D", manufactured by Nippon Denshoku Industries, Ltd.
[MFR]

A MFR of the crystalline olefin resin (BB) was measured at 230° C. under a load of 2.16 kg in accordance with JIS K-6721.

AMFR of the α-olefin copolymer (CC) was measured in accordance with JIS K-6721, at 190° C. under a load of 2.16 kg for an ethylene/α-olefin copolymer and a butene/α-olefin copolymer, and at 230° C. under a load of 2.16 kg for a propylene/α-olefin copolymer.
[Density]

In accordance with ASTM D 1505 (water replacement method), using an electronic densimeter manufactured by ALFA MIRAGE Co., Ltd., a density was calculated from a weight of a specimen measured in water and a weight of a specimen measured in air.
[Ball Drop Resilience Ratio]

A press sheet with a thickness of 6 mm was prepared. Then, under a room temperature of 25° C. or under 40° C., in accordance with JIS K6400, a rigid ball of 16.310 g was dropped thereon from a height of 460 mm, and a rebound height at this time was measured. A ratio of the rebound height to the height at which the ball was dropped was calculated as a ball drop resilience ratio.

Example 1

Into a SUS autoclave with an agitating element having a volume of 1.5 L that had been sufficiently purged with nitrogen, at 23° C., 750 mL of 4-methyl-1-pentene was introduced. Into this autoclave, 0.75 mL of a toluene solution of 1.0 mmol/mL of triisobutylaluminum (TIBAl) was introduced, and the agitator was operated. Then, the autoclave was heated till the temperature of the mixture became 30° C., and pressurization using propylene was performed such that the total pressure became 0.74 MPaG. Then, 0.34 mL of a previously-prepared toluene solution containing 1 mmol in terms of Al of methylaluminoxane and 0.005 mmol of diphenylmethylene (1-ethyl-3-t-butyl-cyclopentadienyl) (2,7-di-t-butyl-fluorenyl)zirconiumdichloride was injected using nitrogen into the autoclave, thereby initiating polymerization. For the following 60 minutes, temperature of the autoclave was controlled such that the temperature of the mixture was 60° C. At 60 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 56.3 g, and the content of propylene in the polymer was 75.3 mol %. With regard to the polymer, Tm was not observed; the intrinsic viscosity [η] was 1.5 dL/g; the molecular weight distribution obtained by GPC was such that Mw was 287000, Mn was 144000, and Mw/Mn was 2.0; the extracted amount under methyl acetate was 0.6 wt %; YM was 1 MPa; ΔHS was 14; and the maximum value of tan δ was 3.5 (temperature giving the maximum value: 6° C.). Properties of the resultant polymer are shown in Table 1.

Example 2

Into a SUS autoclave with an agitating element having a volume of 1.5 L that had been sufficiently purged with nitrogen, at 23° C., 750 mL of 4-methyl-1-pentene (4MP1) was introduced. Into this autoclave, 0.75 mL of a toluene solution of 1.0 mmol/mL of triisobutylaluminum (TIBAl) was introduced, and the agitator was operated. Then, the autoclave was heated till the temperature of the mixture became 30° C., and pressurization using propylene was performed such that the total pressure became 0.68 MPaG. Then, 0.34 mL of a previously-prepared toluene solution containing 1 mmol in terms of Al of methylaluminoxane and 0.005 mmol of diphenylmethylene (1-methyl-3-t-butyl-cyclopentadienyl)(2,7-di-t-butyl-fluorenyl)zirconiumdichloride was injected using nitrogen into the autoclave, thereby initiating polymerization. For the following 60 minutes, temperature of the autoclave was controlled such that the temperature of the mixture was 60° C. At 60 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 45.9 g, and the content of propylene in the polymer was 68.9 mol %. With regard to the polymer, Tm was not observed; the intrinsic viscosity [η] was 1.47 dL/g; the molecular weight distribution obtained by GPC was such that Mw was 310000, Mn was 155000, and Mw/Mn was 2.0; the extracted amount under methyl acetate was 0.2 wt %; YM was 1 MPa; ΔHS was 24; and the maximum value of tan δ was 3.2 (temperature giving the maximum value: 11° C.). Properties of the resultant polymer are shown in Table 1.

Example 3

Polymerization was performed in the same manner as in Example 2, except that the pressurization using propylene was performed such that the total pressure in the polymerization container was 0.35 MPaG.

The resultant polymer weighed 46.9 g, and the content of propylene in the polymer was 52.7 mol %. With regard to the polymer, Tm was not observed; the intrinsic viscosity [η] was 1.41 dL/g; the molecular weight distribution obtained by GPC was such that Mw was 285000, Mn was 143000, and Mw/Mn was 2.0; the extracted amount under methyl acetate was 0.2 wt %; YM was 3 MPa; ΔHS was 38; and the maximum value of tan δ was 3.4 (temperature giving the maximum value: 19° C.). Properties of the resultant polymer are shown in Table 1.

Example 4

Polymerization was performed in the same manner as in Example 1, except that the pressurization using propylene was performed such that the total pressure in the polymerization container was 0.20 MPaG.

The resultant polymer weighed 35.5 g, and the content of propylene in the polymer was 40.0 mol %. With regard to the polymer, Tm was not observed; the intrinsic viscosity [η] was 1.4 dL/g; the molecular weight obtained by GPC was such that Mw was 272000, Mn was 131000, and Mw/Mn was 2.1; the extracted amount under methyl acetate was 0.3 wt %; YM was 15 MPa; ΔHS was 39; and the maximum value of tan δ was 3.0 (temperature giving the maximum value: 24° C.). Properties of the resultant polymer are shown in Table 1.

Example 5

Polymerization was performed in the same manner as in Example 2, except that the pressurization using propylene was performed such that the total pressure in the polymerization container was 0.15 MPaG.

The resultant polymer weighed 46.9 g, and the content of propylene in the polymer was 38.0 mol %. With regard to the polymer, Tm was not observed; the intrinsic viscosity [η] was 1.44 dL/g; the molecular weight distribution obtained by GPC was such that Mw was 295000, Mn was 142000, and Mw/Mn was 2.09; the extracted amount under methyl acetate was 0.2 wt %; YM was 80 MPa; ΔHS was 40; and the maximum value of tan δ was 2.8 (temperature giving the maximum value: 25° C.). Properties of the resultant polymer are shown in Table 1.

Example 6

Polymerization was performed in the same manner as in Example 2, except that the pressurization using propylene was performed such that the total pressure in the polymerization container was 0.15 MPaG, and the polymerization temperature was 60° C.

The resultant polymer weighed 24.0 g, and the content of propylene in the polymer was 29.1 mol %. With regard to the polymer, Tm was not observed; the intrinsic viscosity [η] was 1.31 dL/g; the molecular weight obtained by GPC was such that Mw was 257000, Mn was 124000, and Mw/Mn was 2.08; the extracted amount under methyl acetate was 0.2 wt %; YM was 176 MPa; ΔHS was 24; and the maximum value of tan δ was 2.5 (temperature giving the maximum value: 26° C.). Properties of the resultant polymer are shown in Table 1.

Example 7

Polymerization was performed in the same manner as in Example 1, except that the pressurization using propylene was performed such that the total pressure in the polymerization container was 0.13 MPaG, and the polymerization temperature was 60° C.

The resultant polymer weighed 22.6 g, and the content of propylene in the polymer was 28.1 mol %. With regard to the polymer, Tm was not observed; the intrinsic viscosity [η] was 1.39 dL/g; the molecular weight obtained by GPC was such that Mw was 290000, Mn was 138000, and Mw/Mn was 2.10; the extracted amount under methyl acetate was 0.4 wt %; YM was 72 MPa; ΔHS was 31; and the maximum value of tan δ was 2.2 (temperature giving the maximum value: 30° C.). Properties of the resultant polymer are shown in Table 1.

Example 8

Polymerization was performed in the same manner as in Example 4, except that 100 mL of 4-methyl-1-pentene and 650 mL of n-hexane were introduced into the polymerization container and then the pressurization using propylene was performed such that the total pressure in the polymerization container was 0.68 MPaG, and the polymerization temperature was 60° C.

The resultant polymer weighed 35.3 g, and the content of propylene in the polymer was 88.0 mol %. With regard to the polymer, Tm was not observed; the intrinsic viscosity [η] was 1.61 dL/g; the molecular weight obtained by GPC was such that Mw was 320000, Mn was 153000, and Mw/Mn was 2.09; YM was 33 MPa; ΔHS was 29; and the maximum value of tan δ was 0.7 (temperature giving the maximum value: 6° C.). Properties of the resultant polymer are shown in Table 1.

Example 9

Polymerization was performed in the same manner as in Example 2, except that (1-methyl-3-t-butyl-cyclopentadienyl)(2,7-di-t-butyl-fluorenyl)zirconiumdichloride was replaced with di-p-chlorophenylene(cyclopentadienyl)(1,1,4,4,7,7,10,10-octamethyl-1,2,3,4,7,8,9,10-octahydrodibenz(b,h)-fluorenyl)zircon iumdichloride, and the polymerization temperature was 60° C.

The resultant polymer weighed 17.5 g, and the content of propylene in the polymer was 67.2 mol %. With regard to the polymer, Tm was not observed; the intrinsic viscosity [η] was 1.01 dL/g; the molecular weight distribution obtained by GPC was such that Mw was 210000, Mn was 104000, and Mw/Mn was 2.02; YM was 1 MPa; ΔHS was 36; and the maximum value of tan δ was 2.6 (temperature giving the maximum value: 20° C.). Properties of the resultant polymer are shown in Table 1.

Example 10

Into a SUS autoclave with an agitating element having a volume of 1.5 L that had been sufficiently purged with nitrogen, at 23° C., 750 mL of 4-methyl-1-pentene was introduced. Into this autoclave, 0.75 mL of a toluene solution of 1.0 mmol/mL of triisobutylaluminum (TIBAl) was introduced, and the agitator was operated. Then, the autoclave was heated till the temperature of the mixture became 60° C., and pressurization using ethylene was performed such that the total pressure became 0.15 MPaG. Then, 0.1 mL of a previously-prepared toluene solution containing 1.5 mmol in terms of Al of methylaluminoxane and 0.005 mmol of di-p-chlorophenylene(cyclopentadienyl)(1,1,4,4,7,7,10,10-octamethyl-1,2,3,4,7,8,9,10-octahydrodibenz(b,h)-fluorenyl)zircon iumdichloride was injected using nitrogen into the autoclave, thereby initiating polymerization. For the following 30 minutes, temperature of the autoclave was controlled such that the temperature of the mixture was 60° C. At 30 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 24.8 g, and the content of ethylene in the polymer was 21.0 mol %. With regard to the polymer, Tm was not observed; the intrinsic viscosity [η] was 1.0 dL/g; the molecular weight obtained by GPC was such that Mw was 205000, Mn was 103000, and Mw/Mn was 1.99; YM was 1 MPa; ΔHS was 20; and the maximum value of tan δ was 0.7 (temperature giving the maximum value: 23° C.). Properties of the resultant polymer are shown in Table 1.

Example 11

Polymerization was performed in the same manner as in Example 10, except that the pressurization using ethylene was performed such that the total pressure in the polymerization container was 0.68 MPaG.

The resultant polymer weighed 24.8 g, and the content of ethylene in the polymer was 35.0 mol %. With regard to the polymer, Tm was not observed; the intrinsic viscosity [η] was 1.7 dL/g; the molecular weight obtained by GPC was such that Mw was 335000, Mn was 157000, and Mw/Mn was 2.13; YM was 0.3 MPa; ΔHS was 30; and the maximum value of tan δ was 2.7 (temperature giving the maximum value: 2° C.). Properties of the resultant polymer are shown in Table 1.

Example 12

Into a SUS autoclave with an agitating element having a volume of 1.5 L that had been sufficiently purged with nitrogen, at 23° C., 750 mL of 4-methyl-1-pentene was introduced. Into this autoclave, 0.75 mL of a toluene solution of 1.0 mmol/mL of triisobutylaluminum (TIBAl) was introduced, and the agitator was operated. Then, 180 g of butene-1 was injected. The autoclave was heated till the temperature of the mixture became 60° C. Then, 0.75 mL of a previously-prepared toluene solution containing 1 mmol in terms of Al of methylaluminoxane and 0.01 mmol of diphenylmethylene(1-methyl-3-t-butyl-cyclopentadienyl(2,7-di-t-butyl-fluorenyl)zirconiumdichloride was injected using nitrogen into the autoclave, thereby initiating polymerization. For the following 40 minutes, temperature of the autoclave was controlled such that the temperature of the mixture was 60° C. At 40 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 59.4 g, and the content of butene in the polymer was 42.0 mol %. With regard to the polymer, Tm was not observed; the intrinsic viscosity [η] was 1.41 dL/g; the molecular weight distribution obtained by GPC was such that Mw was 290000, Mn was 145000, and Mw/Mn was 2.0; YM was 140 MPa; ΔHS was 16; and the maximum value of tan δ was 0.6 (temperature giving the maximum value: 5° C.). Properties of the resultant polymer are shown in Table 1.

Example 13

Into a SUS autoclave with an agitating element having a volume of 1.5 L that had been sufficiently purged with nitrogen, at 23° C., 750 mL of 4-methyl-1-pentene and 4.5 mL of 5-ethylidene-2-norbornene (ENB) were introduced. Into this autoclave, 0.75 mL of a toluene solution of 1.0 mmol/mL of triisobutylaluminum (TIBAl) was introduced, and the agitator was operated. Then, the autoclave was heated till the temperature of the mixture became 60° C., and pressurization using ethylene was performed such that the total pressure became 0.63 MPaG. Then, 0.34 mL of a previously-prepared toluene solution containing 0.020 mmol of $(C_6H_5)_3CB$ $(C_6F_5)_4$ and 0.005 mmol of di-p-chlorophenylene(cyclopentadienyl)(1,1,4,4,7,7,10,10-octamethyl-1,2,3,4,7,8,9,10-octahydrodibenz(b,h)-fluorenyl) zircon iumdichloride was injected using nitrogen into the autoclave, thereby initiating polymerization. For the following 30 minutes, temperature of the autoclave was controlled such that the temperature of the mixture was 60° C. At 30 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 80° C. under reduced pressure for 12 hours.

The resultant polymer weighed 26.0 g, and the content of ethylene in the polymer was 53.4 mol %, and the content of ENB in the polymer was 1.6 mol %. With regard to the polymer, Tm was not observed; the intrinsic viscosity [η] was 1.29 dL/g; the molecular weight distribution obtained by GPC was such that Mw was 270000, Mn was 123000, and Mw/Mn was 2.2; YM was 1 MPa; ΔHS was 22; and the maximum value of tan δ was 2.8 (temperature giving the maximum value: −16° C.). Properties of the resultant polymer are shown in Table 1.

Comparative Example 1

Into a SUS autoclave with an agitating element having a volume of 1.5 L that had been sufficiently purged with nitrogen, at 23° C., 750 mL of 4-methyl-1-pentene was introduced. Into this autoclave, 0.94 mL of a toluene solution of 1.0 mmol/mL of triethylaluminum (TEA) was introduced and 240 NmL of a hydrogen gas was introduced, and the agitator was operated. Then, the autoclave was heated till the temperature of the mixture became 60° C., and pressurization using propylene was performed such that the total pressure became 0.43 MPaG. Then, 4.7 mL of a toluene solution containing 0.013 mmol of a solid titanium catalyst prepared in accordance with JP-A-2008-144155 was injected using nitrogen into the autoclave, thereby initiating polymerization. For the following 60 minutes, temperature of the autoclave was controlled such that the temperature of the mixture was 60° C. At 60 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 77.1 g, and the content of propylene in the polymer was 85.0 mol %. With regard to the polymer, Tm was 146.1° C.; the intrinsic viscosity [η] was 1.16 dL/g; Mw/Mn was 6.7; YM was 153 MPa; ΔHS was 7; and the maximum value of tan δ was 0.5 (temperature giving the maximum value: 8° C.). Properties of the resultant polymer are shown in Table 1.

It is clear from the change in Shore A hardness and the peak value of tan δ that the stress absorption is inferior.

Comparative Example 2

By reference to Example 5 described in JP-A-2008-144155, a 4-methyl-1-pentene/1-hexene copolymer was obtained.

The content of hexene in the polymer was 45.6 mol %. With regard to the polymer, Tm was 165° C.; the intrinsic viscosity [η] was 2.3 dL/g; the extracted amount under methyl acetate was 1.5 wt %; YM was 153 MPa; ΔHS was 11; and the maximum value of tan δ was 0.3 (temperature giving the maximum value: 1° C.). Properties of the resultant polymer are shown in Table 1.

It is clear from the extracted amount under methyl acetate that the moldability is inferior, and it is clear from the peak value of tan δ that the stress absorption is inferior.

Comparative Example 3

A commercially-available poly(4-methyl-1-pentene) (TPX RT-18, manufactured by Mitsui Chemicals, Inc.) was used. Properties are shown in Table 1. It is clear from the mechanical properties that the flexibility is inferior.

Comparative Example 4

A commercially-available poly(4-methyl-1-pentene) (TPX MX-002, manufactured by Mitsui Chemicals, Inc.) was used. Properties are shown in Table 1. It is clear from the peak value of tan δ that the stress absorption is inferior.

Comparative Example 5

A commercially-available ethylene/propylene/α-olefin (an α-olefin other than 4 MP1) copolymer (TAFMER A4085, manufactured by Mitsui Chemicals, Inc.) was used. Properties are shown in Table 1. It is clear from the mechanical properties that the flexibility is inferior, and it is clear from the peak value of tan δ that the stress absorption is inferior.

Comparative Example 6

A commercially-available hydrogenated styrene/butadiene/styrene copolymer (TAFTEC H1041, manufactured by Asahi Kasei Corporation) was used. Properties are shown in Table 1.

It is clear from the change in Shore A hardness and the peak value of tan δ that the stress absorption is inferior.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Composition | 4MP1 | mol % | 25 | 31 | 47 | 60 | 62 | 71 | 72 |
| | α-olefin content(1) | mol % | 75 | 69 | 53 | 40 | 38 | 29 | 28 |
| | α-olefin type | | propylene | propylene | propylene | propylene | propylene | propylene | propylene |
| | α-olefin content (2) | mol % | | | | | | | |
| | α-olefin type | | | | | | | | |
| | B value | | 0.9 | 0.9 | 0.9 | 1.0 | 1.0 | 1.0 | 1.0 |
| Molecular weight | [η] | dL/g | 1.5 | 1.5 | 1.4 | 1.4 | 1.4 | 1.3 | 1.4 |
| | Mw/Mn | | 2.0 | 2.0 | 2.0 | 2.1 | 2.1 | 2.1 | 2.1 |
| | Mw | | 287000 | 310000 | 285000 | 272000 | 295000 | 257000 | 290000 |
| | Extracted amount under methyl acetate | % | 0.6 | 0.2 | 0.2 | 0.3 | 0.2 | 0.2 | 0.4 |

TABLE 1-continued

| | | | | | | | | | |
|---|---|---|---|---|---|---|---|---|---|
| Lightness | Density | kg/m³ | 847 | 847 | 845 | 840 | 842 | 839 | 839 |
| Mechanical properties | YM | MPa | 1 | 1 | 3 | 15 | 80 | 176 | 72 |
| | TS | MPa | 1 | 2 | 6 | 25 | 24 | 28 | 28 |
| | EL | % | 1237 | 1116 | 672 | 646 | 573 | 523 | 537 |
| Rubber elasticity | PS | % | 24 | 13 | 6 | 3 | 6 | 9 | 15 |
| Heat resistance | Tm | °C. | Not observed | Not observed | Not observed | Not observed | Not observed | Not observed | Not observed |
| Flexibility | Shore hardness(immediately after) | | 40 | 52 | 72 | 88 | 94 | 96 | 95 |
| | Shore hardness(15 sec after) | | 26 | 28 | 34 | 49 | 54 | 72 | 64 |
| | Hardness meter type | | A | A | A | A | A | A | A |
| | ΔHS | | 14 | 24 | 38 | 39 | 40 | 24 | 31 |
| Stress Absorption | Temperature giving tan δ peak | °C. | 6 | 11 | 19 | 24 | 25 | 26 | 30 |
| | tan δ peak value | | 3.5 | 3.2 | 3.4 | 3.0 | 2.8 | 2.5 | 2.2 |
| | Ball drop resilience ratio (25° C.) | % | 1 | 2 | 22 | 27 | 38 | 40 | 30 |
| | (40° C.) | % | 12 | 2 | 1 | 1 | 4 | 4 | 2 |
| Abrasion resistance | Percentage of change in gloss ΔG(%) | | 54 | 14 | 1 | 1 | 4 | 4 | 4 |

| | | | Ex. 8 | Ex. 9 | Ex. 10 | Ex. 11 | Ex. 12 | Ex. 13 | Com. Ex. 1 |
|---|---|---|---|---|---|---|---|---|---|
| Composition | 4MP1 | mol % | 12 | 33 | 79 | 65 | 58 | 45 | 15 |
| | α-olefin content(1) | mol % | 88 | 67 | 21 | 35 | 42 | 53 | 85 |
| | α-olefin type | | propylene | propylene | ethylene | ethylene | butene | ethylene | propylene |
| | α-olefin content (2) | mol % | | | | | | | 1.6 |
| | α-olefin type | | | | | | | | ENB |
| | B value | | 1.0 | 0.9 | 1.3 | 1.2 | 0.9 | 1.0 | 0.8 |
| Molecular weight | [η] | dL/g | 1.6 | 1.0 | 1.0 | 1.7 | 1.4 | 1.3 | 1.2 |
| | Mw/Mn | | 2.1 | 2.0 | 2.0 | 2.1 | 2.0 | 2.2 | 6.7 |
| | Mw | | 320000 | 210000 | 205000 | 335000 | 290000 | 270000 | 275000 |
| | Extracted amount under methyl acetate | % | 0.4 | 0.3 | 0.2 | 0.4 | 0.3 | 0.4 | 1.8 |
| Lightness | Density | kg/m³ | 850 | 840 | 848 | 845 | 847 | 843 | 860 |
| Mechanical properties | YM | MPa | 33 | 1 | 1 | 0.3 | 140 | 1 | 153 |
| | TS | MPa | 36 | 3 | 5 | 25 | 5 | 3 | 4 |
| | EL | % | 763 | 1052 | 1307 | 925 | 310 | 712 | 213 |
| Rubber elasticity | PS | % | 6 | 11 | | 3 | | | 76 |
| Heat resistance | Tm | °C. | Not observed | Not observed | Not observed | Not observed | Not observed | Not observed | 146 |
| Flexibility | Shore hardness(immediately after) | | 92 | 94 | 95 | 90 | 96 | 62 | 89 |
| | Shore hardness(15 sec after) | | 63 | 58 | 75 | 60 | 80 | 40 | 82 |
| | Hardness meter type | | A | A | A | A | A | A | A |
| | ΔHS | | 29 | 36 | 20 | 30 | 16 | 22 | 7 |
| Stress Absorption | Temperature giving tan δ peak | °C. | 6 | 20 | 23 | 2 | 5 | −16 | 8 |
| | tan δ peak value | | 0.7 | 2.6 | 0.7 | 2.7 | 0.6 | 2.8 | 0.5 |
| | Ball drop resilience ratio (25° C.) | % | 7 | 38 | 25 | 2 | 17 | 2 | 20 |
| | (40° C.) | % | 21 | 5 | 5 | 8 | 22 | 16 | 26 |
| Abrasion resistance | Percentage of change in gloss ΔG(%) | | 18 | 2 | 4 | 1 | | | |

| | | | Com. Ex. 1 | Com. Ex. 2 | Com. Ex. 3 | Com. Ex. 4 | Com. Ex. 5 | Com. Ex. 6 |
|---|---|---|---|---|---|---|---|---|
| Composition | 4MP1 | mol % | 15 | | | | | |
| | α-olefin content(1) | mol % | 85 | | | | | |
| | α-olefin type | | propylene | | | | | |
| | α-olefin content (2) | mol % | | | | | | |
| | α-olefin type | | | | | | | |
| | B value | | 0.8 | | | | | |
| Molecular weight | [η] | dL/g | 1.2 | | | | | |
| | Mw/Mn | | 6.7 | | | | | |
| | Mw | | 275000 | | | | | |
| | Extracted amount under methyl acetate | % | 1.8 | 1.5 | | | | |
| Lightness | Density | kg/m³ | 860 | 840 | 833 | 835 | 885 | 910 |
| Mechanical properties | YM | MPa | 153 | 153 | 1324 | 691 | 4 | 57 |
| | TS | MPa | 4 | 5 | 24 | 22 | 27 | 22 |
| | EL | % | 213 | 209 | 24 | 338 | 800 | 650 |
| Rubber elasticity | PS | % | 76 | | | | | |
| Heat resistance | Tm | °C. | 146 | 165 | 237 | 222 | 73 | 105 |
| Flexibility | Shore hardness(immediately after) | | 89 | 95 | 75 | 64 | 83 | 84 |
| | Shore hardness(15 sec after) | | 82 | 84 | 74 | 62 | 82 | 80 |
| | Hardness meter type | | A | A | D | D | A | A |
| | ΔHS | | 7 | 11 | 1 | 2 | 1 | 4 |
| Stress Absorption | Temperature giving tan δ peak | °C. | 8 | 1 | 32 | 31 | −27 | −43 |
| | tan δ peak value | | 0.5 | 0.3 | 0.3 | 0.2 | 0.3 | 0.3 |

TABLE 1-continued

|  |  |  |  |  |  |  |  |  |
|---|---|---|---|---|---|---|---|---|
|  | Ball drop resilience ratio (25° C.) | % | 20 | 25 | 35 | 28 | 41 | 40 |
|  | (40° C.) | % | 26 | 28 | 24 | 22 | 48 | 45 |
| Abrasion resistance | Percentage of change in gloss ΔG(%) |  |  | 2 | 3 | 2 | 94 | 30 |

Example 14

83 parts by weight of the 4-methyl-1-pentene/α-olefin copolymer obtained in Example 2 was blended with 17 parts by weight of Clearon P-125, a terpene-based hydrogenated resin manufactured by Yasuhara Chemical Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 2.

It is clear from the large change ΔHS in Shore A hardness that the stress absorption is excellent, and it is clear from the peak value of tan δ (tan δ: 2.8, temperature giving the maximum value: 20° C.) that the stress absorption is excellent.

Example 15

83 parts by weight of the 4-methyl-1-pentene/α-olefin copolymer obtained in Example 5 was blended with 17 parts by weight of Clearon P-125, a terpene-based hydrogenated resin manufactured by Yasuhara Chemical Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 2.

It is clear from the large change ΔHS (=20) in Shore A hardness that the stress absorption is excellent, and it is clear from the peak value of tan δ (tan δ: 2.6, temperature giving the maximum value: 28° C.) that the stress absorption is excellent.

Example 16

60 parts by weight of the 4-methyl-1-pentene/α-olefin copolymer obtained in Example 5 was blended with 40 parts by weight of TAFTEC H1041, a hydrogenated styrene-based thermoplastic elastomer manufactured by Asahi Kasei Corporation. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 2.

It is clear from the large change ΔHS (=22) in Shore A hardness that the stress absorption is excellent, and it is clear from the peak value of tan δ (tan δ: 0.8, temperature giving the maximum value: 22° C.) that the stress absorption is excellent.

Example 17

80 parts by weight of the 4-methyl-1-pentene/α-olefin copolymer obtained in Example 5 was blended with 20 parts by weight of PW-100, a process oil manufactured by Idemitsu Kosan Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 2.

It is clear from the large change ΔHS in Shore A hardness that the stress absorption is excellent, and it is clear from the peak value of tan δ(tan δ: 3.3, temperature giving the maximum value: 7° C.) that the stress absorption is excellent.

Example 18

60 parts by weight of the 4-methyl-1-pentene/α-olefin copolymer obtained in Example 5 was blended with 40 parts by weight of PW-100, a process oil manufactured by Idemitsu Kosan Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 2.

It is clear from the large change ΔHS in Shore A hardness that the stress absorption is excellent, and it is clear from the peak value of tan δ (tan δ: 2.8, temperature giving the maximum value: −11° C.) that the stress absorption is excellent.

TABLE 2

|  | Ex. 14 | Ex. 15 | Ex. 16 | Ex. 17 | Ex. 18 |
|---|---|---|---|---|---|
| Polymer (A) | Ex. 2 | Ex. 5 | Ex. 5 | Ex. 5 | Ex. 5 |
| Thermoplastic resin (B) | P-125 | P-125 | H1041 PW-100 | PW-100 | PW-100 |
| (A)/(B) compositional ratio (wt %) | 83/17 | 83/17 | 60/40 | 80/20 | 60/40 |
| YM | 2 | 86 | 70 | 1 | 0.1 |
| TS | 5 | 20 | 20 | 0.3 | 0.1 |
| EL | 869 | 495 | 450 | 1031 | 1200 |
| Shore hardness (immediately after) | 71 | 95 | 94 | 32 | 15 |
| Shore hardness (15 sec after) | 29 | 75 | 72 | 16 | 4 |
| Hardness meter | A | A | A | A | A |
| ΔHS | 42 | 20 | 22 | 16 | 11 |
| Temperature giving tan δ peak (° C.) | 20 | 28 | 22 | 7 | −11 |
| tan δ peak value | 2.8 | 2.6 | 0.8 | 3.3 | 2.8 |
| Ball drop resilience ratio (25° C.) (%) | 7 | 38 | 36 | 3 | 21 |
| Ball drop resilience ratio (40° C.) (%) | 10 | 1 | 4 | 2 | 3 |
| Internal Haze | 2 | 12 | 33 | 10 | 11 |

Example 19

20 parts by weight of the 4-methyl-1-pentene/α-olefin copolymer obtained in Example 2 was blended with 80 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear from the large elongation that the modification property is excellent, and it is clear from the percentage of change in gloss that the abrasion resistance is excellent, and further it is clear from the softening temperature that the heat resistance is excellent. It is also clear that the transparency is not impaired.

Example 20

40 parts by weight of the 4-methyl-1-pentene/α-olefin copolymer obtained in Example 2 was blended with 60 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear from the large elongation that the modification property is excellent, and it is clear from the percentage of change in gloss that the abrasion resistance is excellent, and further it is clear from the softening temperature that the heat resistance is excellent.

Example 21

20 parts by weight of the 4-methyl-1-pentene/α-olefin copolymer obtained in Example 5 was blended with 80 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear from the large elongation that the modification property is excellent, and it is clear from the percentage of change in gloss that the abrasion resistance is excellent, and further it is clear from the softening temperature that the heat resistance is excellent.

Example 22

20 parts by weight of the 4-methyl-1-pentene/α-olefin copolymer obtained in Example 2 was blended with 80 parts by weight of poly(4-methyl-1-pentene) (TPX RT-18, manufactured by Mitsui Chemicals, Inc., a homopolymer). Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 260° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear from the large elongation that the modification property is excellent, and it is clear from the percentage of change in gloss that the abrasion resistance is excellent, and further it is clear from the softening temperature that the heat resistance is excellent.

Example 23

20 parts by weight of the 4-methyl-1-pentene/α-olefin copolymer obtained in Example 5 was blended with 80 parts by weight of poly(4-methyl-1-pentene) (TPX RT-18, manufactured by Mitsui Chemicals Inc.). Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 260° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear from the large elongation that the modification property is excellent, and it is clear from the percentage of change in gloss that the abrasion resistance is excellent, and further it is clear from the softening temperature that the heat resistance is excellent. It is also clear that the transparency is not impaired.

Example 24

40 parts by weight of the 4-methyl-1-pentene/α-olefin copolymer obtained in Example 5 was blended with 60 parts by weight of poly(4-methyl-1-pentene) (TPX RT-18, manufactured by Mitsui Chemicals Inc.). Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 260° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear from the large elongation that the modification property is excellent, and it is clear from the percentage of change in gloss that the abrasion resistance is excellent, and further it is clear from the softening temperature that the heat resistance is excellent. It is also clear that the transparency is not impaired.

Comparative Example 7

20 parts by weight of the ethylene/α-olefin copolymer shown in Comparative Example 5 was blended with 80 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear that the percentage of change in gloss is higher as compared with Examples, and the transparency is impaired.

Comparative Example 8

20 parts by weight of the ethylene/α-olefin copolymer shown in Comparative Example 5 was blended with 80 parts by weight of poly(4-methyl-1-pentene) (TPX RT-18, manufactured by Mitsui Chemicals Inc.). Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 260° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 3.

It is clear that the percentage of change in gloss is higher, the transparency is lower, and the elongation is inferior, as compared with Examples.

TABLE 3

|  |  | Ex. 19 | Ex. 20 | Ex. 21 | Ex. 22 | Ex. 23 | Ex. 24 | Com. Ex. 7 | Com. Ex. 8 |
| --- | --- | --- | --- | --- | --- | --- | --- | --- | --- |
| Polymer (A) |  | Ex. 2 | Ex. 2 | Ex. 5 | Ex. 2 | Ex. 5 | Ex. 5 | Com. Ex. 5 | Com. Ex. 5 |
| Thermoplastic resin (B) |  | F107P | F107P | F107P | RT-18 | RT-18 | RT-18 | F107 | RT-18 |
| (A)/(B) compositional ratio (wt %) |  | 20/80 | 40/60 | 20/80 | 20/80 | 20/80 | 40/60 | 20/80 | 20/80 |
| Percentage of change in gloss ΔG | % | 3 | 1 | 1 | 10 | 3 | 0 | 30 | 30 |
| Tm | ° C. | 162 | 162 | 162 | 236 | 236 | 236 | 162 | 236 |
| Softening temperature | ° C. | 158 | 156 | 160 | 235 | 231 | 228 | 160 | 235 |
| YS | MPa | 25 | 14 | 26 | 19 | 19 | 13 | 27 | 25 |
| EL | % | 668 | 750 | 621 | 154 | 295 | 257 | 1000 | 56 |
| TS | MPa | 39 | 35 | 42 | 17 | 26 | 21 | 40 | 21 |
| YM | MPa | 960 | 660 | 1129 | 1086 | 964 | 610 | 1080 | 1100 |
| Internal Haze | % | 57 | 70 | 93 | 34 | 13 | 16 | 93 | 91 |

Example 25

90 parts by weight of the 4-methyl-1-pentene/α-olefin copolymer obtained in Example 1 was blended with 10 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=13) in Shore A hardness and the high peak value of tan δ (tan δ: 1.7, temperature giving the maximum value: 6.4° C.) that the stress absorption is excellent.

Example 26

70 parts by weight of the 4-methyl-1-pentene/α-olefin copolymer obtained in Example 1 was blended with 30 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=8) in Shore A hardness and the high peak value of tan δ (tan δ: 0.9, temperature giving the maximum value: 6.6° C.) that the stress absorption is excellent.

Example 27

80 parts by weight of the 4-methyl-1-pentene/α-olefin copolymer obtained in Example 1 was blended with 20 parts by weight of PRIMETPO M2606, manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=15) in Shore A hardness and the high peak value of tan δ (tan δ: 1.7, temperature giving the maximum value: 6.3° C.) that the stress absorption is excellent.

Example 28

60 parts by weight of the 4-methyl-1-pentene/α-olefin copolymer obtained in Example 1 was blended with 40 parts by weight of PRIMETPO M2606, manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm³), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=10) in Shore A hardness and the high peak value of tan δ (tan δ: 1.0, temperature giving the maximum value: 8.8° C.) that the stress absorption is excellent.

Example 29

70 parts by weight of the 4-methyl-1-pentene/α-olefin copolymer obtained in Example 1 was blended with 30 parts by weight of TAFMER XM7070, manufactured by Mitsui Chemicals, Inc. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm³), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=15) in Shore A hardness and the high peak value of tan δ (tan δ: 1.1, temperature giving the maximum value: 6.4° C.) that the stress absorption is excellent.

Example 30

80 parts by weight of the 4-methyl-1-pentene/α-olefin copolymer obtained in Example 2 was blended with 20 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm³), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=17) in Shore A hardness and the high peak value of tan δ (tan δ: 1.1, temperature giving the maximum value: 10° C.) that the stress absorption is excellent.

Example 31

80 parts by weight of the 4-methyl-1-pentene/α-olefin copolymer obtained in Example 3 was blended with 20 parts by weight of poly(4-methyl-1-pentene) (TPX RT-18, manufactured by Mitsui Chemicals Inc.). Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 260° C., with the resins charged in an amount of 40 g (apparatus batch volume=60 cm³), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=21) in Shore A hardness and the high peak value of tan δ (tan δ: 1.7, temperature giving the maximum value: 12° C.) that the stress absorption is excellent.

Example 32

80 parts by weight of the 4-methyl-1-pentene/α-olefin copolymer obtained in Example 5 was blended with 20 parts by weight of F107P, a polypropylene manufactured by Prime Polymer Co., Ltd. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm³), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=24) in Shore A hardness and the high peak value of tan δ (tan δ: 1.9, temperature giving the maximum value: 25° C.) that the stress absorption is excellent.

Example 33

80 parts by weight of the 4-methyl-1-pentene/α-olefin copolymer obtained in Example 5 was blended with 20 parts by weight of poly(4-methyl-1-pentene) (TPX RT-18, manufactured by Mitsui Chemicals Inc.). Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 260° C., with the resins charged in an amount of 40 g (apparatus batch volume=60 cm³), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=20) in Shore A hardness and the high peak value of tan δ (tan δ: 1.5, temperature giving the maximum value: 25° C.) that the stress absorption is excellent.

Example 34

65 parts by weight of the 4-methyl-1-pentene/α-olefin copolymer obtained in Example 1 was blended with 35 parts by weight of HYBRAR 5127, a hydrogenated styrene/isoprene/styrene copolymer manufactured by Kuraray Co., Ltd. Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=20) in Shore A hardness and the high peak value of tan δ (tan δ: 1.2, temperature giving the maximum value: 16° C.) that the stress absorption is excellent.

Example 35

20 parts by weight of the 4-methyl-1-pentene/α-olefin copolymer obtained in Example 1 was blended with 80 parts by weight of HYBRAR 5127, a hydrogenated styrene/isoprene/styrene copolymer manufactured by Kuraray Co., Ltd. Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=22) in Shore A hardness and the high peak value of tan δ (tan δ: 1.3, temperature giving the maximum value: 19° C.) that the stress absorption is excellent.

Example 36

65 parts by weight of the 4-methyl-1-pentene/α-olefin copolymer obtained in Example 4 was blended with 35 parts by weight of HYBRAR 5127, a hydrogenated styrene/isoprene/styrene copolymer manufactured by Kuraray Co., Ltd. Further, the resultant mixture was blended with 1000 ppm of Irganox 1010, a hindered phenol-based antioxidant, 1000 ppmof Irgafos 168, a phosphorus-based processing heat stabilizer, each of which is manufactured by Ciba Japan K. K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=39) in Shore A hardness and the high peak value of tan δ (tan δ: 2.2, temperature giving the maximum value: 24° C.) that the stress absorption is excellent.

Example 37

20 parts by weight of the 4-methyl-1-pentene/α-olefin copolymer obtained in Example 4 was blended with 80 parts by weight of HYBRAR 5127, a hydrogenated styrene/isoprene/styrene copolymer manufactured by Kuraray Co., Ltd. Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=26) in Shore A hardness and the high peak value of tan δ (tan δ: 1.2, temperature giving the maximum value: 21° C.) that the stress absorption is excellent.

Example 38

80 parts by weight of the 4-methyl-1-pentene/α-olefin copolymer obtained in Example 4 was blended with 20 parts by weight of a poly-1-butene manufactured by Mitsui Chemicals, Inc. (TAFMER BL P5000). Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=26) in Shore A hardness and the high peak value of tan δ (tan δ: 1.4, temperature giving the maximum value: 19° C.) that the stress absorption is excellent.

Example 39

90 parts by weight of the 4-methyl-1-pentene/α-olefin copolymer obtained in Example 4 was blended with 10 parts by weight of a poly-1-butene manufactured by Mitsui Chemicals, Inc. (TAFMER BL P5000). Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=35) in Shore A hardness and the high peak value of tan δ (tan δ: 1.9, temperature giving the maximum value: 20° C.) that the stress absorption is excellent.

Example 40

90 parts by weight of the 4-methyl-1-pentene/α-olefin copolymer obtained in Example 3 was blended with 10 parts by weight of a poly-1-butene manufactured by Mitsui Chemicals, Inc. (TAFMER BL P5000). Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (4HS=32) in Shore A hardness and the high peak value of tan δ (tan δ: 1.8, temperature giving the maximum value: 19° C.) that the stress absorption is excellent.

Example 41

90 parts by weight of the 4-methyl-1-pentene/α-olefin copolymer obtained in Example 4 was blended with 10 parts by weight of E-200GP, a polypropylene manufactured by Prime Polymer Co., Ltd. Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=37) in Shore A hardness and the high peak value of tan δ (tan δ: 2.5, temperature giving the maximum value: 22° C.) that the stress absorption is excellent.

Example 42

90 parts by weight of the 4-methyl-1-pentene/α-olefin copolymer obtained in Example 4 was blended with 10 parts by weight of BL2481, a poly-1-butene copolymer manufactured by Mitsui Chemicals, Inc. Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change (ΔHS=33) in Shore A hardness and the high peak value of tan δ (tan δ: 1.4, temperature giving the maximum value: 20° C.) that the stress absorption is excellent.

Example 43

90 parts by weight of the 4-methyl-1-pentene/α-olefin copolymer obtained in Example 4 was blended with 10 parts by weight of TAFMER XM7070 manufactured by Mitsui Chemicals, Inc. Further, the resultant mixture was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 4.

It is clear from the large change ($\Delta HS=33$) in Shore A hardness and the high peak value of tan δ (tan δ: 2.4, temperature giving the maximum value: 21° C.) that the stress absorption is excellent.

Comparative Example 2

Comparative Example 2 is also shown in Table 4 for reference.

TABLE 4

| | | Ex. 25 | Ex. 26 | Ex. 27 | Ex. 28 | Ex. 29 | Ex. 30 | Ex. 31 |
|---|---|---|---|---|---|---|---|---|
| Polymer (A) | | Ex. 1 | Ex. 1 | Ex. 1 | Ex. 1 | Ex. 1 | Ex. 2 | Ex. 3 |
| Thermoplastic resin (B) | | F107P | F107P | M2606 | M2606 | XM-7070 | F107P | RT-18 |
| (A)/(B) compositional ratio (wt %) | | 90/10 | 70/30 | 80/20 | 60/40 | 70/30 | 80/20 | 80/20 |
| EL | % | 853 | 548 | 819 | 862 | 888 | 903 | 757 |
| TS | MPa | 9 | 16 | 5 | 16 | 32 | 20 | 5 |
| YM | MPa | 4 | 30 | 3 | 12 | 71 | 4 | 5 |
| Melting point (Tm) | ° C. | 162 | 162 | 160 | 160 | 70 | 162 | 236 |
| Shore hardness (immediately after) | | 58 | 86 | 56 | 76 | 76 | 79 | 73 |
| Shore hardness (15 sec after) | | 45 | 78 | 41 | 64 | 61 | 62 | 52 |
| Hardness meter type | | A | A | A | A | A | A | A |
| ΔHS | | 13 | 8 | 15 | 10 | 15 | 17 | 21 |
| Temperature giving tan δ peak | ° C. | 6.4 | 6.6 | 6.3 | 8.8 | 6.4 | 10 | 12 |
| tan δ peak value | | 1.7 | 0.9 | 1.7 | 1.0 | 1.1 | 1.1 | 1.7 |
| Ball drop resilience ratio (25° C.) | % | 3 | 8 | 4 | 7 | 6 | 5 | 2 |
| Ball drop resilience ratio (40° C.) | % | 14 | 18 | 14 | 20 | 12 | 26 | 21 |

| | | Ex. 32 | Ex. 33 | Ex. 34 | Ex. 35 | Ex. 36 | Ex. 37 |
|---|---|---|---|---|---|---|---|
| Polymer (A) | | Ex. 5 | Ex. 5 | Ex. 1 | Ex. 1 | Ex. 4 | Ex. 4 |
| Thermoplastic resin (B) | | F107P | RT-18 | HYBRAR 5127 | HYBRAR 5127 | HYBRAR 5127 | HYBRAR 5127 |
| (A)/(B) compositional ratio (wt %) | | 80/20 | 80/20 | 65/35 | 20/80 | 65/35 | 20/80 |
| EL | % | 571 | 519 | 707 | 672 | 656 | 687 |
| TS | MPa | 30 | 26 | 5 | 12 | 25 | 21 |
| YM | MPa | 128 | 125 | 2 | 8 | 15 | 20 |
| Melting point (Tm) | ° C. | 162 | 236 | 100 | 100 | 100 | 100 |
| Shore hardness (immediately after) | | 89 | 90 | 56 | 81 | 83 | 85 |
| Shore hardness (15 sec after) | | 65 | 70 | 36 | 59 | 44 | 59 |
| Hardness meter type | | A | A | A | A | A | A |
| ΔHS | | 24 | 20 | 20 | 22 | 39 | 26 |
| Temperature giving tan δ peak | ° C. | 25 | 25 | 16 | 19 | 24 | 21 |
| tan δ peak value | | 1.9 | 1.5 | 1.2 | 1.3 | 2.2 | 1.2 |
| Ball drop resilience ratio (25° C.) | % | 31 | 33 | 4 | 8 | 14 | 10 |
| Ball drop resilience ratio (40° C.) | % | 7 | 6 | 16 | 20 | 33 | 27 |

| | | Ex. 38 | Ex. 39 | Ex. 40 | Ex. 41 | Ex. 42 | Ex. 43 | Com. Ex. 2 |
|---|---|---|---|---|---|---|---|---|
| Polymer (A) | | Ex. 4 | Ex. 4 | Ex. 3 | Ex. 4 | Ex. 4 | Ex. 4 | Com. Ex. 2 |
| Thermoplastic resin (B) | | P5000 | P5000 | P5000 | E-200GP | BL2481 | XM-7070 | |
| (A)/(B) compositional ratio (wt %) | | 80/20 | 90/10 | 90/10 | 90/10 | 90/10 | 90/10 | 100 |
| EL | % | 725 | 656 | 658 | 721 | 744 | 670 | 209 |
| TS | MPa | 21 | 12 | 12 | 16 | 16 | 11 | 5 |
| YM | MPa | 9 | 4 | 4 | 2 | 7 | 2 | 153 |
| Melting point (Tm) | ° C. | 120 | 120 | 120 | 160 | 75 | 70 | 165 |
| Shore hardness (immediately after) | | 80 | 76 | 75 | 77 | 80 | 69 | 95 |
| Shore hardness (15 sec after) | | 54 | 41 | 43 | 40 | 47 | 36 | 84 |
| Hardness meter | | A | A | A | A | A | A | A |
| ΔHS | | 26 | 35 | 32 | 37 | 33 | 33 | 11 |
| Temperature giving tan δ peak | ° C. | 19 | 20 | 19 | 22 | 20 | 21 | 1 |
| tan δ peak value | | 1.4 | 1.9 | 1.8 | 2.5 | 1.4 | 2.4 | 0.3 |
| Ball drop resilience ratio (25° C.) (%) | % | | | | | | | 25 |
| Ball drop resilience ratio (40° C.) (%) | % | | | | | | | 28 |

Example 44

15 parts by weight of the 4-methyl-1-pentene/α-olefin copolymer obtained in Example 1 and 140 parts by weight of an ethylene/propylene/5-ethylidene-2-norbornene ternary copolymer [product name: Mitsui EPT3072EM, manufactured by Mitsui Chemicals, Inc.] were kneaded with 5 parts by weight of zinc oxide No (product name; zinc oxide No. 2, manufactured by Hakusuitech Ltd.) as a vulcanization promoting assistant, 1 part by weight of stearic acid as a processing assistant, 47 parts by weight of "Diana Process Oil PW-380" (product name; manufactured by Idemitsu Kosan, Co., Ltd.) as a softener, and 80 parts by weight of carbon black (product name: SEAST G116, manufactured by Tokai Carbon Co., Ltd.). Kneading conditions were such that the number of rotor revolution was 50 rpm, the floating weight pressure was 3 kg/cm², the kneading time was 5 minutes, and the kneading discharge temperature was 145° C. Then, after the temperature of the above mixture was observed to become 40° C., using a 14-inch roll, the above mixture was kneaded with 1.5 parts by weight of "Sanceler PZ" (product name; manufactured by Sanshin Chemical Industry Co., Ltd.) as a vulcanization promoting assistant, 1.5 parts by weight of "Sanceler TT" (product name; manufactured by Sanshin Chemical Industry Co., Ltd.) as a vulcanization promoting assistant, 0.5 part by weight of "Sanceler M" (product name; manufactured by Sanshin Chemical Industry Co., Ltd.) as a vulcanization promoting assistant, and 0.75 part by weight of sulfur as a vulcanizing agent. Kneading conditions were such that the roll temperature was front roll/rear roll=65° C./50° C., the number of roll revolution was front roll/rear roll=13 rpm/11.5 rpm, the interval between rolls was 5 mm, and the kneading time was 8 minutes, thereby performing sheeting. Then, this mixture was subjected to vulcanization at 170° C. for 10 minutes using a press molding machine, to thereby prepare a rubber sheet with a thickness of 2 mm, and then properties were measured. Results of various measurements are shown in Table 5.

Example 45

The same operation was performed as in Example 44, except that the 4-methyl-1-pentene/α-olefin copolymer obtained in Example 1 was used in an amount of 30 parts by weight, thereby preparing a rubber sheet with a thickness of 2 mm, and properties were measured. Results of various measurements are shown in Table 5.

Example 46

The same operation was performed as in Example 44, except that the 4-methyl-1-pentene/α-olefin copolymer obtained in Example 4 was used in an amount of 15 parts by weight, thereby preparing a rubber sheet with a thickness of 2 mm, and properties were measured. Results of various measurements are shown in Table 5.

Example 47

The same operation was performed as in Example 44, except that the 4-methyl-1-pentene/α-olefin copolymer obtained in Example 4 was used in an amount of 30 parts by weight, thereby preparing a rubber sheet with a thickness of 2 mm, and properties were measured. Results of various measurements are shown in Table 5.

Comparative Example 9

The same operation was performed as in Example 44, except that the 4-methyl-1-pentene/α-olefin copolymer was not contained, thereby preparing a rubber sheet with a thickness of 2 mm, and properties were measured. Results of various measurements are shown in Table 5.

TABLE 5

|  |  | Ex. 44 | Ex. 45 | Ex. 46 | Ex. 47 | Com. Ex. 9 |
|---|---|---|---|---|---|---|
| Polymer (A) |  |  |  |  |  |  |
| Example 1 |  | 15 | 30 |  |  |  |
| Example 4 |  |  |  | 15 | 30 |  |
| Thermoplastic resin (B) |  |  |  |  |  |  |
| 3072EM |  | 140 | 140 | 140 | 140 | 140 |
| Zinc oxide |  | 5 | 5 | 5 | 5 | 5 |
| Stearic acid |  | 1 | 1 | 1 | 1 | 1 |
| SEAST G116 |  | 80 | 80 | 80 | 80 | 80 |
| PW-380 |  | 47 | 47 | 47 | 47 | 47 |
| EL | % | 700 | 680 | 700 | 680 | 720 |
| TS | MPa | 18 | 13 | 16 | 14 | 19 |
| Shore hardness (immediately after) |  | 54 | 52 | 54 | 53 | 55 |
| Shore hardness (15 sec after) |  | 44 | 40 | 43 | 43 | 46 |
| Hardness meter type |  | A | A | A | A | A |
| ΔHS |  | 10 | 12 | 11 | 10 | 9 |
| Temperature giving tan δ peak | ° C. | −42 | −40 | −39 | −41 | −41 |
| tan δ peak value |  | 0.5 | 0.4 | 0.5 | 0.5 | 0.5 |
| tan δ value (−15° C.) |  | 0.22 | 0.34 | 0.18 | 0.18 | 0.10 |
| tan δ value (10° C.) |  | 0.12 | 0.14 | 0.18 | 0.28 | 0.12 |
| Ball drop resilience ratio (25° C.) | % | 24 | 17 | 24 | 24 | 30 |

Polymerization Example (AA-1)

Into a SUS autoclave with an agitating element having a volume of 1.5 L that had been sufficiently purged with nitrogen, at 23° C., 750 mL of 4-methyl-1-pentene was introduced. Into this autoclave, 0.75 mL of a toluene solution of 1.0 mmol/mL of triisobutylaluminum (TIBAl) was introduced, and the agitator was operated. Then, the autoclave was heated till the temperature of the mixture became 30° C., and pressurization using propylene was performed such that the total pressure became 0.74 MPaG. Then, 0.34 mL of a previously-prepared toluene solution containing 1 mmol in terms of Al of methylaluminoxane and 0.005 mmol of diphenylmethylene(1-ethyl-3-t-butyl-cyclopentadienyl) (2,7-di-t-butyl-fluorenyl)zirconiumdichloride was injected using nitrogen into the autoclave, thereby initiating polymerization. For the following 60 minutes, temperature of the autoclave was controlled such that the temperature of the mixture was 60° C. At 60 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 56.3 g, and the content of propylene in the polymer was 40.4 wt %. With regard to the polymer, Tm was not observed; the intrinsic viscosity [η] was 1.5 dL/g; the molecular weight distribution obtained by GPC was such that Mw was 287000, Mn was 144000, and Mw/Mn was 2.0; and ΔHS was 14. Properties of the resultant polymer are shown in Table 6.

Polymerization Example (AA-2)

Into a SUS autoclave with an agitating element having a volume of 1.5 L that had been sufficiently purged with nitrogen, at 23° C., 750 mL of 4-methyl-1-pentene was introduced. Into this autoclave, 0.75 mL of a toluene solution of 1.0 mmol/mL of triisobutylaluminum (TIBAl) was introduced, and the agitator was operated. Then, the autoclave was heated till the temperature of the mixture became 30° C., and pressurization using propylene was performed such that the total pressure became 0.68 MPaG. Then, 0.34 mL of a previously-prepared toluene solution containing 1 mmol in terms of Al of methylaluminoxane and 0.005 mmol of diphenylmethylene (1-methyl-3-t-butyl-cyclopentadienyl) (2,7-di-t-butyl-fluorenyl)zirconiumdichloride was injected using nitrogen into the autoclave, thereby initiating polymerization. For the following 60 minutes, temperature of the autoclave was controlled such that the temperature of the mixture was 60° C. At 60 minutes past the initiation of the polymerization, 5 mL of methanol was injected using nitrogen into the autoclave, thereby terminating the polymerization and depressurizing the autoclave to atmospheric pressure. Into the reaction solution, acetone was poured with stirring. The resultant solvent-containing rubber polymer was dried at 130° C. under reduced pressure for 12 hours.

The resultant polymer weighed 45.9 g, and the content of 4-methyl-1-pentene in the polymer was 47.4 wt %. With regard to the polymer, Tm was not observed; the intrinsic viscosity [η] was 1.47 dL/g; the molecular weight distribution obtained by GPC was such that Mw was 310000, Mn was 155000, and Mw/Mn was 2.0; and ΔHS was 24. Properties of the resultant polymer are shown in Table 6.

Polymerization Example (AA-3)

Polymerization was performed in the same manner as in Polymerization Example AA-2, except that the pressurization using propylene was performed such that the total pressure in the polymerization container was 0.35 MPaG.

The resultant polymer weighed 46.9 g, and the content of 4-methyl-1-pentene in the polymer was 64.0 wt %. With regard to the polymer, Tm was not observed; the intrinsic viscosity [η] was 1.41 dL/g; the molecular weight distribution obtained by GPC was such that Mw was 285000, Mn was 143000, and Mw/Mn was 2.0; and ΔHS was 38. Properties of the resultant polymer are shown in Table 6.

Polymerization Example (AA-4)

Polymerization was performed in the same manner as in Polymerization Example AA-2, except that the pressurization using propylene was performed such that the total pressure in the polymerization container was 0.15 MPaG.

The resultant polymer weighed 46.9 g, and the content of 4-methyl-1-pentene in the polymer was 76.6 wt %. With regard to the polymer, Tm was not observed; the intrinsic viscosity [η] was 1.44 dL/g; the molecular weight distribution obtained by GPC was such that Mw was 295000, Mn was 142000, and Mw/Mn was 2.09; and ΔHS was 40. Properties of the resultant polymer are shown in Table 6.

Polymerization Example (AA-5)

Polymerization was performed in the same manner as in Polymerization Example AA-2, except that the pressurization using propylene was performed such that the total pressure in the polymerization container was 0.15 MPaG, and the polymerization temperature was 60° C.

The resultant polymer weighed 24.0 g, and the content of 4-methyl-1-pentene in the polymer was 83.0 wt %. With regard to the polymer, Tm was not observed; the intrinsic viscosity [η] was 1.31 dL/g; the molecular weight distribution obtained by GPC was such that Mw was 257000, Mn was 124000, and Mw/Mn was 2.08; and ΔHS was 24. Properties of the resultant polymer are shown in Table 6.

TABLE 6

| Polymerization Example | | | | AA-1 | AA-2 | AA-3 | AA-4 | AA-5 |
|---|---|---|---|---|---|---|---|---|
| Composition | 4MP1 | | wt % | 40 | 47 | 64 | 77 | 83 |
| | α-olefin content(1) | | wt % | 60 | 53 | 36 | 23 | 17 |
| | α-olefin type | | | propylene | propylene | propylene | propylene | propylene |
| Molecular weight | [η] | | dL/g | 1.5 | 1.5 | 1.4 | 1.4 | 1.3 |
| | Mw/Mn | | | 2.0 | 2.0 | 2.0 | 2.1 | 2.1 |
| | Mw | | | 287000 | 310000 | 285000 | 295000 | 257000 |
| Heat resistance | Tm | | ° C. | Not Observed | Not Observed | Not Observed | Not Observed | Not observed |
| Flexibility | Shore hardness(immediately after) | | | 40 | 52 | 72 | 94 | 96 |
| | Shore hardness(15 sec after) | | | 26 | 28 | 34 | 54 | 72 |
| | Hardness meter type | | | A | A | A | A | A |
| | ΔHS | | | 14 | 24 | 38 | 40 | 24 |
| Stress Absorption | Temperature giving tan δ peak | | ° C. | 6 | 11 | 19 | 25 | 26 |
| | tan δ peak value | | | 3.5 | 3.2 | 3.4 | 2.8 | 2.5 |

[Crystalline Olefin Resin (BB-1)]

A commercially-available polypropylene (F107P, manufactured by Prime Polymer Co., Ltd.) was used. Properties of the polymer are shown in Table 7.

[Crystalline Olefin Resin (BB-2)]

A commercially-available polypropylene (F327, manufactured by Prime Polymer Co., Ltd.) was used. Properties of the polymer are shown in Table 7.

[Crystalline Olefin Resin (BB-3)]

Into a glass autoclave having a volume of 500 mL that had been sufficiently purged with nitrogen, 250 mL of toluene was introduced, 150 L/h of propylene was flown, and were kept at 25° C. for 20 minutes. On the other hand, into a side-arm flask having a volume of 30 mL that had been sufficiently purged with nitrogen, a magnetic stirrer was placed, and thereto, 5.00 mmol of a toluene solution of methylaluminoxane (Al=1.53 mol/L), and then 5.0 μmol of a toluene solution of dibenzylmethylene (cyclopentadienyl) (3,6-di-tert-butylfluorenyl) zirconiumdichloride were added, and the mixture was stirred for 20 minutes. This solution was added to the toluene charged in the glass autoclave into which propylene had been flown, thereby initiating polymerization. A propylene gas in an amount of 150 L/h was continuously fed, and under ordinary pressure, polymerization was performed at 25° C. for 45 minutes. Then, a slight amount of methanol was added to terminate the polymerization. The polymer solution was added to a large excess of methanol to precipitate the polymer. The precipitated polymer was dried under reduced pressure at 80° C. for 12 hours. As a result, 2.38 g of the polymer was obtained. Properties of the resultant polymer are shown in Table 7.

[Crystalline Olefin Resin (BB-4)]

A commercially-available polypropylene (B241, manufactured by Prime Polymer Co., Ltd.) was used. Properties of the polymer are shown in Table 7.

[Crystalline Olefin Resin (BB-5)]

A commercially-available polypropylene (E-200GP, manufactured by Prime Polymer Co., Ltd.) was used. Properties of the polymer are shown in Table

TABLE 7

| | | Crystalline olefin resin(BB) | | | | |
|---|---|---|---|---|---|---|
| | | BB-1 PP | BB-2 PP | BB-3 PP | BB-4 PP | BB-5 PP |
| MFR | g/10 min | 7 | 7 | 6 | 0.5 | 2 |
| Density | g/cm$^3$ | 902 | 896 | 882 | 910 | 902 |
| Melting point (Tm) | ° C. | 160 | 140 | 155 | 160 | 160 |

[α-olefin Copolymer (CC-1)]

Into a 1000 mL polymerization apparatus that had been sufficiently purged with nitrogen, 1834 mL of a dried hexane, 1144 g of 1-octene, and triisobutylaluminum (1.0 mmol) were introduced at ordinary temperature. Then, the polymerization apparatus was heated till the temperature of the mixture became 80° C., and the pressure inside the system was controlled to be 0.75 MPa using ethylene. Then, a toluene solution in which 0.003 mmol of bis(p-tolyl) methylene(cyclopentadienyl) (1,1,4,4,7,7,10,10-octamethyl-1,2,3,4,7,8,9,10-octahydrodibenz(b,h)-fluorenyl)zirconiumdichloride had been contacted with 0.15 mmol in terms of aluminum of methylaluminoxane (manufactured by Tosoh Finechem Corporation) was added into the polymerization apparatus. With the temperature of the mixture at 80° C., and with the pressure inside the system kept at 0.75 MPa using ethylene, polymerization was performed for 60 minutes. Then, 20 mL of methanol was added to terminate the polymerization. After depressurization, in 4 L of methanol, the polymer was precipitated from the polymer solution, and the polymer was dried under vacuum at 130° C. for 12 hours. The resultant polymer weighed 75.0 g. Properties of the resultant polymer are shown in Table 8.

[α-olefin Copolymer (CC-2)]

Into a 4000 mL polymerization apparatus that had been sufficiently purged with nitrogen, 1834 mL of a dried hexane and triisobutylaluminum (1.0 mmol) were introduced at ordinary temperature. Then, the polymerization apparatus was heated till the temperature of the mixture became 80° C., and the pressure was increased so as to be 0.35 MPa using propylene, and then the pressure inside the system was controlled to be 0.75 MPa using ethylene. Then, a toluene solution in which 0.00015 mmol of bis(p-tolyl)methylene (cyclopentadienyl) (1,1,4,4,7,7,10,10-octamethyl-1,2,3,4,7,8,9,10-octahydrodibenz(b,h)-fluorenyl)zirconiumdichloride had been contacted with 0.075 mmol in terms of aluminum of methylaluminoxane (manufactured by Tosoh Finechem Corporation) was added into the polymerization apparatus. With the temperature of the mixture at 80° C., and with the pressure inside the system kept at 0.75 MPa using ethylene, polymerization was performed for 60 minutes. Then, 20 mL of methanol was added to terminate the polymerization. After depressurization, in 4 L of methanol, the polymer was precipitated from the polymer solution, and the polymer was dried under vacuum at 130° C. for 12 hours. The resultant polymer weighed 89.2 g. Properties of the resultant polymer are shown in Table 8.

[α-olefin Copolymer (CC-3)]

Into a 4000 mL polymerization apparatus that had been sufficiently purged with nitrogen, 1834 mL of a dried hexane, 90 g of 1-butene, and triisobutylaluminum (1.0 mmol) were introduced at ordinary temperature. Then, the polymerization apparatus was heated till the temperature of the mixture became 80° C., and the pressure inside the system was controlled to be 0.75 MPa using ethylene. Then, a toluene solution in which 0.00015 mmol of bis(p-tolyl) methylene(cyclopentadienyl)(1,1,4,4,7,7,10,10-octamethyl-1,2,3,4,7,8,9,10-octahydrodibenz(b,h)-fluorenyl)zirconiumdichloride had been contacted with 0.075 mmol in terms of aluminum of methylaluminoxane (manufactured by Tosoh Finechem Corporation) was added into the polymerization apparatus. With the temperature of the mixture at 80° C., and with the pressure inside the system kept at 0.75 MPa using ethylene, polymerization was performed for 60 minutes. Then, 20 mL of methanol was added to terminate the polymerization. After depressurization, in 4 L of methanol, the polymer was precipitated from the polymer solution, and the polymer was dried under vacuum at 130° C. for 12 hours. The resultant polymer weighed 49.0 g. Properties of the resultant polymer are shown in Table 8.

[α-Olefin Copolymer (CC-4)]

Into a 4000 mL polymerization apparatus that had been sufficiently purged with nitrogen, 1834 mL of a dried hexane, 120 g of 1-butene, and triisobutylaluminum (1.0 mmol) were introduced at ordinary temperature. Then, the polymerization apparatus was heated till the temperature of the mixture became 60° C., and the pressure was increased so as to be 0.56 MPa using propylene, and then the pressure inside the system was controlled to be 0.75 MPa using ethylene. Then, a toluene solution in which 0.001 mmol of diphenylmethylene (3-tert-butyl-5-methyl-cyclopentadienyl) (2,7-di-tert-butyl-fluorenyl)zirconiumdichloride had been contacted with 0.3 mmol in terms of aluminum of methylaluminoxane (manufactured by Tosoh Finechem Corporation) was added into the polymerization apparatus. With the temperature of the mixture at 60° C., and with the pressure inside the system kept at 0.75 MPa using ethylene, polymerization was performed for 20 minutes. Then, 20 mL of methanol was added to terminate the polymerization. After depressurization, in 4 L of methanol, the polymer was precipitated from the polymer solution, and the polymer was dried under vacuum at 130° C. for 12 hours. The resultant polymer weighed 102.5 g. Properties of the resultant polymer are shown in Table 8.

[α-Olefin Copolymer (CC-5)]

Into a 4000 mL polymerization apparatus that had been sufficiently purged with nitrogen, 1834 mL of a dried hexane, 110 g of 1-butene, and triisobutylaluminum (1.0 mmol) were introduced at ordinary temperature. Then, the polymerization apparatus was heated till the temperature of the mixture became 55° C., and the pressure was increased so as to be 0.56 MPa using propylene, and then the pressure inside the system was controlled to be 0.75 MPa using ethylene. Then, a toluene solution in which 0.001 mmol of diphenylmethylene(3-tert-butyl-5-methyl-cyclopentadienyl) (2,7-di-tert-butyl-fluorenyl)zirconiumdichloride had been contacted with 0.3 mmol in terms of aluminum of methyl-aluminoxane (manufactured by Tosoh Finechem Corporation) was added into the polymerization apparatus. With the temperature of the mixture at 55° C., and with the pressure inside the system kept at 0.75 MPa using ethylene, polymerization was performed for 25 minutes. Then, 20 mL of methanol was added to terminate the polymerization. After depressurization, in 4 L of methanol, the polymer was precipitated from the polymer solution, and the polymer was dried under vacuum at 130° C. for 12 hours. The resultant polymer weighed 120.2 g. Properties of the resultant polymer are shown in Table 8.

[α-Olefin Copolymer (CC-6)]

Into a 2000 mL polymerization apparatus that had been sufficiently purged with nitrogen, 775 mL of a dried hexane, 135 g of 1-butene, and triisobutylaluminum (1.0 mmol) were introduced at ordinary temperature. Then, the polymerization apparatus was heated till the temperature of the mixture became 50° C., and the pressure was increased so as to be 0.7 MPa using propylene. Then, a toluene solution in which 0.002 mmol of dimethylmethylene (3-tert-butyl-5-methyl-cyclopentadienyl) fluorenyl zirconiumdichloride had been contacted with 0.6 mmol in terms of aluminum of methyl-aluminoxane (manufactured by Tosoh Finechem Corporation) was added into the polymerization apparatus. With the temperature of the mixture at 50° C., and with the propylene pressure kept at 0.7 MPa, polymerization was performed for 30 minutes. Then, 20 mL of methanol was added to terminate the polymerization. After depressurization, in 2 L of methanol, the polymer was precipitated from the polymer solution, and the polymer was dried under vacuum at 130° C. for 12 hours. The resultant polymer weighed 45.3 g. Properties of the resultant polymer are shown in Table 8.

[α-Olefin Copolymer (CC-7)]

Into a 2000 mL polymerization apparatus that had been sufficiently purged with nitrogen, 775 mL of a dried hexane, 300 g of 1-butene, and triethylaluminum (1.0 mmol) were introduced at ordinary temperature. Then, 240 NmL of a hydrogen gas was introduced, and the polymerization apparatus was heated till the temperature of the mixture became 60° C., and then the pressure was increased so as to be 0.7 MPa using propylene. Then, a toluene solution of 0.013 mmol of a prepared solid titanium catalyst was added into the polymerization apparatus. With the temperature of the mixture at 50° C., and with the propylene pressure kept at 0.7 MPa, polymerization was performed for 30 minutes. Then, 20 mL of methanol was added to terminate the polymerization. After depressurization, in 2 L of methanol, the polymer was precipitated from the polymer solution, and the polymer was dried under vacuum at 130° C. for 12 hours. The resultant polymer weighed 65.3 g. Properties of the resultant polymer are shown in Table 8.

TABLE 8

| Polymerization Example | | Olefin copolymer (CC) | | | | | | |
|---|---|---|---|---|---|---|---|---|
| | | CC-1 | CC-2 | CC-3 | CC-4 | CC-5 | CC-6 | CC-7 |
| α-olefin content (1) | wt % | 59 | 74 | 71 | 69 | 66 | 71 | 80 |
| α-olefin type (1) | | ethylene | ethylene | ethylene | propylene | propylene | propylene | butene |
| α-olefin content (2) | wt % | 41 | 26 | 29 | 18 | 14 | 29 | 20 |
| α-olefin type (2) | | octene | propylene | butene | butene | butene | butene | propylene |
| α-olefin content (3) | wt % | | | | 13 | 20 | | |
| α-olefin type (3) | | | | | ethylene | ethylene | | |
| MFR | g/10 min | 1 | 0.8 | 4 | 7 | 1 | 7 | 4 |
| Density | g/cm$^3$ | 870 | 869 | 864 | 857 | 858 | 890 | 887 |
| Melting point (Tm) | ° C. | 38 | 42 | 50 | 50 | 60 | 70 | 75 |

Example Y-1

70 parts by weight of the 4-methyl-1-pentene copolymer (AA-1), 20 parts by weight of the crystalline olefin resin (BB-4), and 10 parts by weight of the olefin copolymer (CC-3) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-2

60 parts by weight of the 4-methyl-1-pentene copolymer (AA-1), 20 parts by weight of the crystalline olefin resin (BB-4), and 20 parts by weight of the olefin copolymer (CC-3) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-3

70 parts by weight of the 4-methyl-1-pentene copolymer (AA-1), 10 parts by weight of the crystalline olefin resin (BB-5), and 20 parts by weight of the olefin copolymer (CC-6) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-4

70 parts by weight of the 4-methyl-1-pentene copolymer (AA-1), 20 parts by weight of the crystalline olefin resin (BB-5), and 10 parts by weight of the olefin copolymer (CC-6) were blended with one another. Further, 100 parts by weight of the composition was blended with 1000 ppm of Irganox 1010, a hindered phenol-based antioxidant, 1000 ppmof Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-5

70 parts by weight of the 4-methyl-1-pentene copolymer (AA-1), 20 parts by weight of the crystalline olefin resin (BB-5), and 10 parts by weight of the olefin copolymer (CC-7) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-6

70 parts by weight of the 4-methyl-1-pentene copolymer (AA-2), 20 parts by weight of the crystalline olefin resin (BB-1), and 10 parts by weight of the olefin copolymer (CC-3) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-7

80 parts by weight of the 4-methyl-1-pentene copolymer (AA-3), 4 parts by weight of the crystalline olefin resin (BB-2), and 16 parts by weight of the olefin copolymer (CC-4) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-8

60 parts by weight of the 4-methyl-1-pentene copolymer (AA-6), 8 parts by weight of the crystalline olefin resin (BB-2), and 32 parts by weight of the olefin copolymer (CC-4) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-9

80 parts by weight of the 4-methyl-1-pentene copolymer (AA-4), 3 parts by weight of the crystalline olefin resin (BB-3), and 17 parts by weight of the olefin copolymer (CC-5) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-10

60 parts by weight of the 4-methyl-1-pentene copolymer (AA-4), 6 parts by weight of the crystalline olefin resin (BB-3), and 34 parts by weight of the olefin copolymer (CC-5) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Example Y-11

60 parts by weight of the 4-methyl-1-pentene copolymer (AA-4), 6 parts by weight of the crystalline olefin resin (BB-3), and 34 parts by weight of the olefin copolymer (CC-5) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that improved strength was obtained, and it is clear from the ball drop resilience ratio that improved stress absorption was obtained.

Reference Example y-1

10 parts by weight of the 4-methyl-1-pentene copolymer (AA-2), 80 parts by weight of the crystalline olefin resin (BB-2), and 10 parts by weight of the olefin copolymer (CC-1) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

Comparative Example y-2

70 parts by weight of the crystalline olefin resin (BB-1) and 30 parts by weight of the olefin copolymer (CC-1) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

It is clear from the mechanical properties that the strength is inferior, and it is clear from the ball drop resilience ratio that the stress absorption is inferior.

Reference Example y-3

40 parts by weight of the 4-methyl-1-pentene copolymer (AA-1) and 60 parts by weight of the crystalline olefin resin (BB-1) were blended with one another. Further, 100 parts by weight of the composition was blended with 1000 ppm of Irganox 1010, a hindered phenol-based antioxidant, 1000 ppm of Irgafos 168, a phosphorus-based processing heat stabilizer, each of which is manufactured by Ciba Japan K.K., and 500 ppm of calcium stearate manufactured by NOF Corporation. Then, these were melt kneaded using a Labo Plastomill (a biaxial batch type melt kneading apparatus) manufactured by Toyo Seiki Seisaku-Sho Ltd., with the temperature set at 200° C., with the resins charged in an amount of 40 g (apparatus batch volume=60 cm$^3$), at 50 rpm, for 5 minutes. Then, the mixture was collected and cooled using a cooling press set at 20° C., to thereby form a sheet. The sheet was cut so as to have an appropriate size, thereby preparing a specimen for measurement. Furthermore, using the specimen, a press sheet was prepared and properties were measured. Results of various measurements are shown in Table 9.

TABLE 9

|  |  | Ex. Y-1 | Ex. Y-2 | Ex. Y-3 | Ex. Y-4 | Ex. Y-5 | Ex. Y-6 |
|---|---|---|---|---|---|---|---|
| 4-methyl-1-pentene copolymer (A) |  | AA-1 | AA-1 | AA-1 | AA-1 | AA-1 | AA-2 |
| Crystalline olefin resin (B) |  | BB-4 | BB-4 | BB-5 | BB-5 | BB-5 | BB-1 |
| Olefin copolymer (C) |  | CC-3 | CC-3 | CC-6 | CC-6 | CC-7 | CC-3 |
| (A)/(B)/(C) compositional ratio (wt %) |  | 70/20/10 | 60/20/20 | 70/10/20 | 70/20/10 | 70/20/10 | 70/20/10 |
| EL | % | 848 | 990 | 861 | 922 | 643 | 874 |
| TS | MPa | 11 | 14 | 22 | 35 | 12 | 17 |
| YM | MPa | 11 | 11 | 13 | 57 | 6 | 16.9 |
| Shore hardness (immediately after) |  | 75 | 76 | 80 | 94 | 83 | 76 |
| Shore hardness (15 sec after) |  | 59 | 66 | 69 | 84 | 72 | 63 |
| Hardness meter type |  | A | A | A | A | A | A |
| ΔHS |  | 16 | 10 | 11 | 10 | 11 | 13 |
| Temperature giving tan δ peak | ° C. | 8 | 8 | 9 | 9 | 8 | 12 |
| tan δ peak value |  | 1.1 | 0.9 | 1.0 | 0.6 | 0.9 | 1.0 |
| Ball drop resilience ratio (25° C.) | % | 7 | 8 | 8 | 10 | 10 | 6 |

|  |  | Ex. Y-7 | Ex. Y-8 | Ex. Y-9 | Ex. Y-10 | Ex. Y-11 |
|---|---|---|---|---|---|---|
| 4-methyl-1-pentene copolymer (A) |  | AA-3 | AA-4 | AA-4 | AA-4 | AA-4 |
| Crystalline olefin resin (B) |  | BB-2 | BB-2 | BB-3 | BB-3 | BB-3 |
| Olefin copolymer (C) |  | CC-4 | CC-4 | CC-5 | CC-5 | CC-5 |
| (A)/(B)/(C) compositional ratio (wt %) |  | 80/4/16 | 60/8/32 | 80/3/17 | 60/6/34 | 60/6/34 |
| EL | % | 687 | 778 | 640 | 732 | 614 |
| TS | MPa | 9 | 14 | 7 | 11 | 22 |
| YM | MPa | 3 | 5 | 3 | 7 | 33 |
| Shore hardness (immediately after) |  | 66 | 64 | 68 | 75 | 71 |
| Shore hardness (15 sec after) |  | 37 | 44 | 41 | 44 | 52 |
| Hardness meter type |  | A | A | A | A | A |
| ΔHS |  | 29 | 20 | 27 | 31 | 19 |
| Temperature giving tan δ peak | ° C. | 14 | 16 | 15 | 14 | 23 |
| tan δ peak value |  | 1.9 | 1.4 | 1.8 | 1.1 | 1.3 |
| Ball drop resilience ratio (25° C.) | % | 6 | 12 | 15 | 10 | 25 |

TABLE 9-continued

|  |  | Ref. Ex. y-1 | Ref. Ex. y-2 | Ref. Ex. y-3 |
| --- | --- | --- | --- | --- |
| 4-methyl-1-pentene copolymer (A) |  | AA-2 |  | AA-1 |
| Crystalline olefin resin (B) |  | BB-2 | BB-1 | BB-1 |
| Olefin copolymer (C) |  | CC-1 | CC-1 |  |
| (A)/(B)/(C) compositional ratio (wt %) |  | 10/80/10 | 0/70/30 | 40/60/0 |
| EL | % | 375 | 274 | 535 |
| TS | MPa | 24 | 16 | 30 |
| YM | MPa | 795 | 686 | 343 |
| Shore A hardness (immediately after) |  | 54 | 56 | 66 |
| Shore A hardness (15 sec after) |  | 49 | 53 | 56 |
| Hardness meter type |  | D | D | D |
| ΔHS |  | 5 | 3 | 10 |
| Temperature giving tan δ peak | ° C. | −23 | −20 | 5.2 |
| tan δ peak value |  | 0.1 | 0.1 | 0.3 |
| Ball drop resilience ratio (25° C.) | % | 32 | 48 | 25 |

The invention claimed is:

1. A 4-methyl-1-pentene/α-olefin copolymer composition (X11) comprising:

50 to 95 parts by weight of a 4-methyl-1-pentene/α-olefin copolymer (A1) comprising 10 to 32 mol % of a structural unit (i) derived from 4-methyl-1-pentene, 68 to 90 mol % of a structural unit (ii) derived from propylene and 0 to 10 mol % of a structural unit (iii) derived from a non-conjugated polyene, provided that the total of the structural units (i), (ii), and (iii) is 100 mol %, and 5 to 50 parts by weight of a thermoplastic resin (B) other than the 4-methyl-1-pentene/α-olefin copolymer (A1), provided that the total of the copolymer (A1) and the thermoplastic resin (B) is 100 parts by weight, wherein the copolymer (A1) satisfies the following requirements (a) to (d), (j), and (k):

(a): the intrinsic viscosity [η], as measured in decalin at 135° C., is 0.01 to 5.0 dL/g, (b): the ratio (Mw/Mn) of a weight-average molecular weight (Mw) to a number-average molecular weight (Mn), as measured by gel permeation chromatography (GPC), is 1.0 to 3.5, (c): the tensile modulus (YM) is 0.1 to 1000 MPa, (d): the melting point [Tm], as measured by differential scanning calorimetry (DSC), is lower than 110° C. or not observed, (j): the maximum value of loss tangent tanδ, as obtained by measuring a dynamic viscoelasticity thereof within a temperature range of −70 to 180° C. at a frequency of 10 rad/s, is 1.0 or more, and the temperature giving the maximum value of tanδ is within a temperature range of 0 to 40° C., and (k): wherein the copolymer (A1) has a ball drop resilience ratio, as obtained by dropping a rigid ball of 16.310 g from a height of 460 mm under a room temperature of 25° C. in accordance with JIS K6400, of 0 to 20%, wherein the composition (X11) satisfies the following requirement (j1):

(j 1): the maximum value of loss tangent tanδ, as obtained by measuring a dynamic viscoelasticity thereof within a temperature of −70 to 180° C. at a frequency of 10 rad/s, is 0.4 or more, and the temperature giving the maximum value of tanδ is within a temperature range of −50 to 40° C.

2. An article comprising the 4-methyl-1-pentene/α-olefin copolymer composition (X11) according to claim 1.

* * * * *